United States Patent
Kondo

(10) Patent No.: US 7,003,163 B2
(45) Date of Patent: Feb. 21, 2006

(54) IMAGE PROCESSING APPARATUS

(75) Inventor: Tetsujiro Kondo, Tokyo (JP)

(73) Assignee: Sony Corporation, Tokyo (JP)

(*) Notice: Subject to any disclaimer, the term of this patent is extended or adjusted under 35 U.S.C. 154(b) by 71 days.

(21) Appl. No.: 10/855,753

(22) Filed: May 27, 2004

(65) Prior Publication Data

US 2004/0218823 A1  Nov. 4, 2004

Related U.S. Application Data

(62) Division of application No. 09/660,129, filed on Sep. 12, 2000, now Pat. No. 6,766,059.

(30) Foreign Application Priority Data

Sep. 13, 1999 (JP) .................................. 11-258472
Sep. 13, 1999 (JP) .................................. 11-258473
Sep. 13, 1999 (JP) .................................. 11-258474

(51) Int. Cl.
*G06K 9/64* (2006.01)
(52) U.S. Cl. ...................... 382/224; 382/291
(58) Field of Classification Search ................ None
See application file for complete search history.

(56) References Cited

U.S. PATENT DOCUMENTS

| | | | |
|---|---|---|---|
| 5,649,032 A | | 7/1997 | Burt et al. |
| 5,706,367 A | | 1/1998 | Kondo et al. |
| 5,790,196 A | * | 8/1998 | Sun et al. .................... 382/251 |
| 5,881,174 A | * | 3/1999 | Kim ........................... 382/236 |
| 6,078,701 A | | 6/2000 | Hsu et al. |
| 6,275,617 B1 | * | 8/2001 | Kondo ........................ 382/236 |
| 6,301,382 B1 | * | 10/2001 | Smith et al. ................ 382/162 |
| 6,335,985 B1 | * | 1/2002 | Sambonsugi et al. ........ 382/190 |
| 6,603,880 B1 | * | 8/2003 | Sakamoto ................... 382/173 |
| 6,766,059 B1 | * | 7/2004 | Kondo ........................ 382/236 |

FOREIGN PATENT DOCUMENTS

| JP | 09-037259 | 2/1997 |
|---|---|---|
| JP | 11-112871 | 4/1999 |

* cited by examiner

*Primary Examiner*—Jingge Wu
(74) *Attorney, Agent, or Firm*—Frommer Lawrence & Haug LLP; William S. Frommer

(57) ABSTRACT

A foreground extracting section extracts the foreground of each of the first to the N-th frames, and a foreground-accumulated-image configuration section configures a front accumulated image obtained by overlapping the foregrounds of the first to the N-th frames viewed from the future side and a rear accumulated image obtained by overlapping them viewed from the past side. A learning section uses the front accumulated image and the rear accumulated image to obtain prediction coefficients used for predicting the foreground of each frame, and a multiplexer outputs the prediction coefficients, the front accumulated image, and the rear accumulated image as the result of encoding of the foregrounds of the first to the N-th frames.

19 Claims, 34 Drawing Sheets

FIG. 9

| LEVEL OF PIXEL VALUE | NUMBER $f_k$ | $\Sigma x_k$, $\Sigma y_k$ |
|---|---|---|
| LEVEL K | | |
| ⋮ | ⋮ | ⋮ |
| LEVEL 3 | | |
| LEVEL 2 | | |
| LEVEL 1 | | |

FIG. 12

| LUMINANCE | NUMBER $f_k$ | $\Sigma x_k$, $\Sigma y_k$ |
|---|---|---|
| CLASS K | | |
| ⋮ | ⋮ | ⋮ |
| CLASS 3 | | |
| CLASS 2 | | |
| CLASS 1 | | |

FIG. 19

| COORDINATES | FIRST-NUMBER LEVEL | RATE | SECOND-NUMBER LEVEL | RATE | ... | M-TH-NUMBER LEVEL | RATE |
|---|---|---|---|---|---|---|---|
| Xmin, Ymin | | | | | ... | | |
| ... | | | | | ... | | |
| 0, 0 | | | | | ... | | |
| 0, 1 | | | | | ... | | |
| ... | | | | | ... | | |
| Xmax, Ymax | | | | | ... | | |

IMAGE PROCESSING APPARATUS

CROSS-REFERENCE TO RELATED APPLICATION

This application is a divisional application of U.S. patent application Ser. No. 09/660,129, filed Sep. 12, 2000 now U.S. Pat. No. 6,766,059.

BACKGROUND OF THE INVENTION

1. Field of the Invention

The present invention relates to image processing apparatuses.

2. Description of the Related Art

As a compression-encoding method of images, object encoding has been conventionally known. In object encoding, the foreground and background of a plurality of continuous frames of images (one scene or one cut of image) (for example, frames from a scene change to the next scene change) are extracted. When a plurality of images are formed of N frames, the background (if a scene is taken when a video camera is panned or tilted, for example, the background is a landscape image or a portrait image) of the entire one scene displayed by the N frames and the foreground obtained in the N frames in common are extracted. Data obtained by object encoding is decoded by arranging the foreground in the background. This type of object encoding is described in U.S. Pat. No. 5,706,367, assigned to the assignee of the present application, and hereby incorporated by reference.

In encoding in which the foreground and the background are extracted, such as object encoding, the way the extracted foreground is encoded highly affects the efficiency of encoding.

In encoding in which the foreground and the background are extracted, such as object encoding, the precision of extracting of the background highly affects the quality of the decoded image.

As a method for detecting camera motion in object encoding, a method for regarding the entire frame as one block and achieving block matching can be considered, like a method for detecting the motion vector of a macroblock.

To apply block matching to the entire frame, however, it is necessary to obtain the sum of the absolute-value differences between the pixels of an image on one frame and those of an image on a frame one frame before while the spatial position of the frame for which camera motion is to be detected is being shifted. The amount of calculation is huge and the calculation is troublesome.

SUMMARY OF THE INVENTION

The present invention has been made in consideration of the above situation. Accordingly, it is an object of the present invention to efficiently encode the foreground of an image.

Another object of the present invention is to extract the background from an image highly precisely.

Still another object of the present invention is to easily detect camera motion.

One of the foregoing object is achieved in one aspect of the present invention through the provision of an image processing apparatus for processing the image signal of a plurality of continuous frames, including foreground extracting means for extracting the foreground of each frame from the image signal of the plurality of continuous frames; prediction-information generating means for generating prediction information used for predicting the foreground of each frame according to a front accumulated image obtained by viewing the plurality of continuous frames from the future side in the time-progress direction of the plurality of continuous frames in a condition in which positioning has been applied to the backgrounds of the image signal of the plurality of continuous frames and the foregrounds are overlapped, and a rear accumulated image obtained by viewing the plurality of continuous frames from the past side in the time-progress direction of the plurality of continuous frames in the condition in which positioning has been applied to the backgrounds of the image signal of the plurality of continuous frames and the foregrounds are overlapped; and output means for outputting information including the front accumulated image, the rear accumulated image, and the prediction information as the result of encoding of the foregrounds of the plurality of continuous frames.

One of the foregoing object is achieved in another aspect of the present invention through the provision of an image processing method for processing the image signal of a plurality of continuous frames, including the steps of extracting the foreground of each frame from the image signal of the plurality of continuous frames; generating prediction information used for predicting the foreground of each frame according to a front accumulated image obtained by viewing the plurality of continuous frames from the future side in the time-progress direction of the plurality of continuous frames in a condition in which positioning has been applied to the backgrounds of the image signal of the plurality of continuous frames and the foregrounds are overlapped, and a rear accumulated image obtained by viewing the plurality of continuous frames from the past side in the time-progress direction of the plurality of continuous frames in the condition in which positioning has been applied to the backgrounds of the image signal of the plurality of continuous frames and the foregrounds are overlapped; and outputting information including the front accumulated image, the rear accumulated image, and the prediction information as the result of encoding of the foregrounds of the plurality of continuous frames.

One of the foregoing object is achieved in still another aspect of the present invention through the provision of a recording medium for storing a computer-controllable program for processing the image signal of a plurality of continuous frames, the program comprising the steps of extracting the foreground of each frame from the image signal of the plurality of continuous frames; generating prediction information used for predicting the foreground of each frame according to a front accumulated image obtained by viewing the plurality of continuous frames from the future side in the time-progress direction of the plurality of continuous frames in a condition in which positioning has been applied to the backgrounds of the image signal of the plurality of continuous frames and the foregrounds are overlapped, and a rear accumulated image obtained by viewing the plurality of continuous frames from the past side in the time-progress direction of the plurality of continuous frames in the condition in which positioning has been applied to the backgrounds of the image signal of the plurality of continuous frames and the foregrounds are overlapped; and outputting information including the front accumulated image, the rear accumulated image, and the prediction information as the result of encoding of the foregrounds of the plurality of continuous frames.

One of the foregoing object is achieved in yet another aspect of the present invention through the provision of an image processing apparatus for processing the image signal of a plurality of continuous frames, including extracting means for extracting from the result of encoding including prediction information used for predicting the foreground of each frame, according to a front accumulated image obtained by viewing the plurality of continuous frames from the future side in the time-progress direction of the plurality of continuous frames in a condition in which positioning has been applied to the backgrounds of the image signal of the plurality of continuous frames and the foregrounds are overlapped, and a rear accumulated image obtained by viewing the plurality of continuous frames from the past side in the time-progress direction of the plurality of continuous frames in the condition in which positioning has been applied to the backgrounds of the image signal of the plurality of continuous frames and the foregrounds are overlapped, the front accumulated image, the rear accumulated image, and the prediction information; and decoding means for decoding the image signal of each frame according to the front accumulated image, the rear accumulated image, and the prediction information.

One of the foregoing object is achieved in still yet another aspect of the present invention through the provision of an image processing method for processing the image signal of a plurality of continuous frames, including the steps of extracting from the result of encoding including prediction information used for predicting the foreground of each frame, according to a front accumulated image obtained by viewing the plurality of continuous frames from the future side in the time-progress direction of the plurality of continuous frames in a condition in which positioning has been applied to the backgrounds of the image signal of the plurality of continuous frames and the foregrounds are overlapped, and a rear accumulated image obtained by viewing the plurality of continuous frames from the past side in the time-progress direction of the plurality of continuous frames in the condition in which positioning has been applied to the backgrounds of the image signal of the plurality of continuous frames and the foregrounds are overlapped, the front accumulated image, the rear accumulated image, and the prediction information; and decoding the image signal of each frame according to the front accumulated image, the rear accumulated image, and the prediction information.

One of the foregoing object is achieved in a further aspect of the present invention through the provision of a recording medium for storing a computer-controllable program for processing the image signal of a plurality of continuous frames, the program including the steps of extracting from the result of encoding including prediction information used for predicting the foreground of each frame, according to a front accumulated image obtained by viewing the plurality of continuous frames from the future side in the time-progress direction of the plurality of continuous frames in a condition in which positioning has been applied to the backgrounds of the image signal of the plurality of continuous frames and the foregrounds are overlapped, and a rear accumulated image obtained by viewing the plurality of continuous frames from the past side in the time-progress direction of the plurality of continuous frames in the condition in which positioning has been applied to the backgrounds of the image signal of the plurality of continuous frames and the foregrounds are overlapped, the front accumulated image, the rear accumulated image, and the prediction information; and decoding the image signal of each frame according to the front accumulated image, the rear accumulated image, and the prediction information.

One of the foregoing object is achieved in a still further aspect of the present invention through the provision of an image processing apparatus for processing the image signal of a plurality of continuous frames, including identical-position-pixel detecting means for detecting sets of pixels disposed spatially at identical positions in the plurality of continuous frames according to the image signal of the plurality of continuous frames when positioning has been applied to the background of each frame; number-of-pixels detecting means for detecting the number of pixels having each pixel value in each set of pixels disposed spatially at an identical position; and background-pixel-value determination means for determining a pixel value of the background image for each set according to the number of pixels.

One of the foregoing object is achieved in a yet further aspect of the present invention through the provision of an image processing method for processing the image signal of a plurality of continuous frames, including the steps of detecting sets of pixels disposed spatially at identical positions in the plurality of continuous frames according to the image signal of the plurality of continuous frames when positioning has been applied to the background of each frame; detecting the number of pixels having each pixel value in each set of pixels disposed spatially at an identical position; and determining a pixel value of the background image for each set according to the number of pixels.

One of the foregoing object is achieved in a still yet further aspect of the present invention through the provision of a recording medium for storing a computer-controllable program for processing the image signal of a plurality of continuous frames, the program including the steps of detecting sets of pixels disposed spatially at identical positions in the plurality of continuous frames according to the image signal of the plurality of continuous frames when positioning has been applied to the background of each frame; detecting the number of pixels having each pixel value in each set of pixels disposed spatially at an identical position; and determining a pixel value of the background image for each set according to the number of pixels.

One of the foregoing object is achieved in a farther aspect of the present invention through the provision of an image processing apparatus for processing the image signal of a plurality of continuous frames, including storage means for storing the image signal; center-of-gravity-of-detection-area detecting means for detecting the center of gravity of the image signal of a detection area which includes the image signal of a frame immediately before a focus frame in the image signal stored in the storage means; center-of-gravity-of-focus-frame detecting means for detecting the center of gravity of the image signal of the focus frame; camera-motion-vector detecting means for detecting a camera-motion vector according to the center of gravity of the detection area and the center of gravity of the focus frame; and overwriting means for overwriting the image signal of the focus frame on the image signal stored in the storage means by a positional relationship based on the camera-motion vector.

One of the foregoing object is achieved in a still farther aspect of the present invention through the provision of an image processing method for processing the image signal of a plurality of continuous frames, including the steps of storing the image signal; detecting the center of gravity of the image signal of a detection area which includes the image signal of a frame immediately before a focus frame in the image signal stored in the step of storing the image signal; detecting the center of gravity of the image signal of the focus frame; detecting a camera-motion vector according to the center of gravity of the detection area and the center of gravity of the focus frame; and overwriting the image signal of the focus frame on the image signal stored in the step of storing the image signal by a positional relationship based on the camera-motion vector.

One of the foregoing object is achieved in a yet farther aspect of the present invention through the provision of a recording medium for storing a computer-controllable program for processing the image signal of a plurality of continuous frames, the program including the steps of storing the image signal; detecting the center of gravity of the image signal of a detection area which includes the image signal of a frame immediately before a focus frame in the image signal stored in the step of storing the image signal; detecting the center of gravity of the image signal of the focus frame; detecting a camera-motion vector according to the center of gravity of the detection area and the center of gravity of the focus frame; and overwriting the image signal of the focus frame on the image signal stored in the step of storing the image signal by a positional relationship based on the camera-motion vector.

BRIEF DESCRIPTION OF THE DRAWINGS

FIG. 9 is a view of a level table.

FIG. 12 is a view showing a class table.

FIG. 19 is a view showing a number table.

DESCRIPTION OF THE PREFERRED EMBODIMENTS

Figure 1:
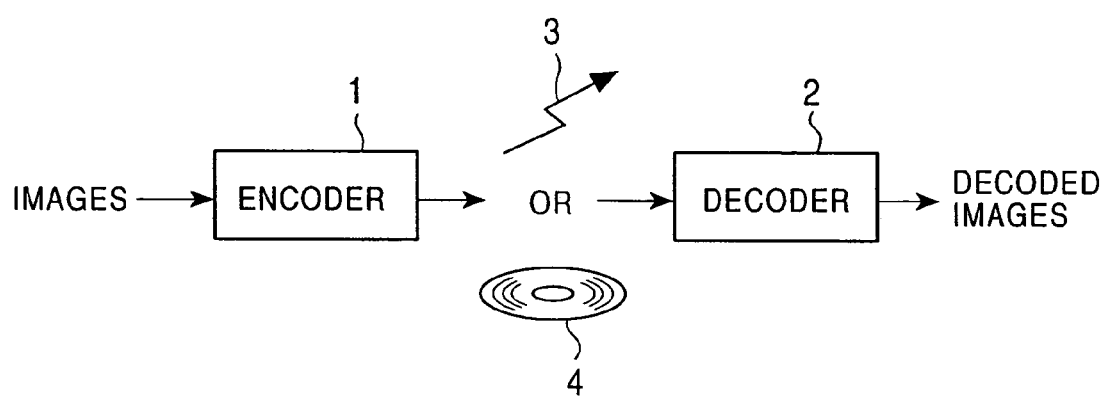
FIG. 1 is a view showing an example structure of an image transfer apparatus according to an embodiment of the present invention.

FIG. 1 shows an example structure of an image transfer apparatus according to an embodiment of the present invention.

An encoder 1 receives digital image data as an image to be encoded, such as that captured by a video camera, encodes the image, and outputs encoded data. The encoded data is transferred through a transfer medium 3, such as a satellite line, a terrestrial wave, a cable television (CATV) network, the Internet, or an integrated service digital network (ISDN), or recorded into a recording medium 4, such as an optical disk, a magneto-optical disk, a magnetic disk, magnetic tape, or a phase-change disk.

A decoder 2 receives the encoded data transferred through the transfer medium 3, or the encoded data reproduced from the recording medium 4, decodes the encoded data, and outputs a decoded image, for example, to a monitor not shown for display.

The image transfer apparatus, described above, can be applied, for example, to an apparatus disposed at a remote position for transmitting and receiving images and to an apparatus for recording and reproducing images.

Figure 2:
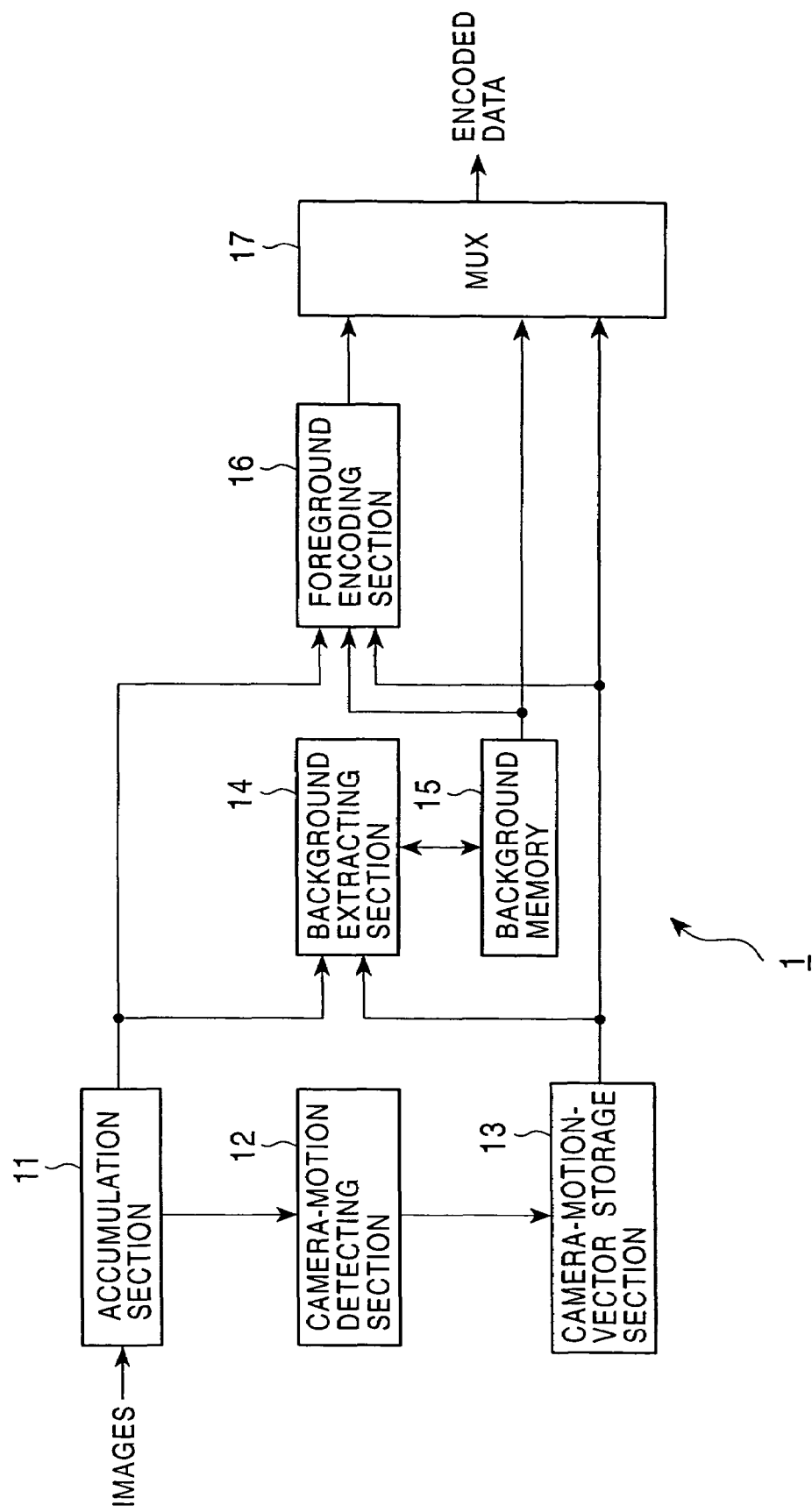
FIG. 2 is a block diagram showing an example structure of an encoder 1 shown in FIG. 1.

FIG. 2 shows an example structure of the encoder 1 shown in FIG. 1.

Figure 3:
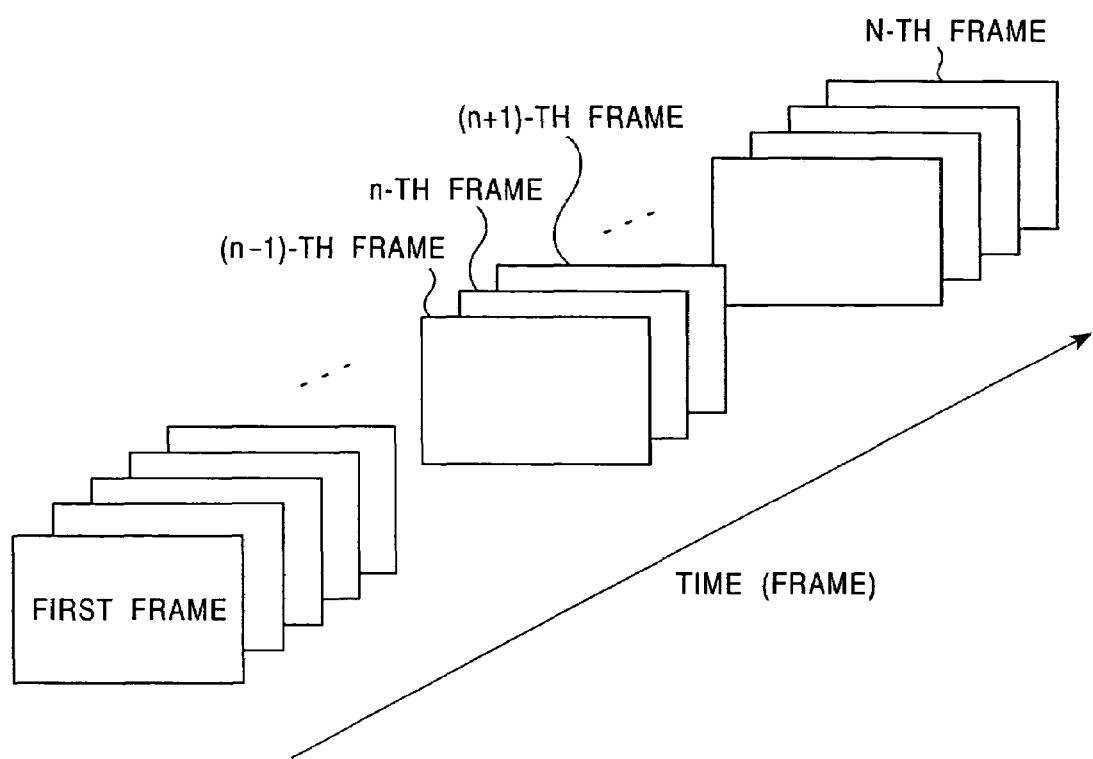
FIG. 3 is a view showing a series of images stored in an accumulation section 11 shown in FIG. 2.

An accumulation section 11 is formed, for example, of a semiconductor memory or a magnetic disk, and temporarily stores image data sent to the encoder 1. The accumulation section 11 stores image data in units of a plurality of frames, such as those from a scene change to the next scene change. It is assumed, for example, that the accumulation section 11 stores image data of N frames formed of a first frame to the N-th frame, as shown in FIG. 3.

When the accumulation section 11 stores the N-frame images, a camera-motion detecting section 12 reads the N-frame images from the accumulation section 11 and detects a camera-motion vector indicating the direction and the magnitude of a camera motion in each frame.

In other words, the camera-motion detecting section 12 sets the upper left corner of a first frame to the origin, and sets a camera-motion vector $V_1$ in the first frame to 0 (=(0, 0)) in a coordinate system (hereinafter called a reference coordinate system) where the direction from the origin to the right is set to the x-axis positive direction and the direction from the origin to the bottom is set to the y-axis positive direction. The camera-motion detecting section 12 sets a camera-motion vector $v_n$ in the n-th frame to the coordinates (x, y) of the upper left corner of the n-th frame in the reference coordinate system for each of a second to the N-th frames when positioning is achieved for the background of each frame.

Figure 4A:
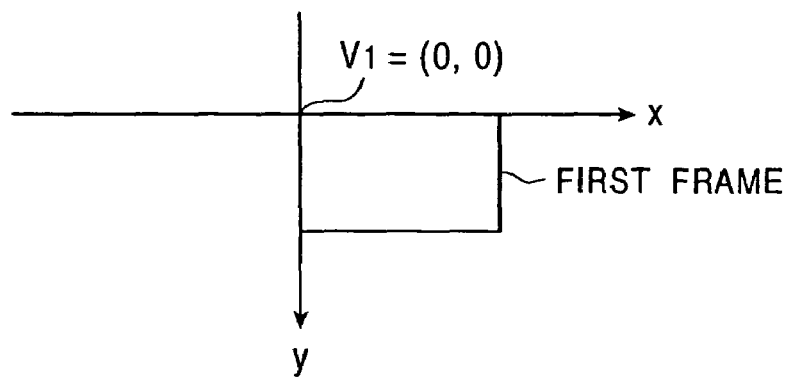
FIGS. 4A to 4C show the processing of a camera-motion detecting section 12 shown in FIG. 2.
Figure 4B:
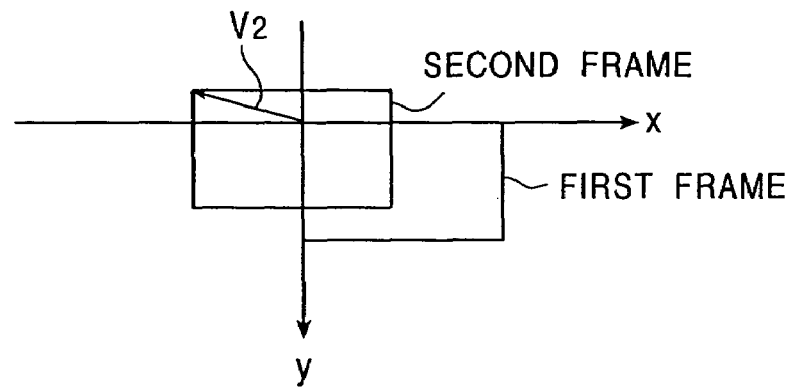
Figure 4C:
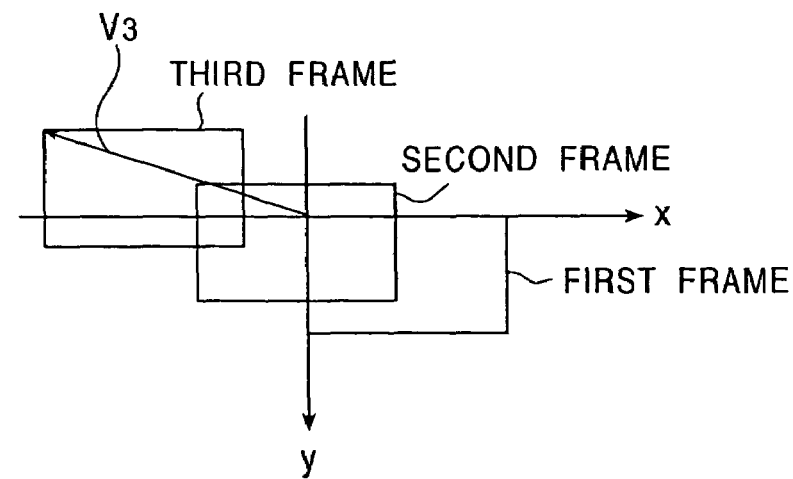

More specifically, after the camera-motion detecting section 12 sets the camera-motion vector $v_1$ in the first frame to 0, the camera-motion detecting section 12 obtains the position of the second frame such that the background of the first frame matches that of the second frame in the reference coordinate system, and sets a camera-motion vector $v_2$ to the coordinates of the upper left corner of the second frame at the obtained position, as shown in FIG. 4B. Then, the camera-motion detecting section 12 obtains the position of a third frame such that the positioned background of the first and second frames matches that of the third frame in the reference coordinate system, and sets a camera-motion vector $v_3$ to the coordinates of the upper left corner of the third frame at the obtained position, as shown in FIG. 4C.

In the same way, the camera-motion detecting section 12 obtains camera-motion vectors $v_4$ to $v_N$ in a fourth frame to the N-th frame.

To simplify a description, it is assumed that the camera is moved only in the horizontal and vertical directions and is not rotated. The present invention can, however, be applied to a case when a camera motion includes rotation.

A camera-motion vector includes a component caused by camera motion itself and also includes a motion component caused when the background is moved. In an extreme case, even if the camera is secured, the corresponding camera-motion vector is not zero. A camera-motion vector is a motion vector used for positioning the background of each frame.

The camera-motion vectors $v_1$ to $v_N$ detected by the camera-motion detecting section 12 as described above in the first frame to the N-th frame are sent to a camera-motion-vector storage section 13 and stored in it.

When the camera-motion-vector storage section 13 stores the camera-motion vectors $v_1$ to $v_N$, a background extracting section 14 reads the camera-motion vectors $v_1$ to $v_N$ from the camera-motion-vector storage section 13, reads the image data of the first frame to the N-th frame from the accumulation section 11, and achieves positioning for and combines the backgrounds of the first frame to the N-th frame according to the camera-motion vectors $v_1$ to $v_N$ to extract the background (hereinafter called, if necessary, a common background) (this background is a landscape image/a portrait image when the series of images are captured by a video camera if the camera is panned/tilted, for example) common to the first frame to the N-th frame. The common background extracted by the background extracting section 14 is sent to a background memory 15 and stored in it.

The pixels of the first frame to the N-th frame disposed at each position are combined by averaging or weighted addition.

When the background memory 15 stores the common background, a foreground encoding section 16 detects the background of each frame stored in the accumulation section 11 among the common background according to the camera-motion vector of each frame stored in the camera-motion-vector storage section 13, and subtracts the detected background of each frame from the image of each frame to extract the foreground of each frame. The foreground encoding section 16 encodes the foreground of each frame and outputs an encoding result to a multiplexer (MUX) 17.

When the MUX 17 receives the encoding result of the foregrounds from the foreground encoding section 16, the MUX 17 multiplexes the camera-motion vectors stored in the camera-motion-vector storage section 13 and the common background stored in the background memory 15 on the encoding result of the foreground, and outputs a multiplexing result as encoded data.

The encoder 1 encodes image data in units of a plurality of frames as described above.

Figure 5:
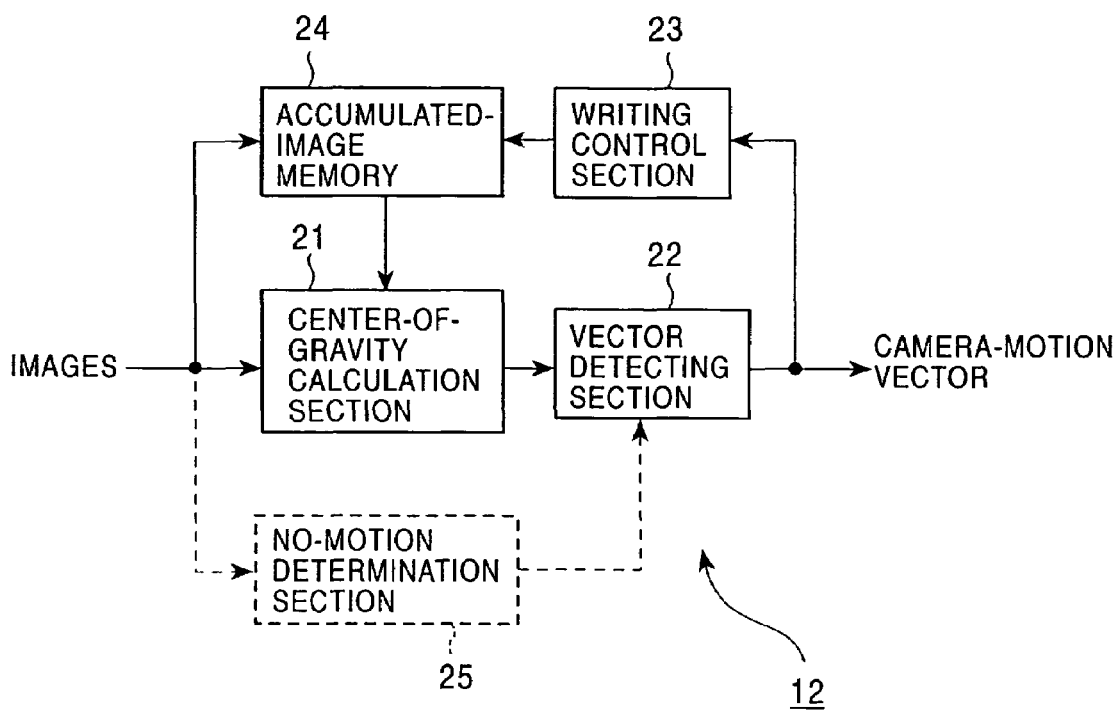
FIG. 5 is a block diagram showing an example structure of the camera-motion detecting section 12 shown in FIG. 2.

FIG. 5 shows an example structure of the camera-motion detecting section 12 shown in FIG. 2.

A center-of-gravity calculation section 21 receives the images stored in the accumulation section 11 (FIG. 2), in units of frames, and obtains the center of gravity in each frame, as described later. The center-of-gravity calculation section 21 specifies an area (hereinafter called, if necessary, a motion-detection area) used for detecting a camera-motion vector of a focus frame in an accumulated image, described later, stored in a accumulated-image memory 24, and obtains the center of gravity of the motion-detection area. The focus frame and the center of gravity of the motion-detection area obtained in the center-of-gravity calculation section 21 are sent to a vector detecting section 22.

The vector detecting section 22 detects the camera-motion vector of the focus frame according to the focus frame and the center of gravity of the motion-detection area sent from the center-of-gravity calculation section 21, and sends the camera-motion vector to the camera-motion-vector storage section 13 (FIG. 2) and to a writing control section 23.

The writing control section 23 controls an address at which the accumulated-image memory 24 stores the image data of the focus frame, according to the camera-motion vector sent from the vector detecting section 22. The accumulated-image memory 24 reads the image data of the focus frame from the accumulation section 11 (FIG. 2), and stores it at the address specified by the writing control section 23.

Camera-motion detecting processing for detecting a camera-motion vector, achieved by the camera-motion detecting section 12 shown in FIG. 5 will be described next by referring to FIGS. 6A to 6C.

In the camera-motion detecting processing achieved by the camera-motion detecting section 12, an idea that the center of gravity of an image is moved according to the motion of the used camera is employed. Basically, frames are positioned such that the centers of gravity of the frames match, and the upper left corner of each frame in the positioning state is detected as the camera-motion vector of each frame.

More specifically, if the n-th frame is set to the focus frame, the accumulated-image memory 24 has already stored an image (accumulated image) obtained by overlapping the image data of the first to (n−1)-th frames, which are the first frame to the frame immediately before the focus frame, in that order such that the background of each frame matches in position.

Figure 6A:
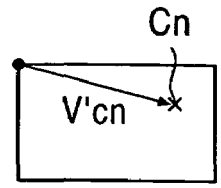
FIGS. 6A to 6C show how to obtain a camera-motion vector in the camera-motion detecting section 12 shown in FIG. 5.

In this case, the center-of-gravity calculation section 21 obtains the center $c_n$ of gravity of the n-th frame, which is the focus frame, as shown in FIG. 6A. The center-of-gravity calculation section 21 further specifies an area including the (n−1)-th frame and being larger than the (n−1)-th frame, which is one frame before the focus frame, in the accumulated image stored in the accumulated-image memory 24, as a motion-detection area, and obtains the center "c" of gravity of the (n−1)-th frame, as shown in FIG. 6B. An area which is larger than the (n−1)-th frame by any number of pixels in each of the right and left and upper and lower directions is set, for example, to the motion-detection area.

When the center $c_n$ of gravity of the focus frame and the center "c" of gravity of the motion-detection area are obtained, the vector detecting section 22 obtains the position of the upper left corner of the focus frame in a condition in which the center "c" of gravity of the motion-detection area matches the center $c_n$ of gravity of the focus frame, and outputs the coordinates of the position as the camera-motion vector $v_n$ of the n-th frame, which is the focus frame.

In other words, when the camera-motion vector $v_n$ of the n-th frame, which is set to the focus frame, is to be obtained, the camera-motion vectors of the frames up to the frame one frame before the n-th frame have already been obtained. As shown in FIG. 6C, when the position of the center "c" of gravity of the motion-detection area is indicated by a vector $v'_c$ with the upper left corner of the (n−1)-th frame being used as a reference, and the position of the center $c_n$ of gravity of the n-th frame is indicated by a vector $v'_{cn}$ with the upper left corner of the n-th frame being used as a reference, the coordinates of the upper left corner of the focus frame in the reference coordinate system indicate the camera-motion vector $v_n$ of the focus frame in a condition in which the center "c" of gravity of the motion-detection area matches the center $c_n$ of gravity of the focus frame. The camera-motion vector $v_n$ can be obtained by adding the vector $v'_c$ indicating the position of the center "c" of gravity of the motion-detection area to the camera-motion vector $v_{n-1}$ of the (n−1)-th frame, one frame before the focus frame, and then by subtracting the vector $V'_{cn}$ indicating the center $c_n$ of gravity of the focus frame therefrom. In other words, the camera-motion vector $v_n$ of the focus frame can be obtained by the expression of $v_n = v_{n-1} + v'_c - v'_{cn}$ After the camera-motion vector $v_n$ of the focus frame is obtained as described above, the writing control section 23 controls the writing address where the image data of the focus frame is written in the accumulated-image memory 24, according to the camera-motion vector $v_n$. More specifically, the image data of the focus frame is overwritten into the accumulated-image memory 24 such that the upper left corner of the focus frame is positioned at the point indicated by the camera-motion vector $v_n$ in the reference coordinate system. The image obtained by this writing is used as the accumulated image when the (n+1)-th frame is set to a focus frame and the camera-motion vector $v_{n+1}$ of the (n+1)-th frame is detected.

Figure 7:
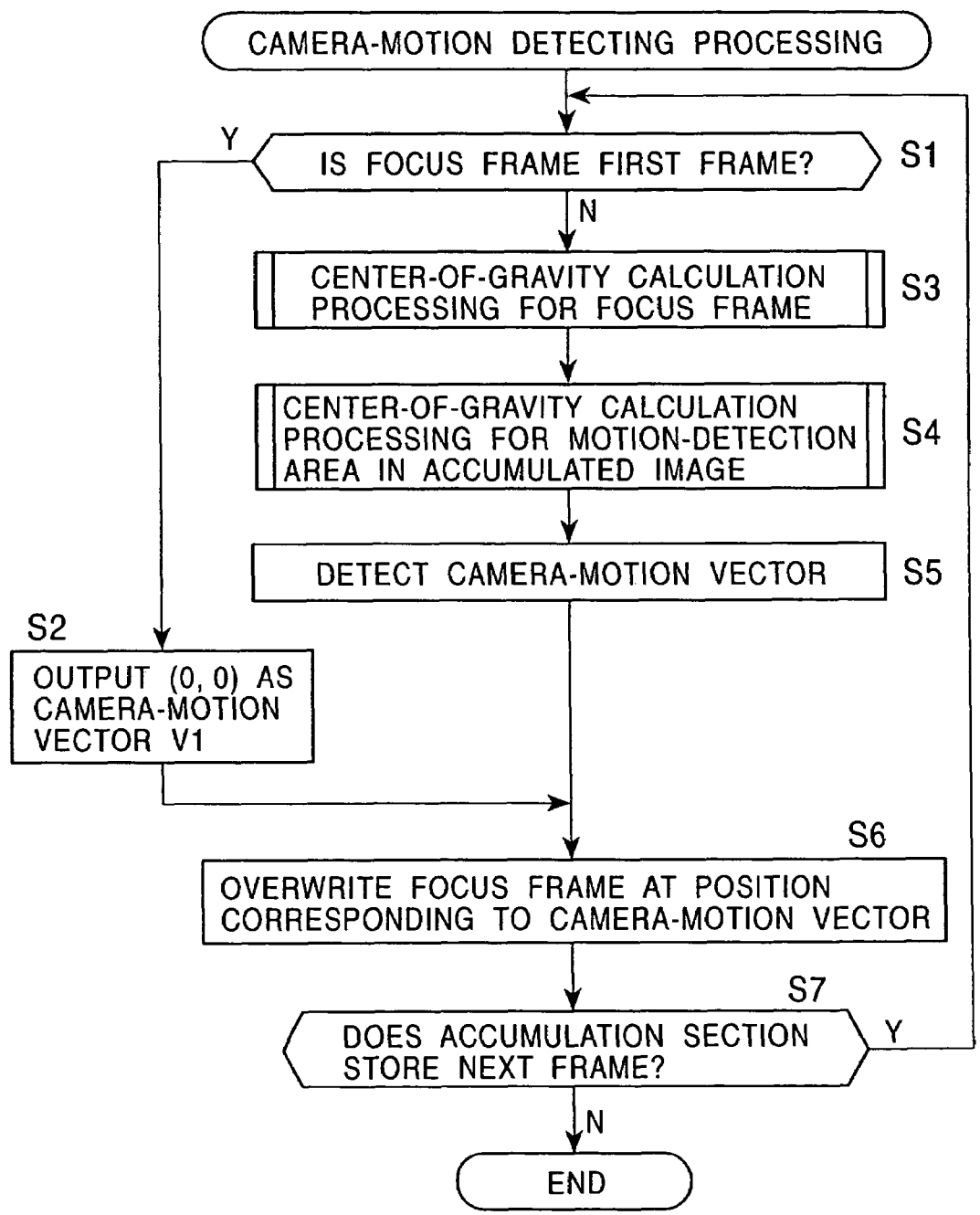
FIG. 7 is a flowchart of the camera-motion detecting processing of the camera-motion detecting section 12 shown in FIG. 5.

The camera-motion detecting processing achieved by the camera-motion detecting section 12 shown in FIG. 5 will be further described by referring to a flowchart shown in FIG. 7.

The first frame is read as a focus frame among the images stored in the accumulation section 11 and sent to the center-of-gravity calculation section 21, and the stored values of the accumulated-image memory 24 are cleared.

The center-of-gravity calculation section 21 determines in a step S1 whether the focus frame is the first frame. When it is determined in the step S1 that the focus frame is the first frame, the processing proceeds to a step S2. The vector detecting section 22 sets a camera-motion vector $v_1$ to 0 and outputs it to the camera-motion-vector storage section 13 and to the writing control section 23, and the processing proceeds to a step S6.

In the step S6, the writing control section 23 controls the writing address of the accumulated-image memory 24 according to the camera-motion vector sent from the vector detecting section 22, and writes the focus frame in the accumulated-image memory 24. In this case, since the focus frame is the first frame and the camera-motion vector $v_1$ is zero, the image data of the first frame is written into the accumulated-image memory 24 such that the upper left corner of the frame is positioned at the origin of the reference coordinate system.

Then, the processing proceeds to a step S7, and it is determined whether the accumulation section 11 stores the next frame. When it is determined that the next frame is stored, the next frame is read as a focus frame and sent to the center-of-gravity calculation section 21. The processing returns to the step S1, and the same processes as those described above are repeated.

When it is determined in the step S1 that the focus frame is not the first frame, in other words, when the focus frame is one of the second frame to the N-th frame, the processing proceeds to a step S3. The center-of-gravity calculation section 21 achieves center-of-gravity calculation processing for obtaining the center of gravity of the focus frame, and the processing proceeds to a step S4. In the step S4, the center-of-gravity calculation section 21 specifies a motion-detection area for the focus frame in the accumulated image stored in the accumulated-image memory 24, and executes the center-of-gravity calculation processing for obtaining the center of gravity of the motion-detection area, and the processing proceeds to a step S5.

Figure 6B:
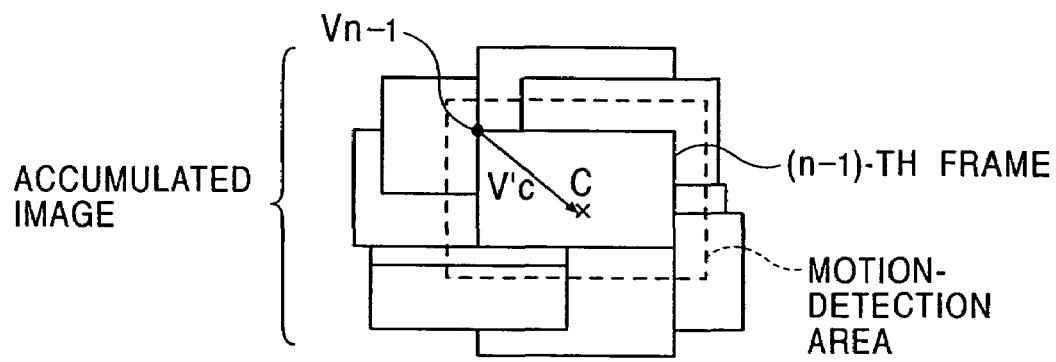
Figure 6C:
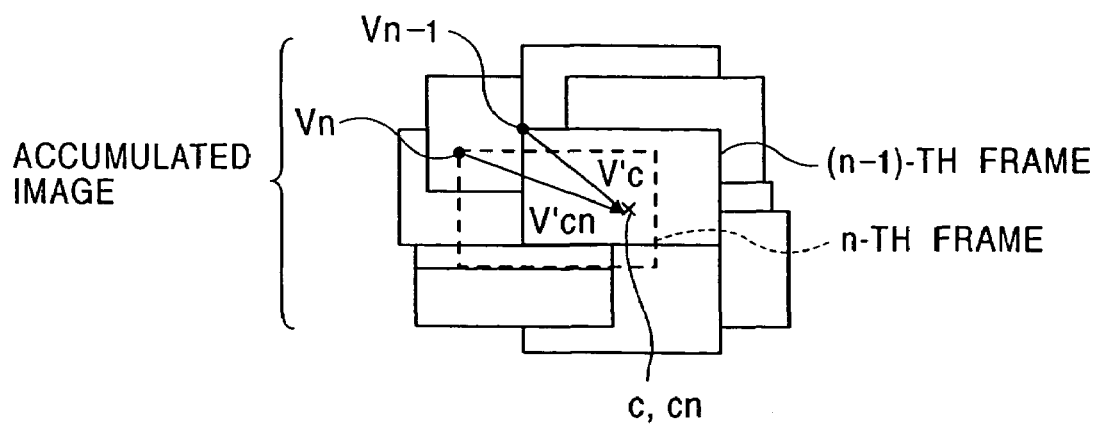

In the step S5, the vector detecting section 22 obtains the camera-motion vector of the focus frame by using the center of gravity of the focus frame obtained by the center-of-gravity calculation section 21 and the center of gravity of the motion-detection area, as described by referring to FIGS. 6A to 6C, and sends the vector to the camera-motion-vector storage section 13 and to the writing control section 23.

Then, the processing proceeds to the step S6. As described above, the writing control section 23 controls the writing address of the accumulated-image memory 24 according to the camera-motion vector sent from the vector detecting section 22, and writes the focus frame in the accumulated-image memory 24. In other words, the image data of the focus frame is overwritten into the accumulated-image memory 24 such that the upper left corner of the frame is positioned at the point indicated by the camera-motion vector of the focus frame in the reference coordinate system.

Then, the processing proceeds to the step S7. As described above, it is determined whether the accumulation section 11 stores the next frame. When it is determined that the next frame is not stored, in other words, when the camera-motion vector of each of the first to the N-th frames has been obtained, the camera-motion detecting processing is terminated.

The center-of-gravity calculation processing for the focus frame, executed by the center-of-gravity calculation section 21 in the step S3 shown in FIG. 7 will be described next in detail by referring to a flowchart shown in FIG. 8.

In a step S11, a variable X is set to the number of pixels disposed horizontally (horizontal direction) in the focus frame, and a variable Y is set to the number of pixels disposed vertically (vertical direction) in the focus frame. Then, the processing proceeds to a step S12.

In the step S12, a variable y indicating the y coordinate of each pixel in the focus frame is set to the initial value, for example, to −1. The processing proceeds to a step S13, and the variable y is incremented by 1.

The coordinates of each pixel constituting the focus frame are indicated in a coordinate system in which the origin is disposed at the upper left pixel, the direction from the origin to the right is set to the x-axis positive direction, and the direction from the origin to the bottom is set to the y-axis positive direction.

Then, the processing proceeds to a step S14, and it is determined whether the variable y is less than the number Y of pixels in the vertical direction of the focus frame. When it is determined in the step S14 that the variable y is less than the number Y, the processing proceeds to a step S15. A variable x is set to the initial value, for example, to −1, and the processing proceeds to a step S16.

In the step S16, the variable x is incremented by 1. Then, the processing proceeds to a step S17, and it is determined whether the variable x is less than the number X of pixels in the horizontal direction of the focus frame. When it is determined in the step S17 that the variable x is not less than the number X, the processing returns to a step S13, and the same processes as those described above are repeated.

When it is determined in the step S17 that the variable x is less than the number X, the processing proceeds to a step S18, and the pixel p(x, y) disposed at the coordinates (x, y) is set to a focus pixel and the focus pixel is classified into one of levels specified in advance, according to the pixel value.

In other words, in the present embodiment, levels are limited to several ranges smaller than a pixel-value range. When it is assumed, for example, the levels are limited to K ranges and the K ranges are sequentially called level 1, level 2, . . . , and level k from a range having the smallest pixel value, the focus pixel is classified into one of level 1 to level K according to the pixel value in the step S18.

In the step S18, the level classification result of the focus pixel is also input into a level table.

More specifically, the center-of-gravity calculation section 21 stores the level table in a built-in memory (not shown). In the level table, the number $f_k$ of pixels belonging to level k (k=1, 2, . . . , K) and the sum $\Sigma x_k$ of the x coordinates and the sum $\Sigma y_k$ of the y coordinates of the pixels belonging to level k are stored correspondingly to each level k, as shown in FIG. 9. When the pixel value of the focus pixel belongs to level k, for example, the center-of-gravity calculation section 21 increments the number $f_k$ for level k by 1, and adds the x coordinate and the y coordinate of the focus pixel to the sum $\Sigma x_k$ of the x coordinates and the sum $\Sigma y_k$ of the y coordinates, respectively, in the level table.

Figure 8:
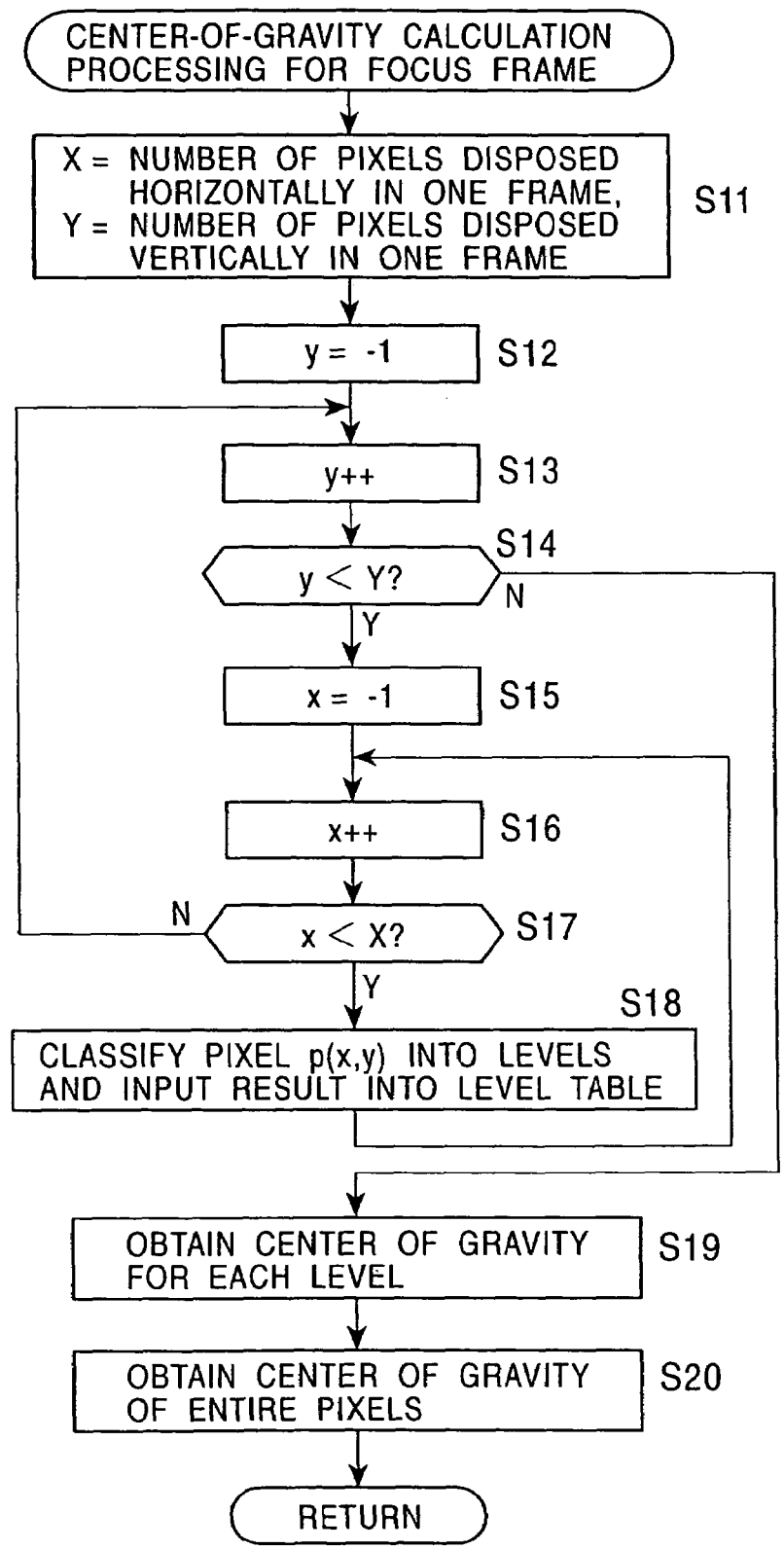
FIG. 8 is a flowchart of a detailed first example of the center-of-gravity calculation processing for a focus frame, executed in a step S3 shown in FIG. 7.

The number $f_k$ and the sums $\Sigma x_k$ and $\Sigma y_k$ of the level table are cleared to 0 every time when the processing shown in the flowchart of FIG. 8 starts.

Then, the processing returns of the step S16, and the same processes as those described above are repeated.

When it is determined in the step S14 that the variable y is not less than the number Y, in other words, when the processing has been executed with each pixel constituting the focus frame being set to a focus pixel and all pixels constituting the focus frame have been input into the level table, the processing proceeds to a step S19. The center of gravity of the pixels belonging to each level in the level table is obtained. More specifically, in the step S19, the sum $\Sigma x_k$ of the x coordinates and the sum $\Sigma y_k$ of the y coordinates in each level k in the level table are divided by the corresponding number $f_k$ and the coordinates $(\Sigma x_k/f_k, \Sigma y_k/f_k)$ indicated by the quotients are obtained as the center of gravity of the pixels belonging to each level k.

Then, the processing proceeds to a step S20. The center of gravity of the centers of gravity of the pixels belonging to level 1 to level K is obtained as the center of gravity of the entire image constituting the focus frame, and the processing returns.

More specifically, in the step S20, the weighted average of the centers of gravity of the pixels belonging to level 1 to level K is obtained, for example, with the corresponding numbers $f_1$ to $f_k$ being used as weights. The weighted average is output as the center of gravity of the entire image constituting the focus frame.

The center-of-gravity calculation processing executed by the center-of-gravity calculation section 21 in the step S4 shown in FIG. 7 will be described next in detail by referring to a flowchart shown in FIG. 10.

At first, in a step S31, a motion-detection area is specified. The area where the frame one frame before the focus frame has been written is detected in the accumulated image stored in the accumulated-image memory 24 in the step S31. The detected area is extended, for example, in the upper and lower and right and left directions each by a predetermined number of pixels and the extended area is specified as the motion-detection area.

Then, the processing proceeds to a step S32. A variable X is set to the number of pixels disposed horizontally in the motion-detection area, and a variable Y is set to the number of pixels disposed vertically in the motion-detection area. The processing proceeds to a step S33.

From the step S33 to a step S41, the same processes as those executed in the step S12 to the step S20 in FIG. 8 are performed. With these processes, the center of gravity of the entire pixels constituting the motion-detection area is obtained, and the processing returns.

As described above, the camera-motion detecting section 12 specifies the predetermined area, including the frame one frame before the focus frame, in the accumulated image as the motion-detection area, calculates the center of gravity of the motion-detection area and the center of gravity of the focus frame, obtains the camera-motion vector of the focus frame according to the centers of gravity, and writes the focus frame onto the accumulated image according to the camera-motion vector. These operations are repeated with the focus frame being changed. Therefore, camera-motion vectors are more easily obtained than in a case when so-called block matching is executed.

In the case shown in FIG. 7, the center of gravity of the focus frame is obtained in the step S3, and then the center of gravity of the motion-detection area is obtained in the step S4. Either of the center of gravity of the focus frame or that of the motion-detection frame may be obtained first, or both can be obtained at the same time.

In the case shown in FIG. 8, the center of gravity of the focus frame is obtained by classifying (hereinafter called level classification, if necessary) the pixels constituting the focus frame into several levels by their values. The pixels constituting the focus frame may be classified (hereinafter called class classification, if necessary) into several classes according to several pixels disposed around each of the pixels (several pixels may include each of the pixels or may not include it) to obtain the center of gravity of the focus frame.

Class classification will be briefly described. It is assumed, for example, that a total of five pixels formed of a focus pixel and four pixels adjacent to the focus pixel in the upper and lower and right and left directions form a tap (hereinafter called a class tap, if necessary) used for the class classification of the focus pixel. In this case, when a pixel value is indicated by one bit (either 0 or 1), for example, the focus pixel can be classified into one of 32 ($=(2^1)^5$) patterns by the total pixel values of the five pixels constituting the class tap of the focus pixel. These patterns form class classification.

About eight bits are generally assigned to a pixel. When eight bits are assigned to a pixel, if a class tap is formed of five pixels as described above and class classification is executed, the number of classes is as huge as $(2^8)^5$.

Class classification can be executed by applying L-bit adaptive dynamic range coding (ADRC) processing to the class tap of a focus pixel first, and by using the class tap obtained by the ADRC processing.

In the L-bit ADRC processing, for example, the maximum value MAX and the minimum value MIN of the pixel values of pixels constituting a class tap are detected, the difference DR=MAX−MIN between the maximum and minimum values is set to the dynamic range of the pixels constituting the class tap, and the pixels constituting the class tap are re-quantized into L bits according to this dynamic range DR. In other words, the minimum value is subtracted from the pixel values of the pixels constituting the class tap and the results are divided (quantized) by $DR/2^L$. Therefore, when the L-bit ADRC processing is applied to a class tap, the pixel value of each pixel constituting the class tap is indicated by L bits. When L is set to a number lower than the number of bits assigned to a pixel, the number of classes is reduced more than in a case in which class classification is performed without applying the ADRC processing to the class tap.

When the pixel disposed at the upper end, the lower end, the right end or the left end of a frame is set to a focus pixel, since a pixel adjacent to the focus pixel in the upper, lower, right, or left direction does not exist, a class tap is formed by assuming, for example, that the same frame is disposed symmetrically at the upper, lower, right, or left side.

The center-of-gravity calculation processing for the focus frame, executed by the center-of-gravity calculation section 21 in a case in which each pixel constituting the focus frame is class-classified according to the class tap of each pixel to obtain the center of gravity of the focus frame will be described below by referring to a flowchart shown in FIG. 11.

In this case, the same processes as those executed in the step S11 to the step S17 in FIG. 8 are performed in a step S51 to a step S57. In a step S58, corresponding to the step S18 in FIG. 8, the pixel p(x, y) disposed at coordinates (x, y) is set to a focus pixel, and the class tap of the focus pixel is formed. The focus pixel is class-classified into one of, for example, K classes according to the class tap, and the result of class classification is input to a class table.

Figure 11:
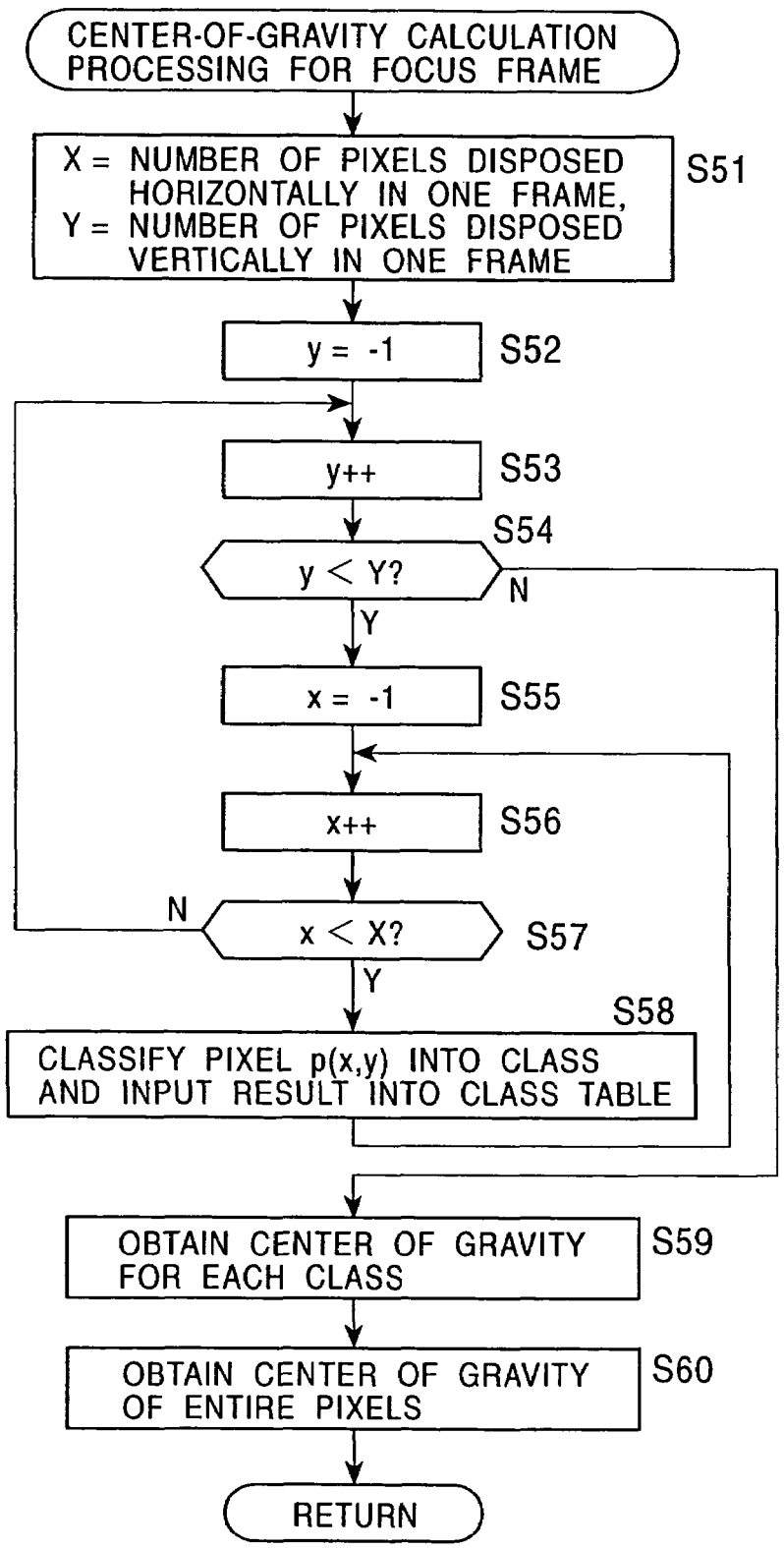
FIG. 11 is a flowchart of a detailed second example of the processing executed in the step S3 shown in FIG. 7.

More specifically, in the case shown in FIG. 11, the center-of-gravity calculation section 21 stores the class table in its built-in memory. In the class table, the number $f_k$ of pixels belonging to class k (k=1, 2, ..., K) and the sum $\Sigma x_k$ of the x coordinates and the sum $\Sigma y_k$ of the y coordinates of the pixels belonging to class k are stored correspondingly to each class k, as shown in FIG. 12. When the focus pixel belongs to class k, for example, the center-of-gravity calculation section 21 increments the number $f_k$ for class k by 1, and adds the x coordinate and the y coordinate of the focus pixel to the sum $\Sigma x_k$ of the x coordinates and the sum $\Sigma y_k$ of the y coordinates, respectively, in the class table.

The class table is cleared to 0 every time when the processing shown in the flowchart of FIG. 11 starts, like the level table.

After the process of the step S58, the processing returns of the step S56, and the same processes as those described above are repeated.

When it is determined in a step S54 that the variable y is not less than the number Y, the processing proceeds to a step S59. The center of gravity of the pixels belonging to each class in the class table is obtained. More specifically, in the step S59, the sum $\Sigma x_k$ of the x coordinates and the sum $\Sigma y_k$ of the y coordinates in each class k in the class table are divided by the corresponding number $f_k$ and the coordinates ($\Sigma x_k/f_k, \Sigma y_k/f_k$) indicated by the quotients are obtained as the center of gravity of the pixels belonging to each class k.

Then, the processing proceeds to a step S60. The center of gravity of the centers of gravity of the pixels belonging to class 1 to class K is obtained as the center of gravity of the entire pixels constituting the focus frame, and the processing returns.

More specifically, in the step S60, the weighted average of the centers of gravity of the pixels belonging to class 1 to class K is obtained, for example, with the corresponding numbers $f_1$ to $f_K$ being used as weights. The weighted average is output as the center of gravity of the entire pixels constituting the focus frame.

When each pixel constituting the focus frame is class-classified according to the class tap of each pixel to obtain the center of gravity of the focus frame, it is preferred that each pixel constituting a motion-detection area also be class-classified according to the class tap formed for each pixel to obtain the center of gravity of the motion-detection area.

Figure 10:
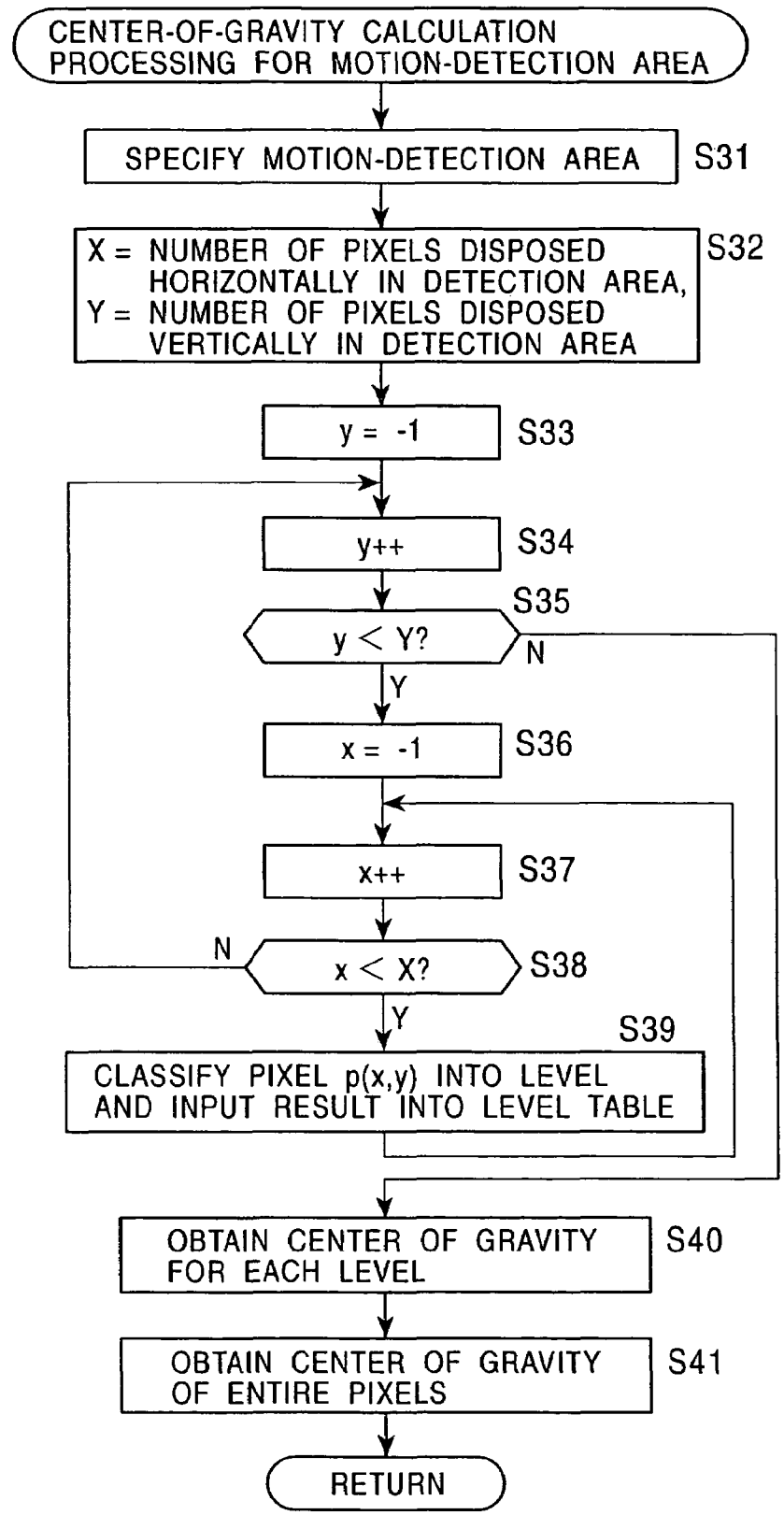
FIG. 10 is a flowchart of the details of the center-of-gravity calculation processing for a motion-detection area, executed in a step S4 shown in FIG. 7.

To obtain the center of gravity of the motion-detection area by class classification, the processes of the step S31 and the step S32 shown in the flowchart of FIG. 10 need to be executed in the processing illustrated by the flowchart of FIG. 11, instead of the process of the step S51. Since the other processes are the same as those shown in FIG. 11, a description thereof will be omitted.

In the case shown in FIG. 11, each pixel constituting a focus frame is class-classified according to the class tap of each pixel, and the centers of gravity of the pixels belonging to all classes obtained by the class classification are used to obtain the center of gravity of the focus frame. The center of gravity of the focus frame may be obtained only by the use of the pixels belonging to particular classes obtained by the class classification.

More specifically, the center of gravity of the focus frame can be obtained by setting classes which include, for example, pixels (hereinafter called edge pixels, if necessary) disposed at edges of an object, to edge classes and only by using the centers of gravity of pixels (edge pixels) belonging to the edge classes.

The center-of-gravity calculation processing for the focus frame, executed by the center-of-gravity calculation section 21 in a case in which only the center of gravity of edge pixels belonging to edge classes obtained from the result of the class classification of each pixel constituting the focus frame is used to obtain the center of gravity of the focus frame will be described below by referring to a flowchart shown in FIG. 13.

Also in this case, the same processes as those executed in the step S11 to the step S17 in FIG. 8 are performed in a step S71 to a step S77. In the step S77, when it is determined that a variable x is less than the number X, the processing proceeds to a step S78, the pixel p(x, y) disposed at coordinates (x, y) is set to a focus pixel, and the focus pixel is class-classified in the same way as in the step S58 shown in FIG. 11.

Then, the processing proceeds to a step S79, and it is determined whether the class obtained by the result of the class classification executed in the step S78 is an edge class, namely, whether the focus pixel is an edge pixel.

When 2-bit ADRC processing is applied and then class classification is applied to a class tap formed of five pixels, as described above, for example, a focus pixel is classified into one of 1024 (=$(2^2)^5$) classes. When 2-bit ADRC processing is applied to the class tap, the pixel value of each pixel constituting the class tap is 00B, 01B, 10B, or 11B (B indicates that figures placed before it are binary). Therefore, when the class tap is formed of a total of five pixels, the focus pixel and four pixels disposed adjacent to the focus pixel in the upper and lower and right and left directions, as described above, it is understood that the focus pixel is an edge pixel when the pixel value of the focus pixel is the minimum value, 00B, and the pixel values of the four pixels adjacent to the focus pixel in the upper and lower and right and left directions are other than 00B, and when the pixel value of the focus pixel is the maximum value, 11B, and the pixel values of the four pixels adjacent to the focus pixel in the upper and lower and right and left directions are other than 11B.

Figure 14A:
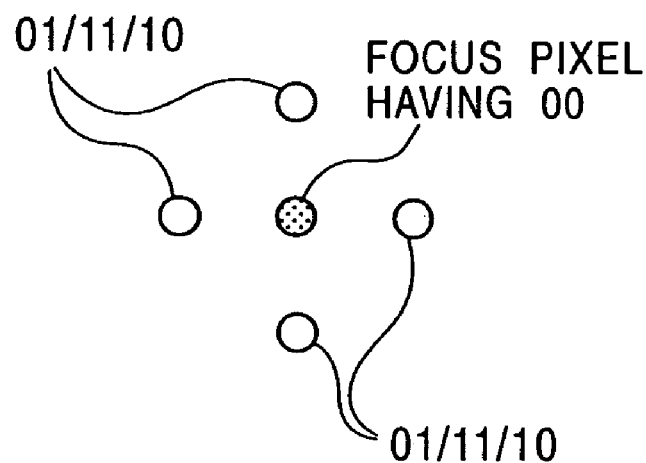
FIGS. 14A and 14B show edge pixels.
Figure 14B:
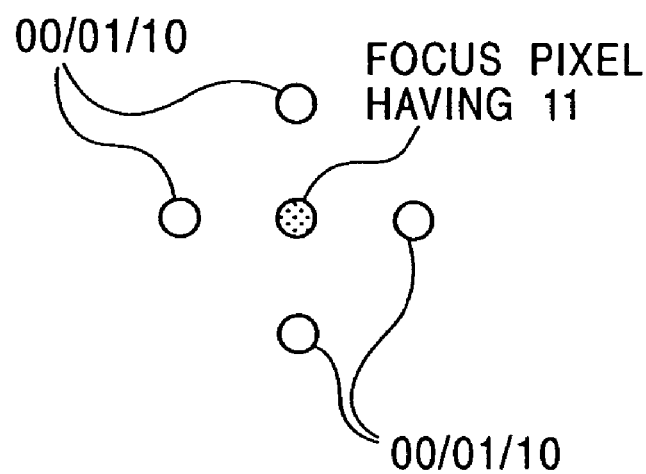

As shown in FIG. 14A, when the pixel value of the focus pixel is 00B and the pixel values of the four pixels adjacent to the focus pixel in the upper and lower and right and left directions are 01B, 10B, or 11B, the pixel values have a valley (bottom) at the focus pixel. As shown in FIG. 14B, when the pixel value of the focus pixel is 11B and the pixel values of the four pixels adjacent to the focus pixel in the upper and lower and right and left directions are 00B, 01B, or 10B, the pixel values have a summit (top) at the focus pixel. Therefore, in the case shown in FIGS. 14A and 14B, the focus pixel is an edge pixel.

There are 81 (=3×3×3×3) cases in which the pixel value of the focus pixel is 00B and the pixel values of the four pixels adjacent to the focus pixel in the upper and lower and right and left directions are 01B, 10B, or 11B. There are also 81 cases in which the pixel value of the focus pixel is 11B and the pixel values of the four pixels adjacent to the focus pixel in the upper and lower and right and left directions are 00B, 01B, and 10B. Therefore, there are 162 (=81+81) classes (edge classes) for edge pixels.

The edge pixels shown in FIGS. 14A and 14B are pixels having a maximal pixel value and a minimal pixel value. The present invention is not limited to these cases. An edge pixel may indicate, for example, a line edge of an image in which pixels disposed upper than a horizontal line are black and those disposed lower than the line are white. The line edge is not limited to a horizontal line. It may be a vertical line or a slanted line. Even when an image has almost the same value at most points, if an edge pixel having a maximal or minimal pixel value is used, it is more easily to detect it precisely than with other methods.

Referring back to FIG. 13, when it is determined in the step S79 that the focus pixel is not an edge pixel, namely, that the class of the focus pixel is not one of the above-mentioned 162 edge classes, the processing returns to a step S76.

When it is determined in the step S79 that the focus pixel is an edge pixel, namely, that the class of the focus pixel is one of the above-mentioned 162 edge classes, the processing proceeds to a step S80. The result of the class classification of the focus pixel is input to a class table. More specifically, in the step S80, the number $f_k$ for class k corresponding to the focus pixel is incremented by 1, and the x coordinate and the y coordinate of the focus pixel are added to the sum $\Sigma x_k$ of the x coordinates and the sum $\Sigma y_k$ of the y coordinates, respectively, in the class table shown in FIG. 12.

Figure 13:
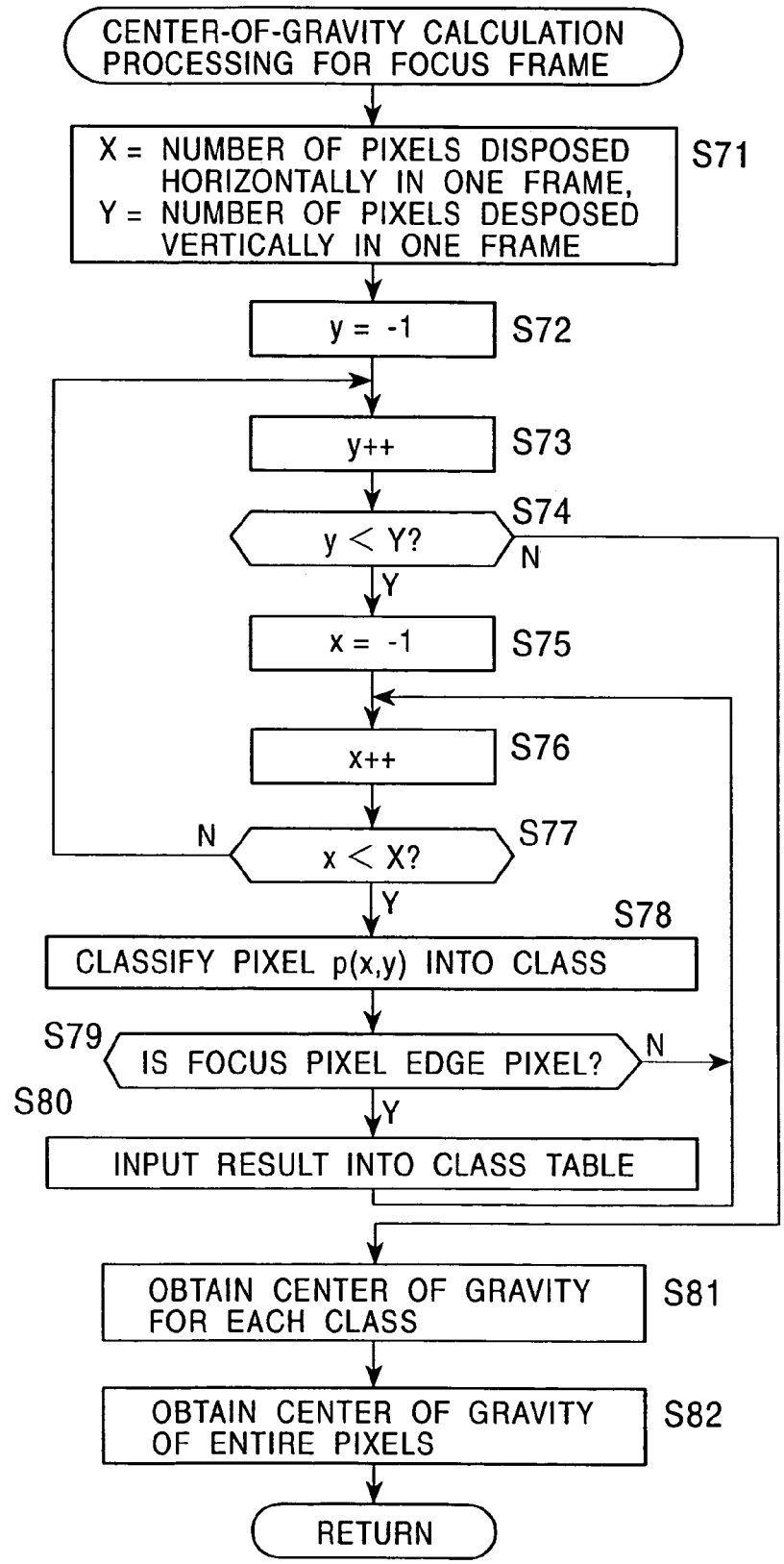
FIG. 13 is a flowchart of a detailed third example of the processing executed in the step S3 shown in FIG. 7.

In the case shown in FIG. 13, only the data of a focus pixel belonging to an edge class is input to the class table. When 2-bit ADRC processing is applied and then class classification is applied to a class tap formed of five pixels, as described above, and only the data of edge classes are input to the class table, for example, the number K of classes in the class table is the number of the edge classes described above, 162.

When 2-bit ADRC processing is applied and then class classification is applied to a class tap formed of five pixels and the data of all classes is input to a class table, since a focus pixel is classified into one of 1024 classes, as described above, the number K of classes in the class table is 1024.

Therefore, the size (capacity) of the class table is reduced more in the case shown in FIG. 13 than in the case shown in FIG. 11.

After the process of the step S80, the processing returns to the step S76, and the same processes as those described above are repeated.

When it is determined in a step S74 that the variable y is not less than the number Y, the processing proceeds to a step S81. The center of gravity of the pixels belonging to each edge class in the class table is obtained. More specifically, in the step S81, the sum $\Sigma x_k$ of the x coordinates and the sum $\Sigma y_k$ of the y coordinates in each edge class k in the class table are divided by the corresponding number $f_k$ and the coordinates ($\Sigma x_k/f_k$, $\Sigma y_k/f_k$) indicated by the quotients are obtained as the center of gravity of the pixels belonging to each edge class k.

Then, the processing proceeds to a step S82. The center of gravity of the centers of gravity of the pixels belonging to edge class 1 to edge class K is obtained as the center of gravity of the entire pixels constituting the focus frame, and the processing returns.

More specifically, in the step S82, the weighted average of the centers of gravity of the pixels belonging to edge class 1 to edge class K is obtained, for example, with the corresponding numbers $f_1$ to $f_K$ being used as weights. The weighted average is output as the center of gravity of the entire pixels constituting the focus frame.

When only the pixels belonging to edge classes are used among the pixels constituting a focus frame to obtain the center of gravity of the focus frame, it is preferred that only the pixels belonging to edge classes be used among the pixels constituting a motion-detection area to obtain the center of gravity of the motion-detection area.

To obtain the center of gravity of the motion-detection area by using only the pixels belonging to edge classes, the processes of the step S31 and the step S32 shown in the flowchart of FIG. 10 need to be executed in the processing illustrated by the flowchart of FIG. 13, instead of the process of the step S71. Since the other processes are the same as those shown in FIG. 13, a description thereof will be omitted.

When there is no camera motion between the focus frame and the frame one frame before the focus frame, the camera-motion vector of the focus frame should be the same as the camera-motion vector of the frame one frame before the focus frame. Since the movement of the foreground affects the camera-motion vector of a frame, as described above, however, even if the focus frame does not have camera motion, it is possible that the camera-motion vector of the focus frame differs from that of the frame one frame before the focus frame.

The camera-motion detecting section 12, shown in FIG. 5, can be configured such that a no-motion determination section 25 for determining whether there has been camera motion between the focus frame and the frame one frame before the focus frame is provided as indicated by dotted lines in the figure; and the vector detecting section 22 outputs the camera-motion vector of the frame one frame before the focus frame as the camera-motion vector of the focus frame when the focus frame has no camera motion, and obtains the camera-motion vector of the focus frame by the use of the center of gravity of the focus frame and the center of gravity of a motion-detection area, as described above, when the focus frame has camera motion.

With the above configuration, when the focus frame has no camera motion, the camera-motion vector of the focus frame is made equal to that of the frame one frame before the focus frame.

No-motion determination processing for determining whether the focus frame has camera motion, executed by the no-motion determination section 25 will be described below by referring to a flowchart shown in FIG. 15.

In the no-motion determination processing, the same processes as those executed in the step S71 to the step S79 in FIG. 13 are performed in a step S91 to a step S99.

When it is determined in the step S99 that the focus pixel is an edge pixel, the processing proceeds to a step S100. It is determined whether the pixel value p(x, y) of a focus pixel matches the pixel value p'(x, y), of the pixel disposed at the same position as the focus pixel in the frame one frame before the focus frame.

Matching of p(x, y) and p'(x, y) in the step S100 includes a case in which p(x, y) is almost equal to p'(x, y), namely, |p(x, y)−p'(x, y)| is equal to or less than a very small threshold.

When it is determined in the step S100 that the pixel value p(x, y) of the focus pixel does not match the pixel value p'(x, y) of the pixel disposed at the same position as the focus pixel in the frame one frame before the focus frame, the processing skips a step S101 and returns to a step S96.

When it is determined in the step S100 that the pixel value p(x, y) of the focus pixel matches the pixel value p'(x, y) of the pixel disposed at the same position as the focus pixel in the frame one frame before the focus frame, in other words, when it is determined that the pixel value p(x, y) of the focus pixel which is an edge pixel matches the pixel value p'(x, y) of the pixel disposed at the same spatial position as the focus pixel in the frame one frame before the focus frame, the processing proceeds to the step S101, a variable "c" is incremented, and the processing returns to the step S96.

Figure 15:
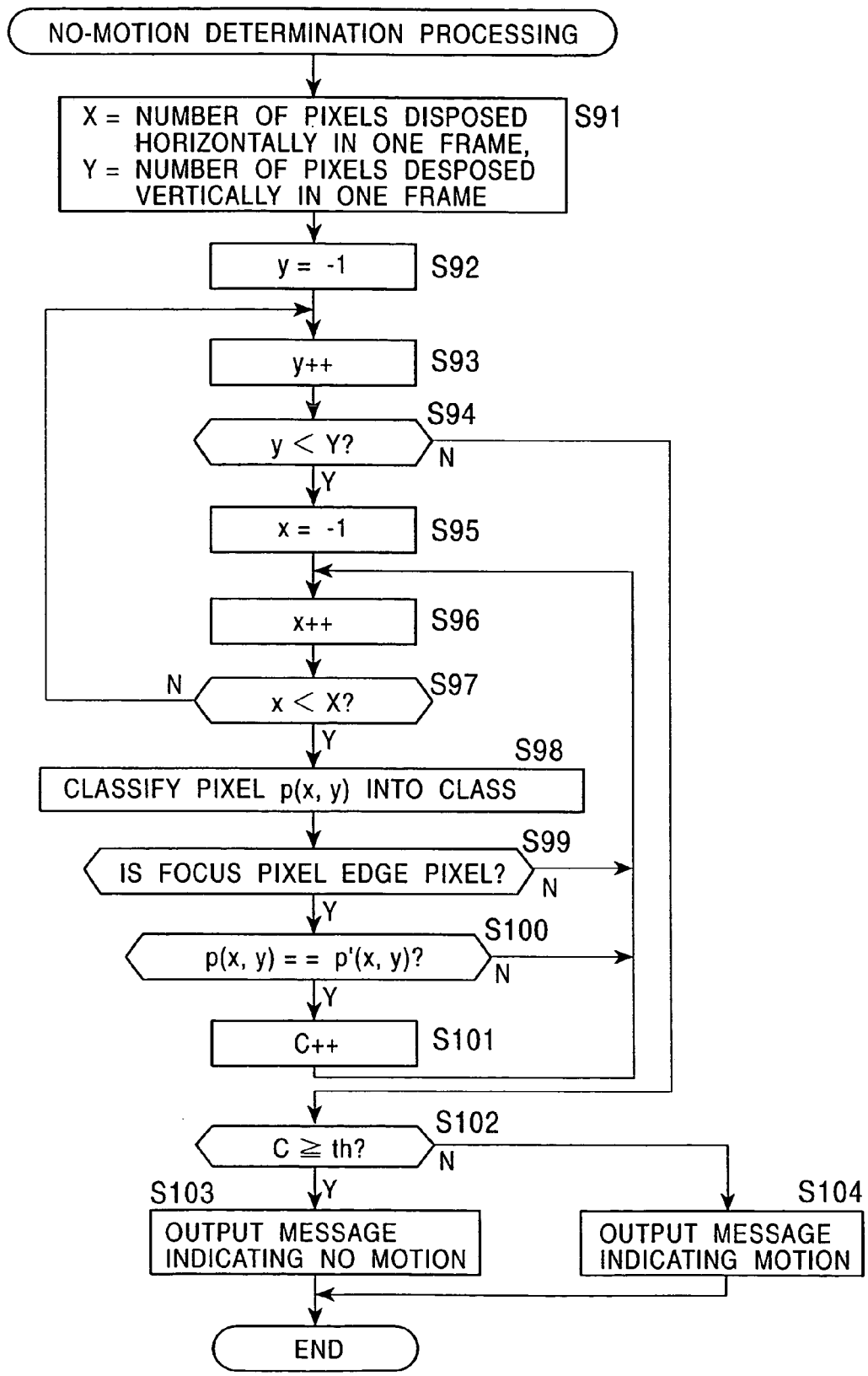
FIG. 15 is a flowchart of the details of the no-motion determination processing executed by a no-motion determination section 25 shown in FIG. 5.

The variable "c" is cleared to zero before the no-motion determination processing shown in FIG. 15 starts.

When it is determined in a step S94 that a variable y is not less than a number Y, in other words, when all pixels constituting the focus frame have already been processed as focus pixels, the processing proceeds to a step S102. It is determined whether the variable "c" is equal to or more than a threshold "th." When it is determined in the step S102 that the variable "c" is equal to or more than the threshold "th," in other words, when the number of pixels, among edge pixels in the focus frame, each of which has the almost the same value as the pixel disposed at the same position in the frame one frame before the focus frame is equal to or more than the threshold "th," the processing proceeds to a step S103. A message indicating no camera motion is output to the vector detecting section 22 as the result of the determination of whether there has been camera motion between the focus frame and the frame one frame between the focus frame, and no-motion determination processing is terminated.

When it is determined in the step S102 that the variable "c" is less than the threshold "th," in other words, when the number of pixels, among edge pixels in the focus frame, each of which has almost the same value as the pixel disposed at the same position in the frame one frame before the focus frame is less than the threshold "th," the processing proceeds to a step S104. A message indicating camera motion is output to the vector detecting section 22 as the result of the determination of whether there has been camera motion between the focus frame and the frame one frame between the focus frame, and no-motion determination processing is terminated.

The no-motion determination processing shown in FIG. 15 is executed prior to the processing for calculating the center of gravity of the focus frame and that of the motion-detection area, executed by the center-of-gravity calculation section 21, and then the second and subsequent frames are processed.

Figure 16:
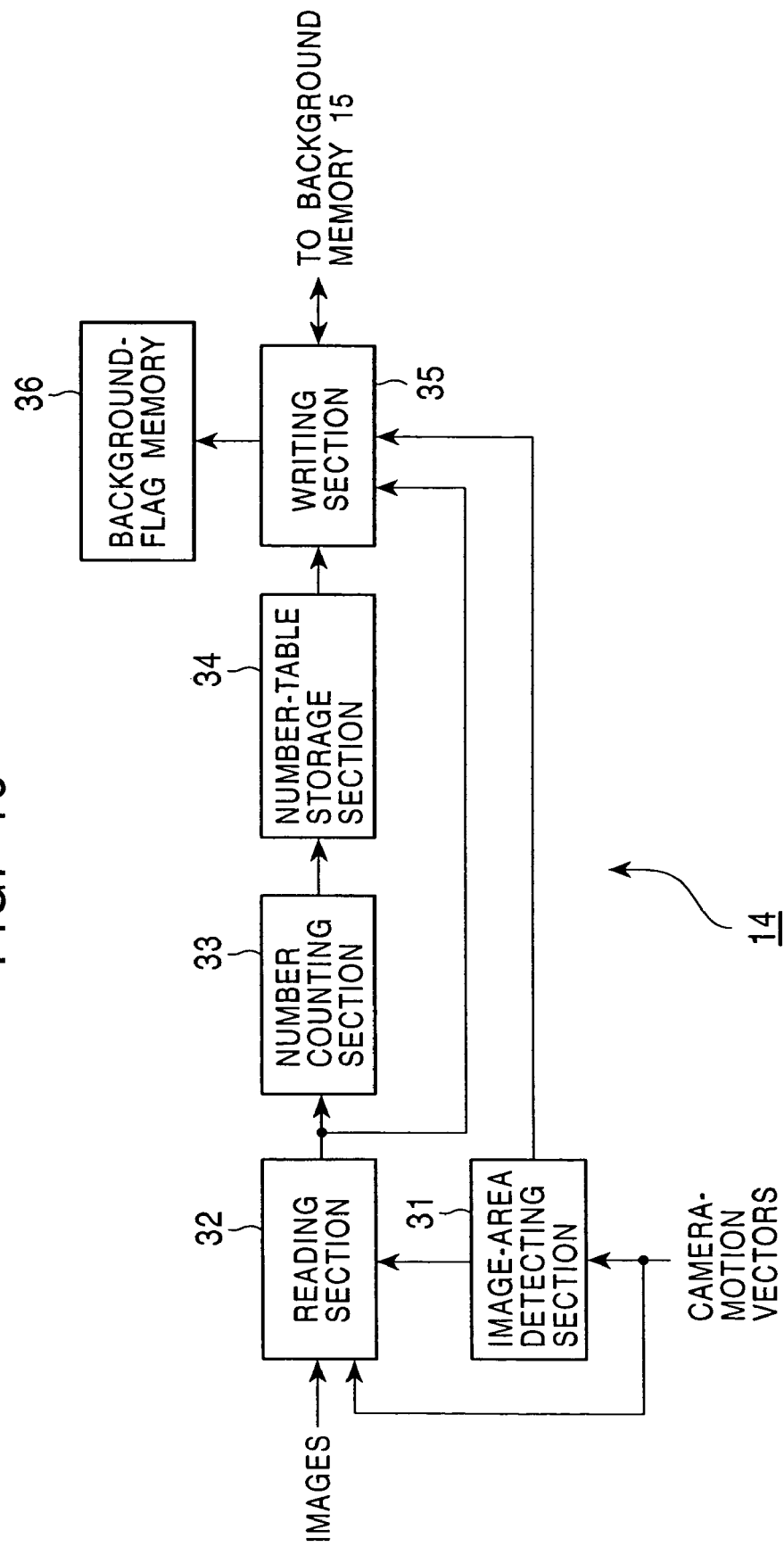
FIG. 16 is a block diagram showing an example structure of a background extracting section 14 shown in FIG. 2.

FIG. 16 shows an example structure of the background extracting section 14 shown in FIG. 2.

An image-area detecting section 31 receives the camera-motion vectors $v_1$ to $V_N$ stored in the camera-motion-vector storage section 13 (FIG. 2). The image-area detecting section 31 achieves the positioning of the backgrounds of the first to the N-th frames, and then detects the minimum rectangular area (image area) in which the first to the N-th frame images are fit in the reference coordinate system.

More specifically, the image-area detecting section 31 simulates a condition in which positioning is applied to the backgrounds of the first frame to the N-th frame according to the camera-motion vector $v_1$ to $V_N$ of the first to the N-th frames, achieves the positioning, and detects the minimum rectangular image area where the pixels of the first to the N-th frames are disposed. The image-area detecting section 31 also obtains, for example, the coordinates $(X_{min}, Y_{min})$ of the upper left corner and those $(X_{max}, Y_{max})$ of the lower right corner of the image area in the reference coordinate system, and sends them to a reading section 32 and to a writing section 35.

Figure 17:
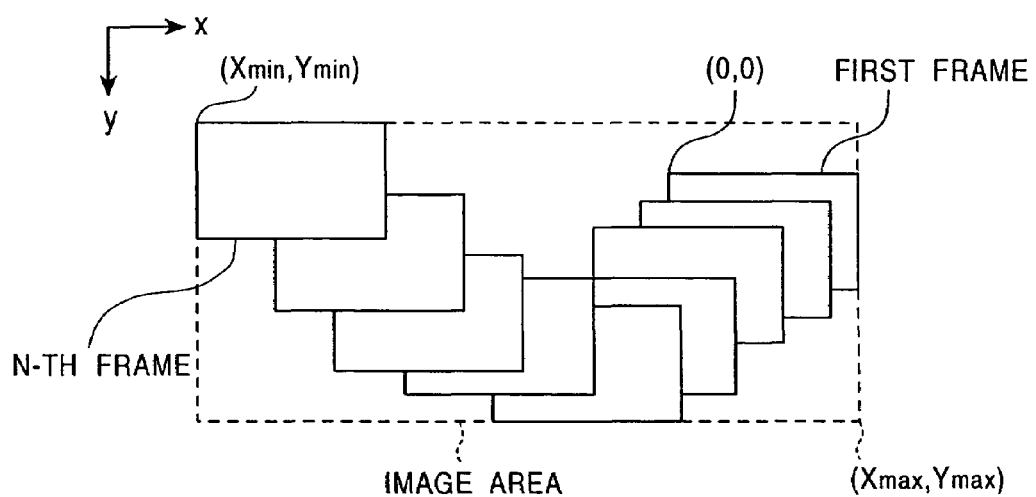
FIG. 17 is a view showing the processing of an image-area detecting section 31 shown in FIG. 16.

The condition in which positioning has been applied to the backgrounds of the first to the N-th frames can be simulated by arranging the first to the N-th frames such that the upper left corners of the first to the N-th frames are disposed at the coordinates indicated by the camera-motion vectors $v_1$ to $v_N$, respectively, in the reference coordinate system, as shown in FIG. 17.

The reading section 32 detects and reads pixels disposed at the same positions three-dimensionally among the pixels constituting the first to the N-th frames stored in the accumulation section 11 (FIG. 2), in the condition in which positioning has been applied to the backgrounds of the first to the N-th frames, and sends them to a number counting section 33 and to the writing section 35.

Figure 18:
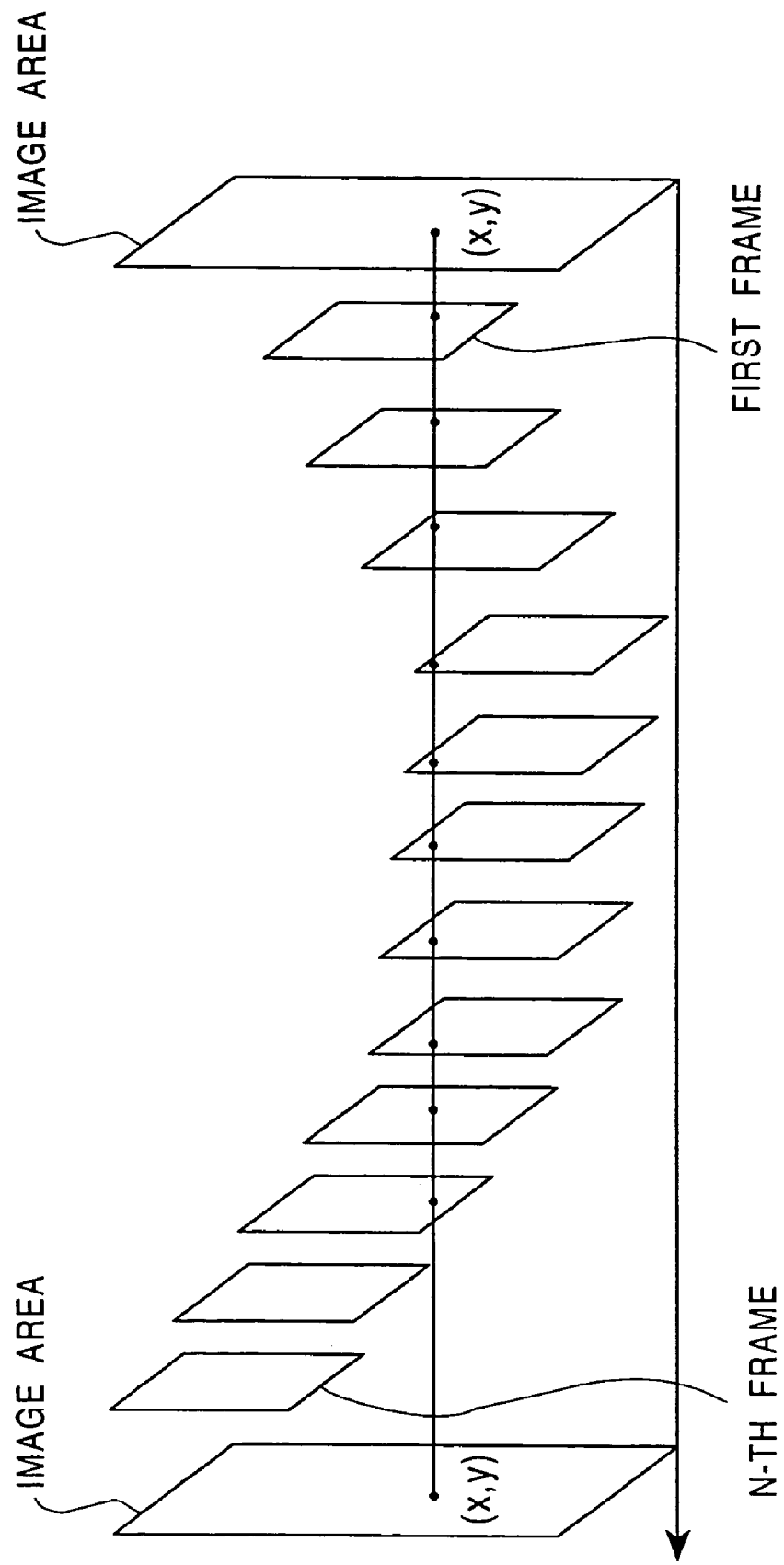
FIG. 18 is a view showing the processing of a reading section 32 shown in FIG. 16.

More specifically, the reading section 32 receives the coordinates $(X_{min}, Y_{min})$ and $(X_{max}, Y_{max})$ from the image-area detecting section 31 and the camera-motion vectors $v_1$ to $v_N$ stored in the camera-motion-vector storage section 13 (FIG. 2). In the same way as the image-area detecting section 31, the reading section 32 first simulates a condition in which positioning is applied to the backgrounds of the first frame to the N-th frame according to the camera-motion vector $v_1$ to $v_N$ of the first to the N-th frames. Then, the reading section 32 sequentially scans coordinates in the image area specified by the coordinates ($X_{min}$, $Y_{min}$) and ($X_{max}$, $Y_{max}$) sent from the image-area detection section 31 in the reference coordinate system, and detects and reads the pixels of the first to the N-th frames to which positioning has been applied to their backgrounds, at coordinates (x, y), as shown in FIG. 18.

The detection of the pixel disposed at the coordinates (x, y) in the reference coordinate system in the n-th frame in the condition in which positioning has been applied to the backgrounds of the first to the N-th frames can be achieved by the detection of the pixel disposed at the coordinates obtained by subtracting the camera-motion vector $v_n$ from the coordinates (x, y), in a local coordinate system in which the pixel disposed at the upper left corner of the n-th frame is set to the origin.

The number counting section 33 counts the number of pixels belonging, for example, to each of the above-described levels of pixel values for each set of pixels (hereinafter called same-position pixels in the positioning condition, if necessary) disposed at the same position three dimensionally, sent from the reading section 32, among the pixels constituting the first to the N-th frames in the condition in which positioning has been applied to the backgrounds of the first to the N-th frames. The number counting section 33 inputs the result of counting to a number table stored in a number-table storage section 34 disposed at the subsequent stage.

The number-table storage section 34 stores, for example, a number table shown in FIG. 19. More specifically, the number-table storage section 34 stores a number table in which each level of the pixel values of the same-position pixels in the positioning condition corresponds to the rate of the number of pixels belonging to each level to the number of the same-position pixels in the positioning condition for each point of coordinates (x, y) in the image area.

A pixel-value level having the m-th-magnitude number in the sets of the same-position pixels in the positioning condition at a position (of coordinates) in the image area is called the m-th-number level.

In the case shown in FIG. 19, the number table stores M levels from the first-number level to the M-th-number level and the corresponding rates. Therefore, the number counting section 33 discards the result of counting related to the (M+1)-th-number level and subsequent levels without inputting them into the number table. The result of counting related to all levels can be input into the number table.

As described above, when a pixel-value range is divided into K levels, the number M should be the number K or less.

The writing section 35 writes the background pixels constituting the common background in the background memory 15 (FIG. 2) at the addresses corresponding to the image area sent from the image-area detecting section 31, according to the number table stored in the number-table storage section 34 and the pixels sent from the reading section 32. The writing section 35 also writes a background flag in a background-flag memory 36.

The background-flag memory 36 stores a background flag indicating whether a background pixel has been written for each pixel in the image area. More specifically, when the writing section 35 writes a background pixel at an address in the background memory 15, it writes a background flag in the background-flag memory at the address corresponding to the address where the background pixel has been written. It is assumed, for example, that a background flag is a one-bit flag, a background flag is set to 1 if a background pixel has been written in the corresponding address, and a background flag is set to 0 if a background pixel has not yet been written in the corresponding address.

Background extracting processing for extracting the common background from the first to the N-th frames, executed by the background extracting section 14 shown in FIG. 16 will be described next by referring to a flowchart shown in FIG. 20.

At first, in a step S111, the image-area detecting section 31 reads the camera-motion vectors from the camera-motion-vector storage section 13 and detects the image area as described by referring to FIG. 17. The image-area detection section 31 sends the coordinates ($X_{min}$, $Y_{min}$) of the upper left corner of the image area and the coordinates ($X_{max}$, $Y_{max}$) of the lower right corner in the reference coordinate system to the reading section 32 and to the writing section 35 as information for identifying the image area.

When the reading section 32 receives the coordinates ($X_{min}$, $Y_{min}$) and ($X_{max}$, $Y_{max}$) for identifying the image area, a variable y used for scanning the image area in the y-axis direction of the reference coordinate system is set to the initial value, $Y_{min}-1$, in a step S112. The processing proceeds to a step S113, and the variable y is incremented by 1. The processing proceeds to a step S114. It is determined in the step S114 whether the variable y is equal to or less than $Y_{max}$. When it is determined that the variable y is equal to or less than $Y_{max}$, the processing proceeds to a step S115. The reading section 32 sets a variable x used for scanning the image area in the x-axis direction of the reference coordinate system to the initial value, $X_{min}-1$, in the step S115. The processing proceeds to a step S116, and the variable x is incremented by 1. The processing proceeds to a step S117. It is determined in the step S117 whether the variable x is equal to or less than $X_{max}$. When it is determined in the step S117 that the variable x is not equal to or less than $X_{max}$, the processing returns to the step S113. The same processes as those described are repeated.

When it is determined in the step S117 that the variable x is equal to or less than $X_{max}$, the processing proceeds to a step S118. A variable n used for counting the number of frames from the first to the N-th frames serving as a series of images stored in the accumulation section 11 (FIG. 2) is set to the initial value, 0. The processing proceeds to a step S119. The variable n is incremented by 1 in the step S119. The processing proceeds to a step S120, and it is determined whether the variable n is equal to or less than the number N of frames of the series of images stored in the accumulation section 11 (FIG. 2).

When it is determined in the step S120 that the variable n is equal to or less than the number N, the processing proceeds to a step S121. The reading section 32 reads the pixel disposed at the position of coordinates (x, y) in the n-th frame in the reference coordinate system from the accumulation section 11 (FIG. 2) in the condition in which positioning has been applied to the backgrounds of the first to the N-th frames. More specifically, the reading section 32 reads the pixel disposed at the coordinates (x, y)-$v_n$, obtained by subtracting the camera-motion vector $v_n$ from the coordinates (x, y), in the local coordinate system in which the pixel disposed at the upper left corner of the n-th frame is set to the origin, from the accumulation section 11 (FIG. 2).

When the x coordinate and the y coordinate of the camera-motion vector $v_n$ are indicated by $x_{v\#n}$ and $y_{v\#n}$, respectively, and the numbers of pixels in the horizontal and vertical directions in one frame are indicated by X and Y, respectively, the reading section 32 reads the pixel disposed at the coordinates ($x-x_{v\#n}$, $y-y_{v\#n}$) in the local coordinate system of the n-th frame. In this case, any pixel in the n-th frame is not disposed at coordinates ($x-x_{v\#n}$, $y-y_{v\#n}$) outside the area of $0 \leq x-x_{v\#n} < X$ and $0 \leq y-y_{v\#n} < Y$. Therefore, the pixels of the n-th frame are read in the step S121 only inside the area of $0 \leq x-x_{v\#n} < x$ and $0 \leq y-y_{v\#n} < Y$.

When the reading section 32 reads the pixel in the n-th frame from the accumulation section 11 (FIG. 2) and sends the pixel to the number counting section 33 and to the writing section 35 in the step S121, the processing returns to the step S119. The processes from the step S119 to the step S121 are repeated until it is determined in the step S120 that the variable n is larger than the number N. With these processes, the pixels (same-position pixels in the positioning condition) disposed at the coordinates (x, y) in the first to the N-th frames in the reference coordinate system in the condition in which positioning has been applied to the backgrounds of the first to the N-th frames are sent to the number counting section 33 and to the writing section 35. As described above, some frames do not have a pixel at the coordinates (x, y) in the reference coordinate system. In this case, the pixels sent to the number counting section 33 and to the writing section 35 do not include a pixel in those frames.

When it is determined in the step S120 that the variable n is larger than the number N, the processing proceeds to a step S122. The number counting section 33 classifies the pixels disposed at the coordinates (x, y) in the first to the N-th frames in the reference coordinate system in the condition in which positioning has been applied to the backgrounds of the first to the N-th frames, which are sent from the reading section 32, into, for example, levels 1 to K by their values. The number counting section 33 also counts the number of pixels belonging to each level and obtains the rate of each number (to the total number of pixels-belonging to all levels).

The processing proceeds to a step S123, and the number counting section 33 inputs the first to the M-th levels (first-number level to M-th-number level) in the magnitudes of the rates of the numbers and the rate of the number of pixels belonging to each level into the number table shown in FIG. 19 at the row of the coordinates (x, y), stored in the number-table storage section 34. Then, the processing returns to the step S116.

When it is determined in the step S114 that the variable y is not equal to or less than $Y_{max}$, in other words, when the processing has been finished for all coordinates within the image area, the processing proceeds to a step S124. The writing section 35 executes background-pixel extracting processing: the writing section 35 detects coordinates where the rate of the number of pixels belonging to the first-number level is equal to or more than a predetermined value in the number table stored in the number-table storage section 34 and writes the pixel value corresponding to the first-number level at the address corresponding to the coordinates in the background memory 15 as the pixel value of a background pixel. Then, the processing proceeds to a step S125. In the step S125, the writing section 35 executes background extension processing for writing the pixel value of a background pixel at coordinates within the image area, where pixel values have not been written in the background-pixel extracting processing performed in the step S124, and terminates the background extracting processing.

The background-pixel extracting processing executed by the writing section 35 in the step S124 shown in FIG. 20 will be described next by referring to a flowchart shown in FIG. 21.

Figure 20:
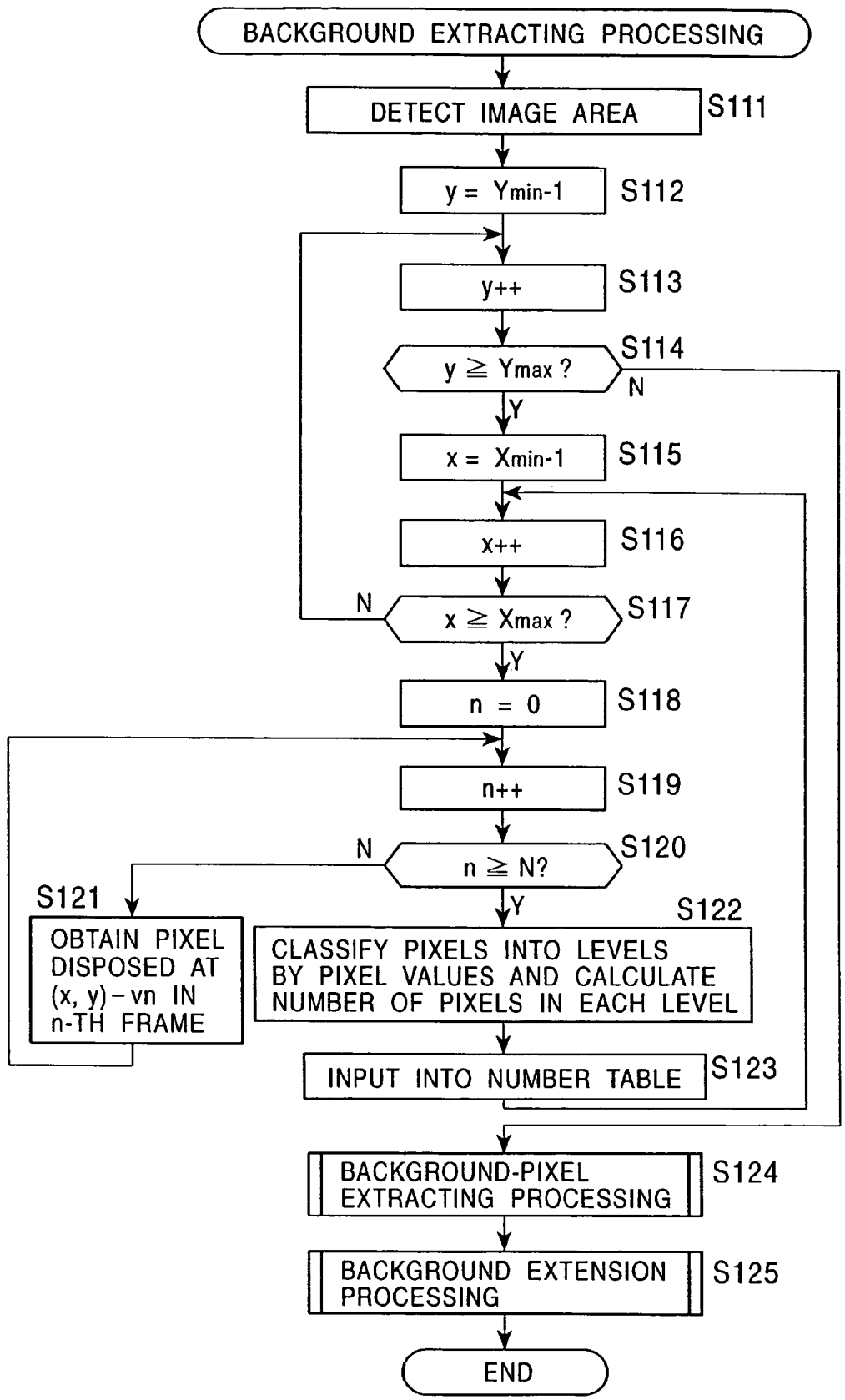
FIG. 20 is a flowchart of the background extracting processing of the background extracting section 14 shown in FIG. 16.

In the background-pixel extracting processing, the same processes as those executed in the step S112 to the step S117 shown in FIG. 20 are performed in a step S131 to a step S136. When it is determined in the step S136 that the variable x is equal to or less than $X_{max}$, the processing proceeds to a step S137. It is determined whether the rate of the first-number level for coordinates (x, y) is equal to or more than a threshold $L_{th}$ by referring to the number table.

When it is determined in the step S137 that the rate of the first-number level for coordinates (x, y) is not equal to or more than the threshold $L_{th}$, in other words, when the rate of the maximum number of pixels having an identical pixel value and disposed at the coordinates (x, y) among the pixels constituting the first to the N-th frames obtained in the condition in which positioning has been applied to the backgrounds of the first to the N-th frames is not high, the processing skips a step S138 and a step S139, and returns to a step S135.

Therefore, in this case, the pixel value of a background pixel is not written in the background memory 15 (FIG. 2) at the address corresponding to the coordinates (x, y) in the image area.

When it is determined in the step S137 that the rate of the first-number level for the coordinates (x, y) is equal to or more than the threshold $L_{th}$, in other words, when the rate of the maximum number of pixels having an identical pixel value and disposed at the coordinates (x, y) among the pixels constituting the first to the N-th frames obtained in the condition in which positioning has been applied to the backgrounds of the first to the N-th frames is high, the processing proceeds to the step S138. The writing section 35 writes the pixel value for which the rate of the number is high in the background memory 15 as the pixel value of the background pixel disposed at the coordinates (x, y).

More specifically, the writing section 35 extracts pixels belonging to the first-number level among the pixels disposed at the coordinates (x, y) in the first to the N-th frames obtained when positioning has been applied to the backgrounds of the first to the N-th frames from the pixels sent from the reading section 32, and for example, calculates the average thereof. The writing section 35 writes the average in the background memory 15 as the pixel value of the background pixel disposed at the coordinates (x, y).

When the process of the step S138 is finished, the processing proceeds to the step S139. The writing section 35 sets the background flag stored in the background-flag memory 36 at the address corresponding to the coordinates (x, y) to 1 (sets the background flag), and the processing returns to the step S135. The same processes as those described above are repeated until it is determined in a step S133 that the variable y is not equal to or less than $Y_{max}$.

When it is determined in the step S133 that the variable y is not equal to or less than $Y_{max}$, the processing returns.

Figure 21:
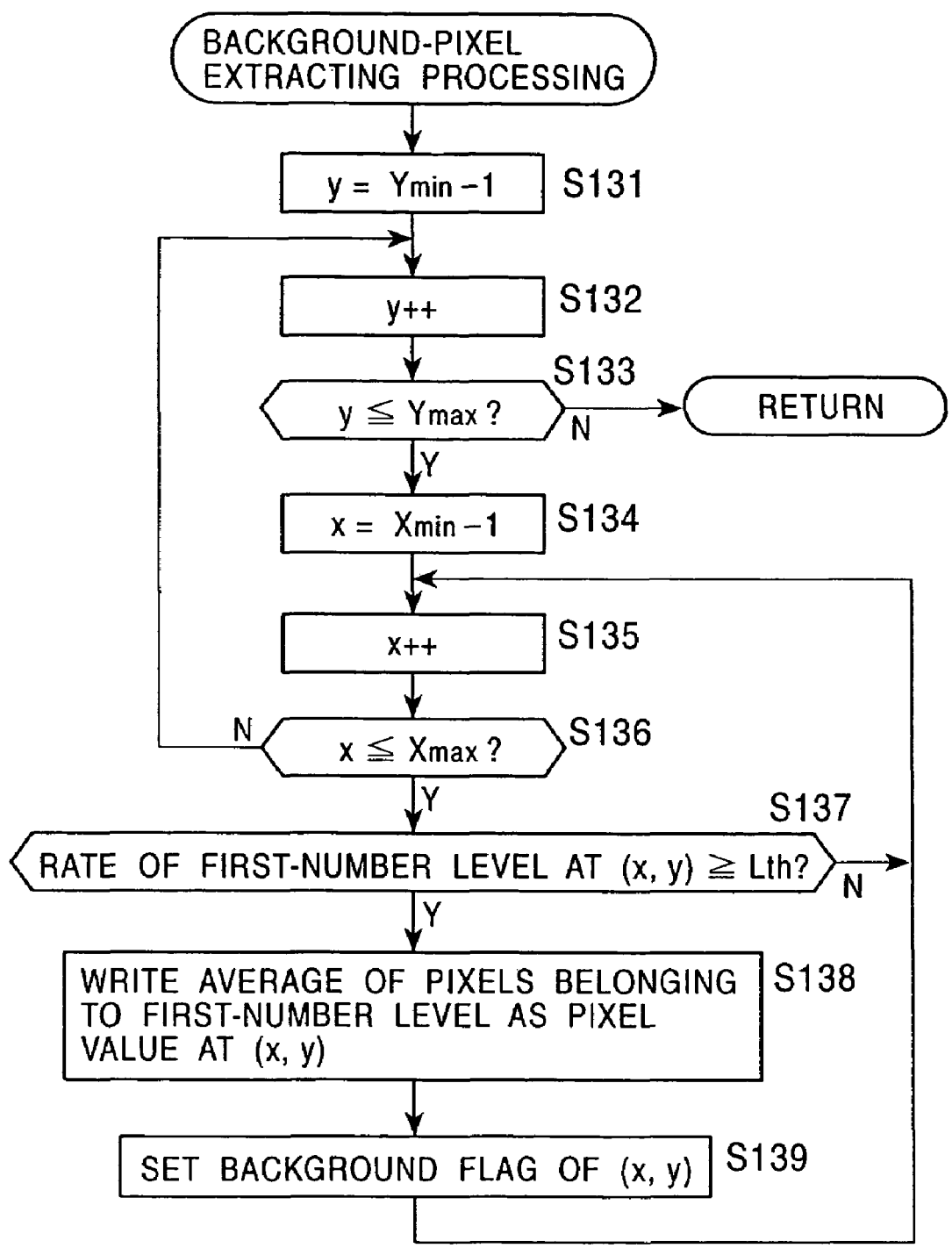
FIG. 21 is a flowchart of the details of the background-pixel extracting processing executed in a step S124 shown in FIG. 20.

The values stored in the background-flag memory 36 are cleared to zero, for example, when the background-pixel extracting processing shown in FIG. 21 starts.

In the background-pixel extracting processing shown in FIG. 21, as described above, when the rate of the maximum number of pixels having an identical pixel value and disposed at the coordinates (x, y) among the pixels constituting the first to the N-th frames obtained in the condition in which positioning has been applied to the backgrounds of the first to the N-th frames is not high, a background pixel value is not written at the address corresponding to the coordinates (x, y).

In other words, in the background-pixel extracting processing, when the rate of the maximum number of pixels having an identical pixel value and disposed at the coordinates (x, y) among the pixels constituting the first to the N-th frames obtained in the condition in which positioning has been applied to the backgrounds of the first to the N-th frames is high, the pixel value for which the rate of the maximum number is high is written in the background memory 15 as a likely pixel value of the common background disposed at the coordinates (x, y). Therefore, if the pixel value corresponding to the maximum number of pixels is not a likely pixel value of the common background disposed at the coordinates (x, y), in other words, when the rate of the maximum number of pixels having an identical pixel value and disposed at the coordinates (x, y) among the pixels constituting the first to the N-th frames obtained in the condition in which positioning has been applied to the backgrounds of the first to the N-th frames is not high, a pixel value of the common background is not written in the background memory 15 at the address corresponding to the coordinates (x, y) in the background-pixel extracting processing.

As a result, the common background formed in the background-pixel extracting processing when pixel values are written in the background memory 15 is in a "vermicular" state and no-pixel-value portions need to be filled with. To this end, in the background extracting processing, when the background-pixel extracting processing (FIG. 21) is executed in the step S124, the background extension processing in which the background is extended by filling no-pixel-value portions with pixel values is executed in the step S125.

The background extension processing executed in the step S125 shown in FIG. 20 will be described below by referring to a flowchart shown in FIG. 22.

In the background extension processing, a variable y is set to the initial value, $Y_{min}-1$, in a step S141. The processing proceeds to a step S142, and the variable y is incremented by 1. Then, the processing proceeds to a step S143. It is determined in the step S143 whether the variable y is equal to or less than $Y_{max}$. When it is determined that the variable y is equal to or less than $Y_{max}$, the processing proceeds to a step S145. In the step S145, a variable x is set to the initial value, $X_{min}-1$. The processing proceeds to a step S146, and the variable x is incremented by 1. Then, the processing proceeds to a step S147. It is determined in the step S147 whether the variable x is equal to or less than $X_{max}$. When it is determined that the variable x is not equal to or less than $X_{max}$, the processing returns to a step S142. The same processes as those described are repeated.

When it is determined in the step S147 that the variable x is equal to or less than $X_{max}$, the processing proceeds to a step S148. It is determined whether a background flag stored in the background-flag memory 36 at the address corresponding to the coordinates (x, y) is 0. When it is determined in th step S148 that the background flag stored in the background-flag memory 36 at the address corresponding to the coordinates (x, y) is not 0, namely, that the background flag is 1, and therefore when a pixel value has already been written in the background memory 15 (FIG. 2) at the address corresponding to the coordinates (x, y) as the common background, the processing returns to the step S146, and the same processes as those described above are repeated.

When it is determined in th step S148 that the background flag stored in the background-flag memory 36 at the address corresponding to the coordinates (x, y) is 0, in other words, when a pixel value of the common background has not yet been written in the background memory 15 (FIG. 2) at the address corresponding to the coordinates (x, y), the processing proceeds to the step S149, and it is determined whether the background flag of at least one of pixels around the pixel disposed at the coordinates (x, y), such as the pixels adjacent to the pixel disposed at the coordinates (x, y) in the upper, lower, right, left, upper right, upper left, lower right, and lower left directions, is 1 by referring to the background-flag memory 36.

When it is determined in the step S149 that none of pixels adjacent to the pixel disposed at the coordinates (x, y) has a background flag of 1, in other words, when a pixel value of the common background has not yet been written in the background memory 15 (FIG. 2) at any of the addresses corresponding to coordinates (x, y−1), (x, y+1), (x−1, y), (x+1, y), (x−1, y−1), (x−1, y+1), (x+1, y−1), and (x+1, y+1), the processing returns to the step S146.

When it is determined in the step S149 that the background flag of any of pixels adjacent to the pixel disposed at the coordinates (x, y) is 1, in other words, when a pixel value has already been written in the background memory 15 (FIG. 2) at any of the addresses corresponding to the coordinates (x, y−1), (x, y+1), (x−1, y), (x+1, y), (x−1, y−1), (x−1, y+1), (x+1, y−1), and (x+1, y+1) as the common background, the processing proceeds to the step S150.

A pixel for which a pixel value has been written as the common background among pixels adjacent to the pixel disposed at the coordinates (x, y) is hereinafter called an already-written adjacent pixel, if necessary.

It is determined in the step S150 whether the level of a pixel value continuous with the pixel value of an already-written adjacent pixel has been input into the number table as any of the first-number to the M-th-number levels for the coordinates (x, y). A pixel value continuous with another pixel value means similar pixel values (including an identical pixel value).

When it is determined in the step S150 that the level of a pixel value continuous with the pixel value of an already-written adjacent pixel has been input into the number table as any of the first-number to the M-th-number levels for the coordinates (x, y), in other words, when pixels having a pixel value continuous with the pixel value of an already-written adjacent pixel are found at a predetermined-rate or more among the pixels disposed at the coordinates (x, y) constituting the first to the N-th frames in the condition in which positioning has been applied to the backgrounds of the first to the N-th frames, the processing proceeds to a step S151. A pixel value of the common background is calculated for the pixel disposed at the coordinates (x, y) according to the pixel value continuous with the pixel value of the already-written adjacent pixel, which is found at the predetermined rate or more, and the calculated pixel value is written in the background memory 15 (FIG. 2) at the corresponding address.

In other words, when the level of a pixel value continuous with the pixel value of an already-written adjacent pixel has been input into the number table as the m-th-number level among the first-number to the M-th-number levels for the coordinates (x, y), the average, for example, of the pixel values of the pixels belonging to the m-th-number level among the pixels disposed at the coordinates (x, y) constituting the first to the N-th frames in the condition in which positioning has been applied to the backgrounds of the first to the N-th frames is calculated, and the average is written in the background memory 15 (FIG. 2) at the corresponding address as the pixel value of the pixel disposed as the coordinates (x, y) of the common background.

As described above, in the background-pixel extracting processing, when the rate of the maximum number of pixels having an identical pixel value and disposed at the coordinates (x, y) among the pixels constituting the first to the N-th frames obtained in the condition in which positioning has been applied to the backgrounds of the first to the N-th frames is high, the pixel value for which the rate of the maximum number is high is written in the background memory 15 as a likely pixel value of the common background disposed at the coordinates (x, y). According to the background-pixel extracting processing, when a series of images formed of N frames in which a scene is used as the background and a subject moves as the foreground is input, for example, if the background is displayed in almost all of the N frames at a pixel position without being hidden by the foreground, since the rate of the number of pixels having a pixel value displayed in almost all of the N frames is high, the pixel value is written as a background pixel value.

When the foreground is displayed in some frames and the background is displayed in some frames at the position of a pixel (hereinafter called an intermediate pixel, if necessary) as the foreground moves, since the corresponding pixel value constitutes the foreground in some frames and the background in some frames, intermediate pixels do not have a pixel value for which the rate of the number of intermediate pixels having the pixel value is high. Therefore, a pixel value is not written for an intermediate pixel in the background-pixel extracting processing.

To obtain the common background, the pixel value of an intermediate pixel obtained when the background is displayed at the pixel in a frame needs to be written. It is difficult to identify a frame in which the background is displayed at the intermediate pixel. Therefore, in the background extension processing, when a pixel value of the common background has already been written for a pixel among those adjacent to an intermediate pixel and a pixel value close to the pixel value which has already been written was displayed as the pixel value of the intermediate pixel, the displayed pixel value is written in the background memory 15 (FIG. 2) as a likely pixel value obtained when the background is displayed at the intermediate-pixel position.

Consequently, according to the background extension processing, even if the background was displayed at a pixel position (intermediate-pixel position) only in one frame, the pixel value displayed as the background in that one frame can be written.

When it is determined in the step S150 that the level of a pixel value continuous with the pixel value of an already-written adjacent pixel has not been input into the number table as any of the first-number to the M-th-number levels for the coordinates (x, y), in other words, when none of pixels having a pixel value continuous with the pixel value of an already-written adjacent pixel is found among the pixels disposed at the coordinates (x, y) constituting the first to the N-th frames in the condition in which positioning has been applied to the backgrounds of the first to the N-th frames, the processing proceeds to a step S152. A pixel value of the common background is calculated for the pixel disposed at the coordinates (x, y) according to the pixel value of the already-written adjacent pixel, and the calculated pixel value is written in the background memory 15 (FIG. 2) at the corresponding address.

Among pixels adjacent to an intermediate pixel, there is a pixel for which a pixel (already-written adjacent pixel) value has been written as the common background. When a pixel value close to the pixel value which has been written has not yet displayed as the pixel value of the intermediate pixel, the pixel value of the already-written adjacent pixel (if there are a plurality of already-written adjacent pixels, the average of their pixel values, for example), for example, is written in the background memory 15 (FIG. 2) as the pixel value of the common background of the pixel disposed at the coordinates (x, y) in the step S152.

After the process of the step S151 or the step S152, the processing proceeds to a step S153. The background flag of the pixel for which the pixel value for the common background has been written in the step S151 or the step S152, that is, the background flag stored in the background-flag memory 36 at the address corresponding to the coordinates (x, y), is set to 1, and the processing returns to the step S146. The same processes as those described above are repeated.

When it is determined in the step S143 that the variable y is not equal to or less than $Y_{max}$, the processing proceeds to a step S144. It is determined whether all of the background flags stored in the background-flat memory 36 at the addresses corresponding to the coordinates within the image area is 1. When it is determined in the step S143 that any of the background flags corresponding to the coordinates within the image area is not 1, in other words, when there is a pixel for which a pixel value for the common background has not yet been written, among the pixels disposed at the coordinates within the image area, the processing returns to the step S141. The same processes as those described above are repeated.

When it is determined in the step S144 that all the background flags corresponding to the coordinates within the image area is 1, in other words, when pixel values for the common background have been written for all the pixels disposed at the coordinates within the image area, the processing returns.

Figure 22:
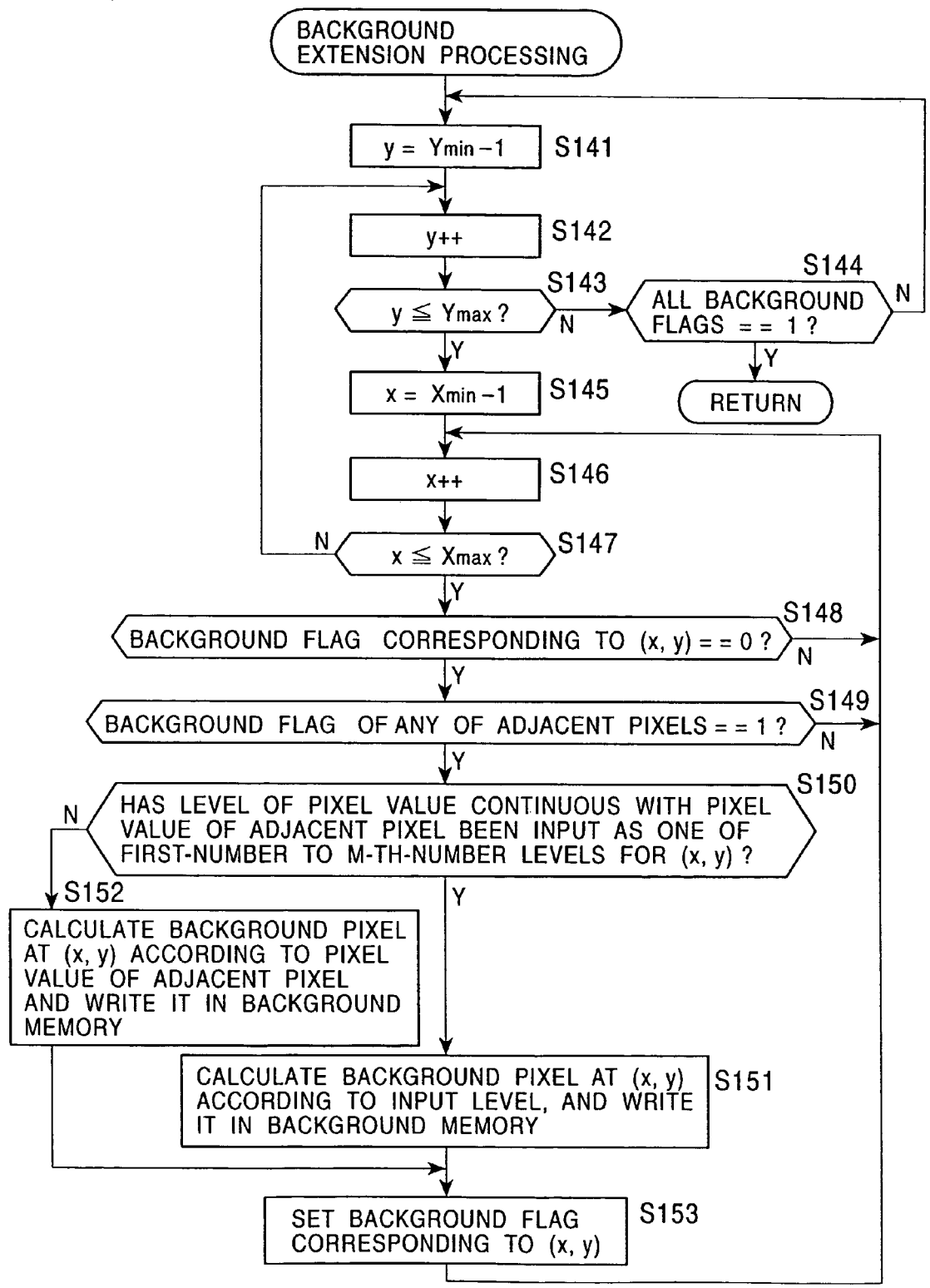
FIG. 22 is a flowchart of the details of the background extension processing executed in a step S125 shown in FIG. 20.
Figure 23:
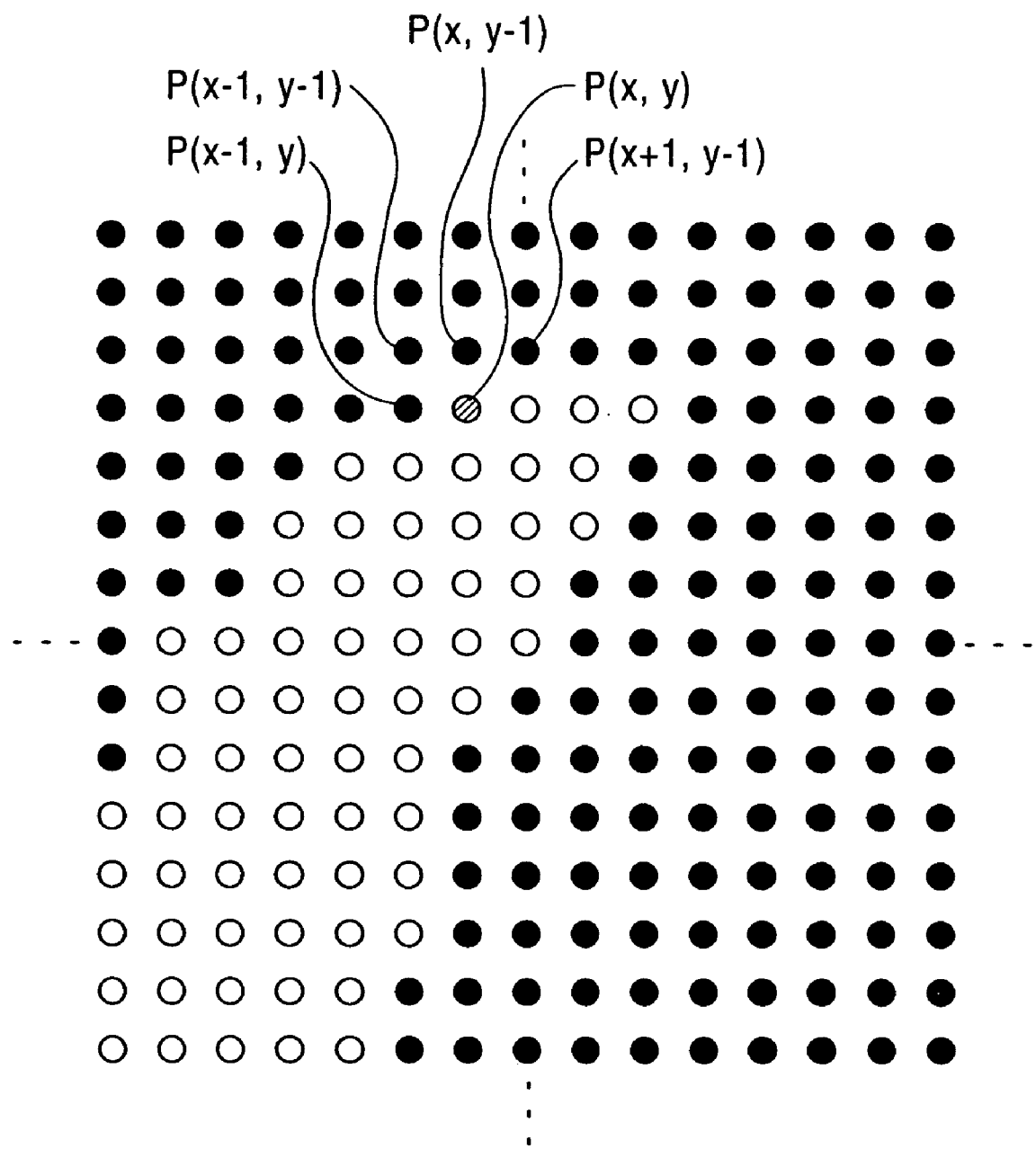
FIG. 23 is a view showing the background extension processing shown in FIG. 22.

According to the processing described by referring to FIG. 22, when, as shown in FIG. 23, there is a pixel P(x, y) (indicated by a hatched circle in the figure) for which a pixel value has not yet been written, adjacent to pixels (indicated by black circles in the figure) for which pixel values for the common background have already been written, the pixel value of an already-written adjacent pixel (pixel P(x−1, y), P(x−1, y−1), P(x, y−1), or P(x+1, y+1) in the figure) or a pixel value continuous with the pixel value of the already-written adjacent pixel is written as the pixel value for the common background of the pixel P(x, y). And, the common background is extended. Therefore, the processing shown in FIG. 22 is called background extension processing.

Figure 24:
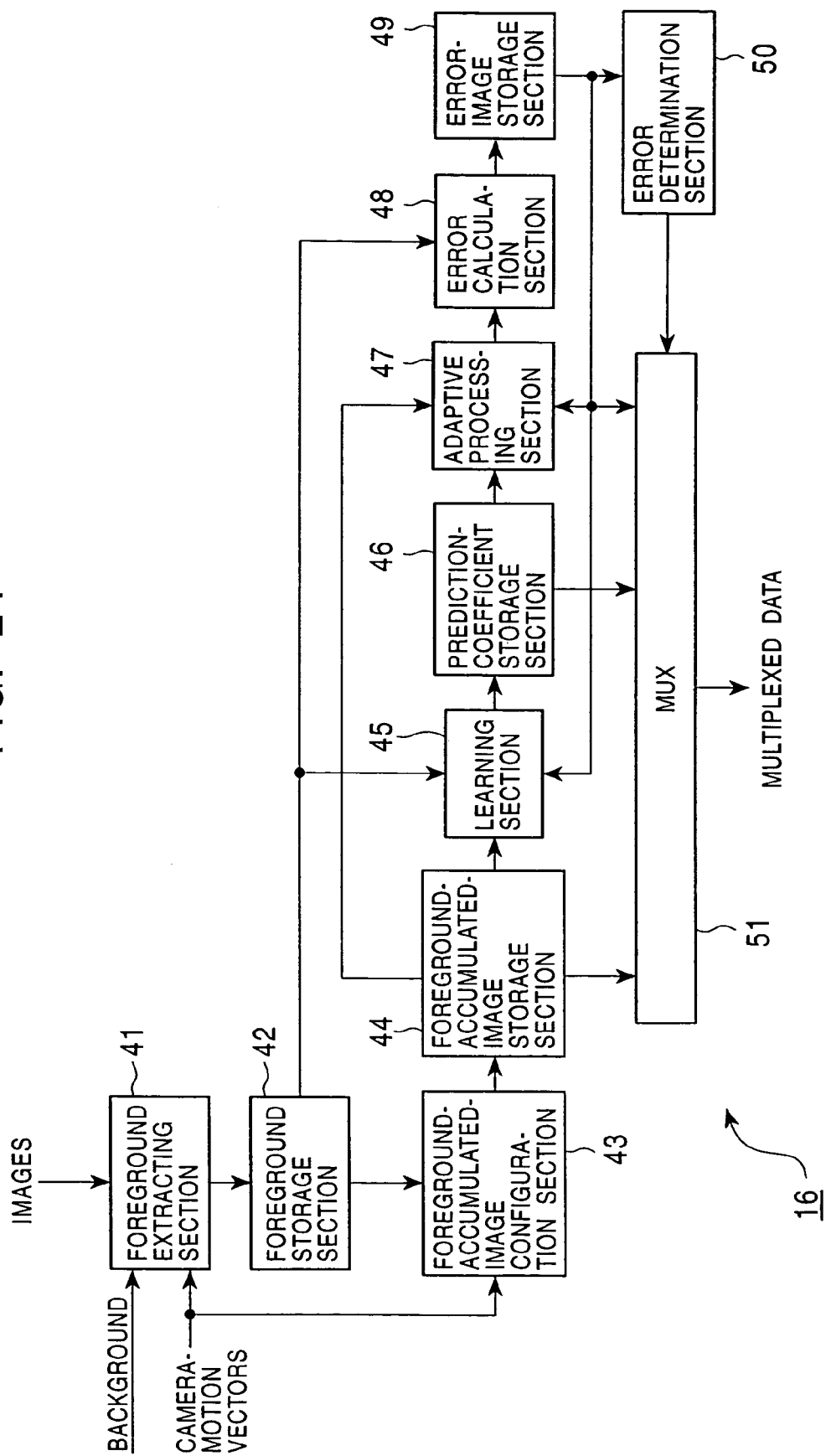
FIG. 24 is a block diagram showing an example structure of a foreground encoding section 16 shown in FIG. 2.

FIG. 24 shows an example structure of the foreground encoding section 16 shown in FIG. 2.

A foreground extracting section 41 receives the first to the N-th frames stored in the accumulation section 11 (FIG. 2), the common background stored in the background memory 15 (FIG. 2), and the camera-motion vectors stored in the camera-motion-vector storage section 13 (FIG. 2). The foreground extracting section 41 extracts the foregrounds from the first to the N-th frames. More specifically, the foreground extracting section 41 arranges the n-th frame such that the upper left corner of the n-th frame is positioned at the position shifted from the common background by the camera-motion vector $v_n$ in the reference coordinate system, to achieve positioning between the common background and the n-th frame, and subtracts from each pixel of the n-th frame the pixel disposed at the same position in the common background to extract the foreground from the n-th frame.

A foreground storage section 42 stores the foregrounds of the first to the N-th frames extracted by the foreground extracting section 41.

A foreground-accumulated-image configuration section 43 receives the camera-motion vectors stored in the cameramotion-vector storage section 13 (FIG. 2). The foreground-accumulated-image configuration section 43 configures a front accumulated image and a rear accumulated image according to the camera-motion vectors by the use of the foregrounds of the first to the N-th frames stored in the foreground storage section 42. More specifically, the foreground-accumulated-image configuration section 43 simulates the foregrounds of the first to the N-th frames in the condition in which positioning has been applied to the backgrounds of the first to the N-th frames, according to the camera-motion vectors, and configures the rear accumulated image obtained by viewing the foregrounds of the first to the N-th frames in the progress direction of time, which is an image formed of the foregrounds viewed from the past, and the front accumulated image obtained by viewing the foregrounds of the first to the N-th frames in the direction opposite the progress direction of time, which is an image formed of the foregrounds viewed from the future.

The front accumulated image can be obtained by overwriting the pixel values of the foregrounds of the first to the N-th frames in the condition in which positioning has been applied to the backgrounds of the first to the N-th frames, in the order of the first frame to the N-th frame in a memory. In the same way, the rear accumulated image can be obtained by overwriting the pixel values of the foregrounds of the first to the N-th frames in the condition in which positioning has been applied to the backgrounds of the first to the N-th frames, in the order of the N-th frame to the first frame in a memory.

A foreground-accumulated-image storage section 44 stores the front accumulated image and the rear accumulated image configured by the foreground-accumulated-image configuration section 43.

A learning section 45 executes learning processing for obtaining prediction coefficients used for predicting the pixels constituting the foreground of each of the first to the N-th frames, by the use of the pixels constituting the front accumulated image and the rear accumulated image stored in the foreground-accumulated-image storage section 44 and, if necessary, the pixels constituting an error image, described later, stored in an error-image storage section 49.

A prediction-coefficient storage section 46 stores the prediction coefficients obtained by the learning processing executed by the learning section 45.

An adaptive processing section 47 executes adaptive processing for predicting the foreground of each of the first to the N-th frames by the use of the pixels constituting the front accumulated image and the rear accumulated image stored in the foreground-accumulated-image storage section 44, the prediction-coefficient set stored in the prediction-coefficient storage section 46, and if necessary, the error image stored in the error-image storage section 49.

The learning processing executed by the learning section 45 and the adaptive processing executed by the adaptive processing section 47 will be described below.

In the adaptive processing, the pixels constituting an existing image, in the current case, the front accumulated image and the rear accumulated image, or the error image, are linearly coupled with the prediction-coefficient set to obtain the prediction values of the pixels of a desired image (in this case, the foreground of each of the first to the N-th frames).

In the learning processing, the desired image is used as master data, the existing image used for obtaining the desired image is used as apprentice data, and a prediction-coefficient set is obtained which are used to obtain the prediction values E[y] of the pixel values "y" of the pixels (hereinafter called desired pixels, if necessary) constituting the desired image by a linear coupling model specified, for example, by a linear coupling of a set of the pixel values $x_1$, $x_2$, ... of several existing pixels (pixels constituting the existing image) and the prediction-coefficient set $w_1$, $w_2$, ... In this case, the prediction values E[y] are expressed by the following expression.

$$E[y]=w_1 x_1+w_2 x_2+ \ldots \quad (1)$$

To generalize the expression (1), a matrix "W" formed of the set of the prediction coefficients "$w_j$", a matrix "X" formed of the set of the apprentice data, and a matrix "Y'" formed of the prediction values E[y] are defined in the following way.

$$X = \begin{bmatrix} x_{11} & x_{12} & \cdots & x_{1J} \\ x_{21} & x_{22} & \cdots & x_{2J} \\ \cdots & \cdots & \cdots & x_{1J} \\ x_{II} & x_{I2} & \cdots & x_{IJ} \end{bmatrix}$$

$$W = \begin{bmatrix} w_1 \\ w_2 \\ \cdots \\ w_J \end{bmatrix}, \quad Y' = \begin{bmatrix} E[y_1] \\ E[y_2] \\ \cdots \\ E[y_I] \end{bmatrix}$$

Then the following observation equation is derived.

$$XW=Y' \quad (2)$$

A component $x_{ij}$ of the matrix X indicates the j-th apprentice data in the i-th apprentice-data set (apprentice-data set used for predicting the i-th master data $y_i$), and a component $w_j$ in the matrix W indicates a prediction coefficient to be multiplied by the j-th apprentice data in the apprentice-data set. The i-th master data is indicated by $y_i$, and therefore, $E[y_i]$ indicates the prediction value of the i-th master data. The suffix "i" of the components $y_i$ of the matrix Y is omitted at the left side of the expression (1) to indicate "y," and the suffix "i" of the components $x_{ij}$ of the matrix X is also omitted at the right side of the expression (1) to indicate "$x_1$, $x_2$, ..."

It is assumed that the least squares method is applied to this observation equation to obtain the prediction values E[y] close to the pixel values "y" of the desired pixels. In this case, when a matrix "Y" formed of the set of the true pixel values "y" of the desired pixels serving as master data and a matrix "E" formed of the set of the remainders "e" of the prediction values E[y] against the pixel values "y" of the desired pixels are defined in the following way, $$E = \begin{bmatrix} e_1 \\ e_2 \\ \cdots \\ e_I \end{bmatrix}, \quad Y = \begin{bmatrix} y_1 \\ y_2 \\ \cdots \\ y_I \end{bmatrix}$$

the following remainder equation is derived from the equation (2).

$$XW=Y+E \quad (3)$$

In this case, the prediction coefficients $w_j$ used for obtaining the prediction values E[y] close to the pixel values "y" of the desired pixels are obtained by setting the square error, $$\sum_{i=1}^{I} e_i^2$$

to the minimum.

Therefore, the prediction coefficients $w_j$ obtained when the above square error differentiated by the prediction coefficient $w_j$ is zero, in other words, the prediction coefficient $w_j$ satisfying the following expression, is the most appropriate values for obtaining the prediction values E[y] close to the pixel values "y" of the desired pixels.

$$e_1 \frac{\partial e_1}{\partial w_j} + e_2 \frac{\partial e_2}{\partial w_j} + \cdots + e_I \frac{\partial e_I}{\partial w_j} = 0 \ (j=1,2,\cdots,J) \quad (4)$$

The expression (3) is differentiated by the prediction coefficients $w_j$ to obtain the following expressions.

$$\frac{\partial e_i}{\partial w_1} = x_{i1}, \ \frac{\partial e_i}{\partial w_2} = x_{i2}, \cdots, \ \frac{\partial e_i}{\partial w_J} = x_{iJ}, (i=1,2\cdots,I) \quad (5)$$

From the expressions (4) and (5), the expression (6) is derived.

$$\sum_{i=1}^{I} e_i x_{i1} = 0, \ \sum_{i=1}^{I} e_i x_{i2} = 0, \ \sum_{i=1}^{I} e_i x_{iJ} = 0 \quad (6)$$

With the relationship among the apprentice data "$x_{ij}$", the prediction coefficients "$w_j$", the master data "$y_i$", and the remainders "$e_i$" in the remaining equation (3) being taken into account, the following normal equations are obtained from the expression (6).

$$\begin{cases} \left(\sum_{i=1}^{I} x_{i1}x_{i1}\right)W_1 + \left(\sum_{i=1}^{I} x_{i1}x_{i2}\right)W_2 + \cdots + \left(\sum_{i=1}^{I} x_{i1}x_{iJ}\right)W_J = \left(\sum_{i=1}^{I} x_{i1}y_i\right) \\ \left(\sum_{i=1}^{I} x_{i2}x_{i1}\right)W_1 + \left(\sum_{i=1}^{I} x_{i2}x_{i2}\right)W_2 + \cdots + \left(\sum_{i=1}^{I} x_{i2}x_{iJ}\right)W_J = \left(\sum_{i=1}^{I} x_{i2}y_i\right) \\ \cdots \\ \left(\sum_{i=1}^{I} x_{iJ}x_{i1}\right)W_1 + \left(\sum_{i=1}^{I} x_{iJ}x_{i2}\right)W_2 + \cdots + \left(\sum_{i=1}^{I} x_{iJ}x_{iJ}\right)W_J = \left(\sum_{i=1}^{I} x_{iJ}y_i\right) \end{cases} \quad (7)$$

The same number of normal equations (7) as that, J, of prediction coefficients "wj" to be obtained can be generated when a certain number of sets of apprentice data "$x_{ij}$" and master data "$y_i$" are prepared. Therefore, the equations (7) are solved (to solve the equations (7), it is necessary that the matrix formed of the coefficients applied to the prediction coefficients "$w_j$" be regular) to obtain the most appropriate prediction coefficients "$w_j$". It is possible to use a sweeping method (Gauss-Jordan elimination method) to solve the equations (7).

As described above, the most appropriate prediction coefficients "$w_j$" are obtained in the learning processing, and prediction values E[y] close to the pixel values "y" of the desired pixels are obtained from the expression (1) by the use of the prediction coefficients "$w_j$" in the adaptive processing.

In other words, the learning section 45 and the adaptive processing section 47 use the front accumulated image and the rear accumulated image stored in the foreground-accumulated-image storage section 44 and if necessary, the error image stored in the error-image storage section 49, as existing images, and the foreground of each of the first to the N-th frames as a desired image to execute the learning processing and the adaptive processing, respectively.

The adaptive processing differs, for example, from a simple interpolation processing in that a component not included in an existing image but included in a desired image is reproduced. In other words, the adaptive processing is the same as interpolation processing using a so-called interpolation filter as far as the expression (1) is seen. Since the prediction-coefficient set "w," which correspond to the tap coefficients of the interpolation filter, is obtained by learning with the use of mater data "y," a component included in the desired image can be reproduced. From this condition, it can be said that the adaptive processing has an image creation (resolution improving) function.

An error calculation section 48 reads the foreground of each of the first to the N-th frames from the foreground storage section 42, and calculates the prediction errors of the prediction values for the foreground of each of the first to the N-th frames, obtained by the adaptive processing section 47. More specifically, for example, the error calculation section 48 subtracts the true pixel values of the pixels constituting the foreground of the n-th frame from the prediction values of the pixels to obtain a prediction error for each pixel.

The error-image storage section 49 stores an image (hereinafter called an error image, if necessary) formed of the prediction errors of the foregrounds of the first to the N-th frames, obtained by the error calculation section 48.

An error determination section 50 calculates, for example, the sum of the absolute values of the prediction errors serving as the pixel values of the pixels constituting the error image stored in the error-image storage section 49, and determines whether the sum of the absolute values is not more than (less than) a threshold.

A multiplexer (MUX) 51 multiplexes the front accumulated image and the rear accumulated image stored in the foreground-accumulated-image storage section 44, the prediction-coefficient set stored in the prediction-coefficient storage section 46, and if necessary, the error image stored in the error-image storage section 49, and outputs multiplexed data obtained as a result of multiplexing to the multiplexer 17 (FIG. 2) as the result of encoding of the foreground of each of the first to the N-th frames.

Figure 26:
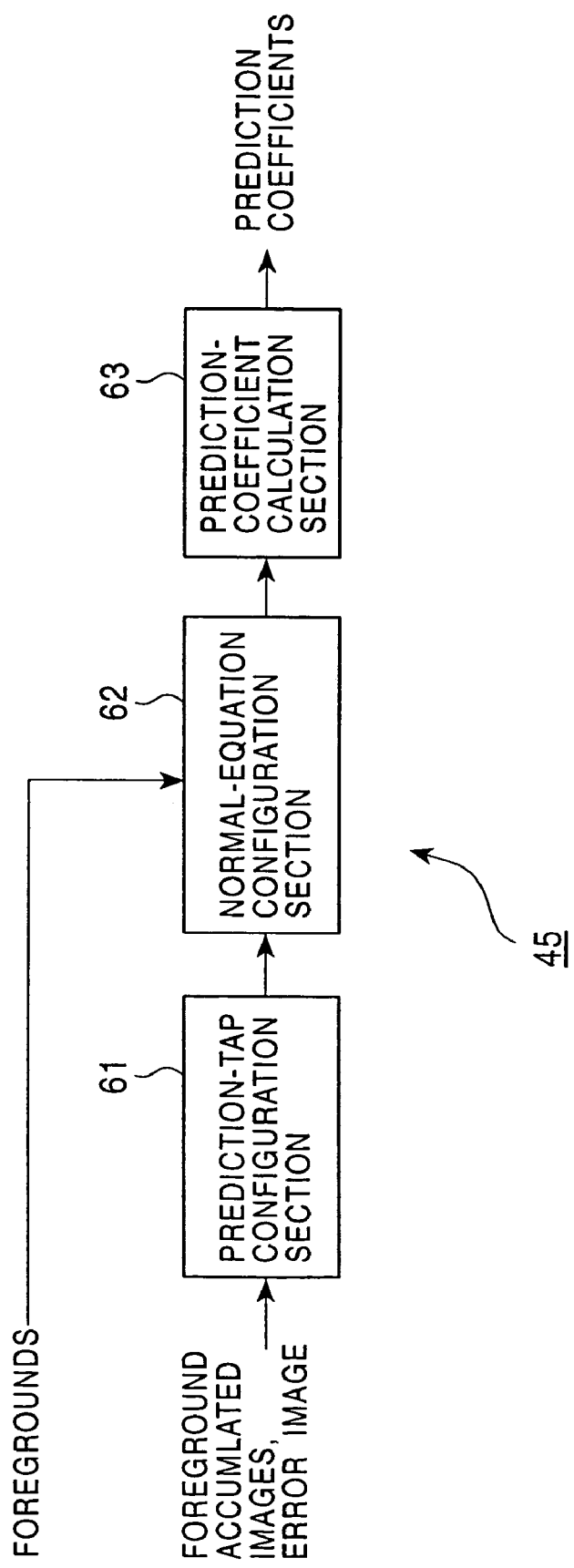
FIG. 26 is a block diagram showing an example structure of a learning section 45 shown in FIG. 24.

FIG. 26 shows an example structure of the learning section 45 shown in FIG. 24.

A prediction-tap configuration section 61 receives the front accumulated image and the rear accumulated image (hereinafter collectively called foreground accumulated images, if necessary) stored in the foreground-accumulated-image storage section 44, and if necessary, the error image stored in th error-image storage section 49. The prediction-tap configuration section 61 sets a pixel whose prediction value is to be obtained, among the pixels constituting the foreground of each of the first to the N-th frames in the condition in which positioning has been applied to the backgrounds of the first to the N-th frames, to a focus pixel, extracts pixels spatially close to the focus pixel in the front accumulated image, the rear accumulated image, and the error image, and outputs them to a normal-equation configuration section 62 as a prediction tap used for obtaining the prediction value of the focus pixel by adaptive processing.

The normal-equation configuration section 62 receives the prediction tap from the prediction-tap configuration section 61 and the pixels constituting the foreground of each of the first to the N-th frames stored in the foreground storage section 42. The normal-equation configuration section 62 executes additions for pixels (master data) of the foreground serving as focus pixels and the prediction tap (apprentice data).

More specifically, the normal-equation configuration section 62 uses the prediction tap to execute the multiplication ($x_{ij}x_{i'j'}$) of the apprentice data (prediction tap) and the summation ($\Sigma$), which are to be multiplied with the prediction coefficients in the left side of the normal equations (7).

In addition, the normal-equation configuration section 62 uses the prediction tap and the focus pixels to execute the multiplication ($x_{ij}y_j$) of the apprentice data (prediction tap) and the master data (focus pixels) and the summation ($\Sigma$) in the right side of the normal equations (7).

The normal-equation configuration section 62 executes the above processing with the pixels constituting the foreground of each of the first to the N-th frames being sequentially set to focus pixels, to generate the normal equations (7).

Then, a prediction-coefficient calculation section 63 solves the normal equations generated by the normal-equation configuration section 62 to obtain a prediction-coefficient set, sends it to the prediction-coefficient storage section 46 (FIG. 24) and stores them in it.

In the present embodiment, the adaptive processing section 47 shown in FIG. 24 obtains the prediction value $E[A_n(x, y)]$, for example, by the following expression, of the pixel value $A_n(x, y)$ of the pixel disposed at the position (x, y) in the image area of the n-th frame in the reference coordinate system among the first to the N-th frames in the condition in which positioning has been applied to the backgrounds of the first to the N-th frames.

$$E[A_n(x, y)] = g(F, B, E, n) \qquad (8)$$

Where, in the expression (8), F, B, and E indicate the front accumulated image, the rear accumulated image, and the error image, respectively, and the function g(F, B, E, n) is defined, for example, by the following expression corresponding to the linear equation (1).

$$g(F, B, E, n) = w_{F1} \times f_1 + w_{F2} \times f_2 + \ldots + \qquad (9)$$
$$w_{B1} \times b_1 + w_{B2} \times b_2 + \ldots +$$
$$w_{E1} \times e_1 + w_{E2} \times e_2 + \ldots +$$
$$w \times f$$

Where, in the expression (9), $w_{F1}, w_{F2}, \ldots, w_{B1}, w_{B2}, \ldots, w_{E1}, w_{E2}, \ldots$ indicate prediction coefficients, $f_1, f_2, \ldots$ indicate the pixels constituting a prediction tap of the focus pixel among the pixels constituting the front accumulated image F, $b_1, b_2, \ldots$ indicate the pixels constituting a prediction tap of the focus pixel among the pixels constituting the rear accumulated image B, and $e_1, e_2, \ldots$ indicate the pixels constituting a prediction tap of the focus pixel among the pixels constituting the error image E.

When the function g(F, B, E, n) is defined by the expression (9), the normal-equation configuration section 62 generates normal equations used for obtaining the prediction coefficients $w_{F1}, w_{F2}, \ldots, w_{B1}, w_{B2}, \ldots, w_{E1}, w_{E2}, \ldots w$ in the expression (9), and the prediction-coefficient calculation section 63 solves the normal equations to obtain the prediction coefficients $w_{F1}, w_{F2}, \ldots, w_{B1}, w_{B2}, \ldots, w_{E1}, w_{E2}, \ldots w$. Therefore, in this case, one set of the prediction coefficients $w_{F1}, w_{F2}, \ldots, w_{B1}, w_{B2}, \ldots, w_{E1}, w_{E2}, \ldots w$ is obtained for the foregrounds of all of the first to the N-th frames.

Figure 27:
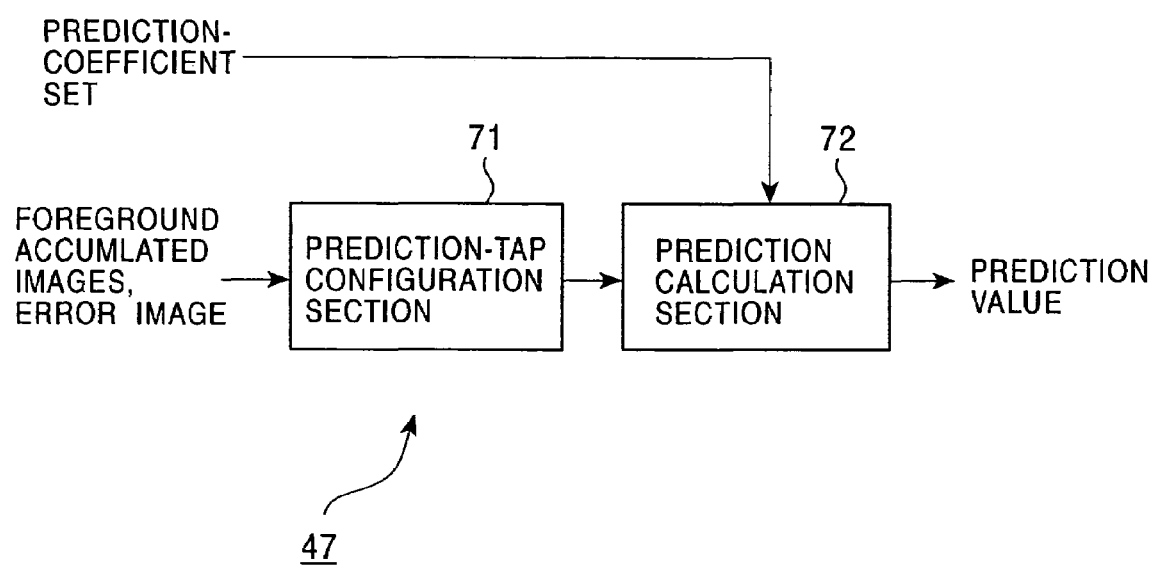
FIG. 27 is a block diagram showing an example structure of an adaptive processing section 47 shown in FIG. 24.

FIG. 27 shows an example structure of the adaptive processing section 47 shown in FIG. 24.

A prediction-tap configuration section 71 receives the foreground accumulated image stored in the foreground-accumulated-image storage section 44 and if necessary, the error image stored in the error-image storage section 49. In the same way as in the prediction-tap configuration section 61 shown in FIG. 26, the prediction-tap configuration section 71 sets a pixel whose prediction value is to be obtained, among the pixels constituting the foreground of each of the first to the N-th frames in the condition in which positioning has been applied to the backgrounds of the first to the N-th frames, to a focus pixel, extracts pixels spatially close to the focus pixel in the front accumulated image, the rear accumulated image, and the error image, and outputs them to a prediction calculation section 72 as a prediction tap.

The prediction calculation section 72 receives the prediction tap from the prediction-tap configuration section 71 and the prediction-coefficient set stored in the prediction-coefficient storage section 46 (FIG. 24). The prediction calculation section 72 uses the prediction tap and the prediction-coefficient set to calculate the linear equation defined by the expressions (8) and (9) to obtain the prediction value of the focus pixel in the foreground, and outputs it to the error calculation section 48.

Figure 28:
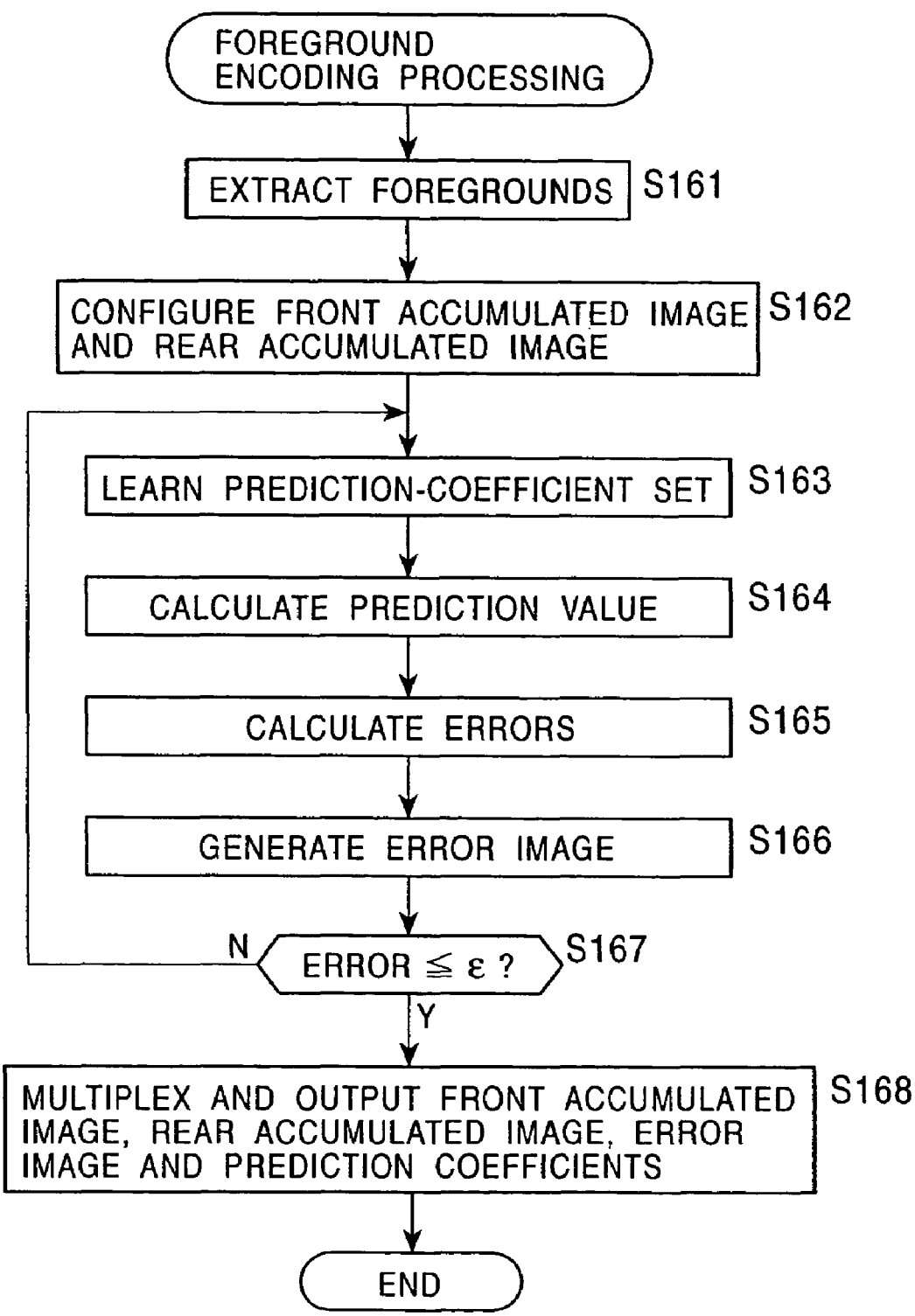
FIG. 28 is a flowchart of the details of the foreground encoding processing of the foreground encoding section 16 shown in FIG. 24.

The foreground encoding processing for encoding the foreground of each of the first to the N-th frames, executed by the foreground encoding section 16 shown in FIG. 24 will be described next by referring to a flowchart shown in FIG. 28.

At first, in a step S161, the foreground extracting section 41 uses the camera-motion vectors stored in the camera-motion-vector storage section 13 (FIG. 2) and the common background stored in the background memory 15 (FIG. 2) to extract the foregrounds from the images of the first to the N-th frames stored in the accumulation section 11 (FIG. 2) as described above, sends them to the foreground storage section 42, and stores them in it.

Figure 25:
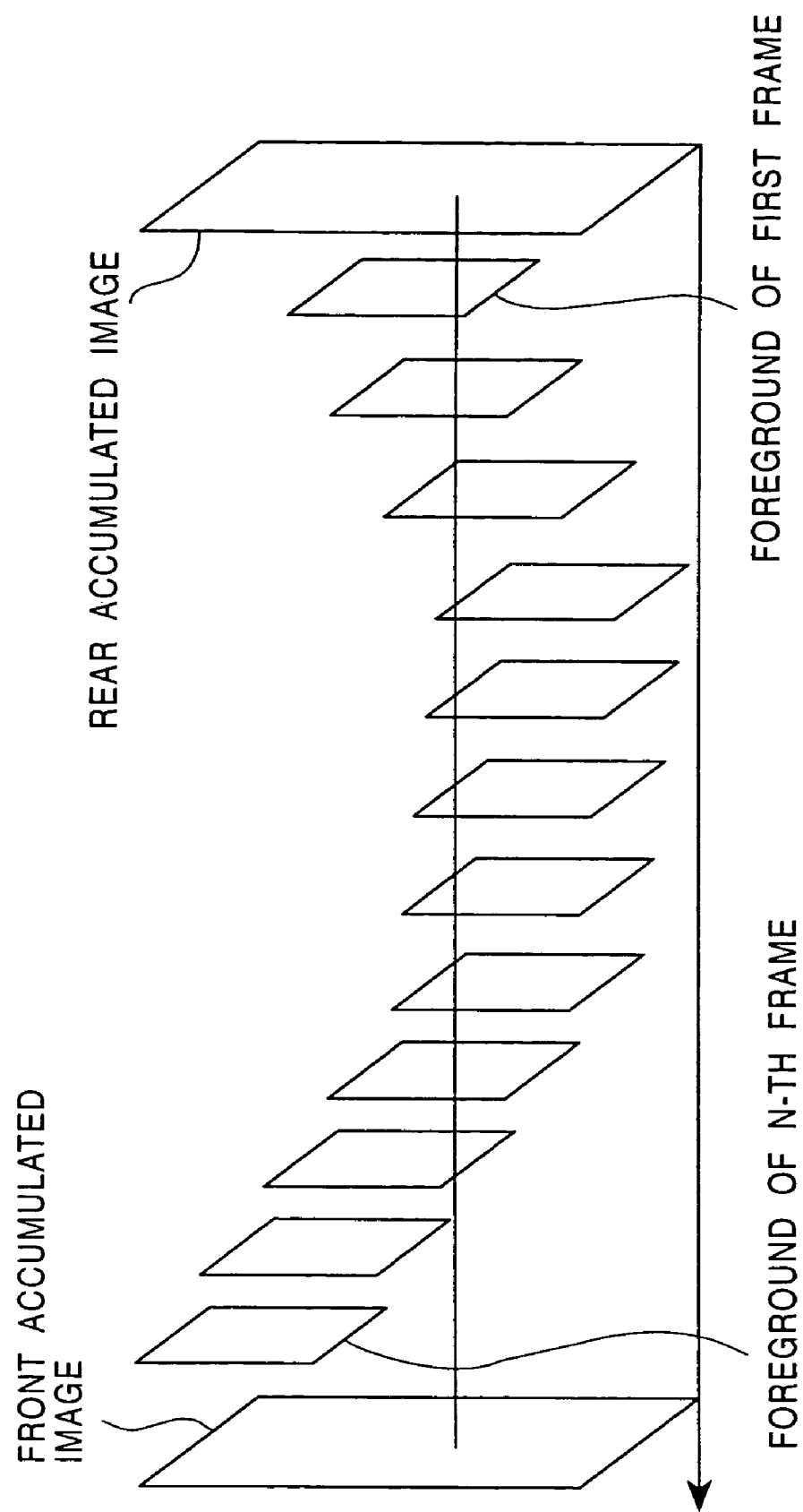
FIG. 25 is a view of the processing of a foreground-accumulated-image configuration section 43 shown in FIG. 24.

The processing proceeds to a step S162. The foreground-accumulated-image configuration section 43 configures the front accumulated image and the rear accumulated image described by referring to FIG. 25 from the foregrounds of the first to the N-th frames stored in the foreground storage section 42, sends them to the foreground-accumulated-image storage section 44, and stores them in it. The processing proceeds to a step S163.

In the step S163, the learning section 45 uses the front accumulated image and the rear accumulated image stored in the foreground-accumulated-image storage section 44 and, if necessary, the pixels constituting the error image stored in the error-image storage section 49 to execute learning, and obtains prediction coefficients used for predicting pixels constituting the foreground of each of the first to the N-th frames.

When learning processing is first executed in the step S163, since the error-image storage section 49 has not yet stored an error image, learning is performed without using an error image (the image cannot be used).

The prediction-coefficient set obtained as a result of learning executed in the step S163 are sent from the learning section 45 to the prediction-coefficient storage section 46 and stored in an overwriting manner. When the prediction-coefficient storage section 46 stores the prediction-coefficient set, the adaptive processing section 47 executes, in a step s164, adaptive processing for obtaining the prediction value of each pixel constituting the foreground of each of the first to the N-th frames by calculating the linear equation defined in the expressions (8) and (9) with the use of the pixels constituting the front accumulated image and the rear accumulated image stored in the foreground-accumulated-image storage section 44, the prediction-coefficient set stored in the prediction-coefficient storage section 46, and if necessary, the error image stored in the error-image storage section 49.

Also if adaptive processing is first executed in the step S164, since the error-image storage section 49 has not yet stored an error image, adaptive processing is performed without using an error image (the image cannot be used).

The prediction value of each pixel constituting the foreground of each of the first to the N-th frames, obtained by adaptive processing executed in the step S164 is sent to the error calculation section 48. The error calculation section 48 references the foreground of each of the first to the N-th frames stored in the foreground storage section 42 to obtain the prediction error of the prediction value of each pixel constituting the foreground in a step S165.

Then, the processing proceeds to a step S166. The error calculation section 48 extracts the pixel having the maximum absolute value of the prediction error at each position in the image area in the reference coordinate system from the pixels constituting the foregrounds of the first to the N-th frames, and sends the prediction error of the pixel extracted at each position to the error-image storage section 49 as an error image. The error-image storage section 49 stores the error image sent from the error calculation section 48.

Then, the processing proceeds to a step S167. The error determination section 50 calculates the sum of the absolute values of the pixel values (prediction errors) of the pixels constituting the error image stored in the error-image storage section 49, and determines whether the sum of the absolute values is not more than the threshold E.

When it is determined in the step S167 that the sum of the absolute values of the pixel values (prediction errors) of the pixels constituting the error image is more than the threshold $\epsilon$, in other words, when the precision of the prediction values of the foreground obtained from the prediction-coefficient set and the front accumulated image and the rear accumulated image (and if necessary, the error image) is not sufficient, the processing returns to the step S163. The same processes as those described above are repeated.

Figure 29:
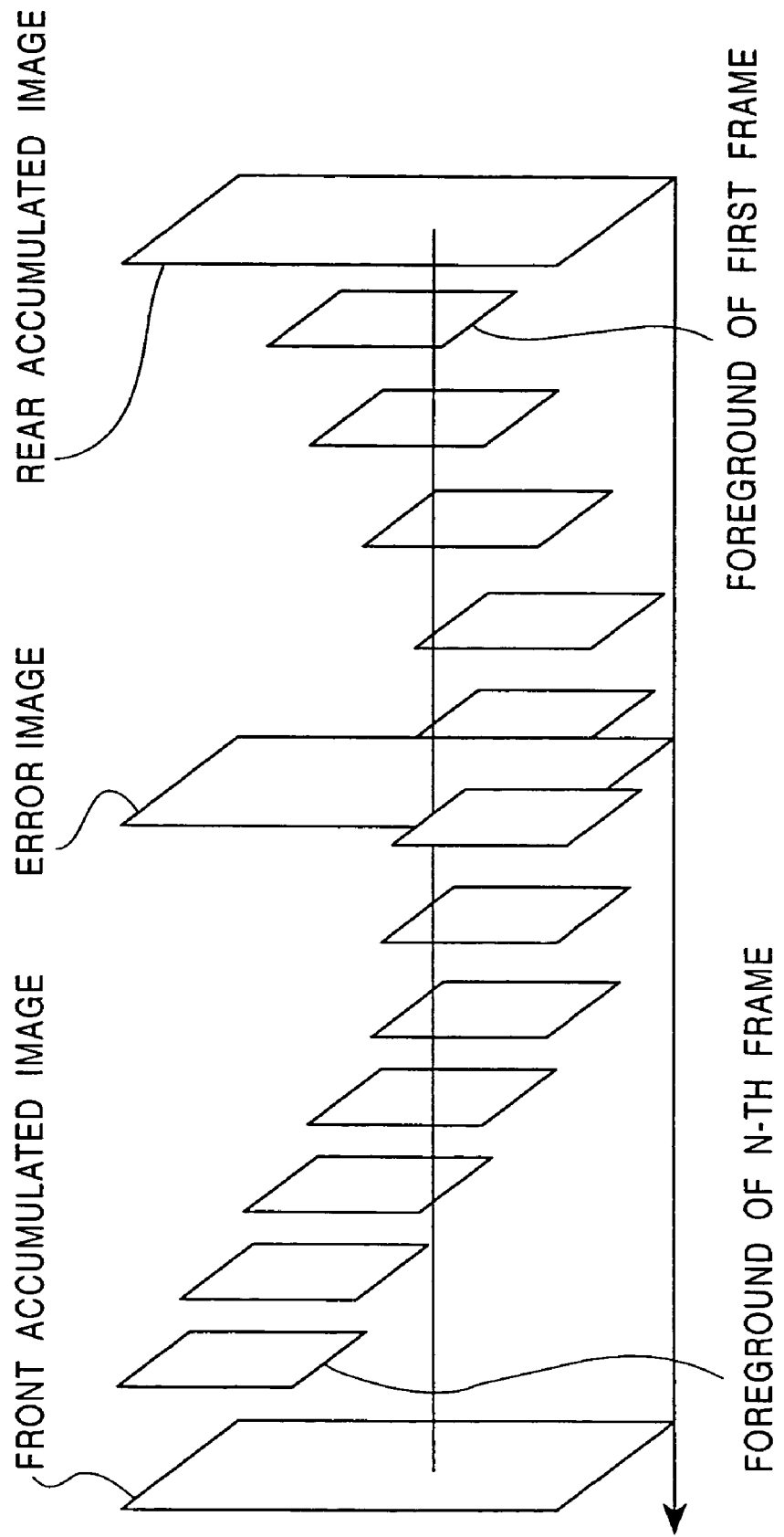
FIG. 29 is a view showing a condition in which a prediction tap is formed by the use of an error image.

In this case, since the error-image storage section 49 stores the error image, in the steps S163 and S164 to be executed next time, a prediction tap is formed by using the front accumulated image, the rear accumulated image, and the error image, as shown in FIG. 29, and learning processing and adaptive processing are executed, respectively.

When it is determined in the step S167 that the sum of the absolute values of the pixel values (prediction errors) of the pixels constituting the error image is not more than the threshold $\epsilon$, in other words, when the precision of the prediction values of the foreground obtained from the prediction-coefficient set and the front accumulated image and the rear accumulated image (and if necessary, the error image) is sufficient, the processing proceeds to the step S168. The error determination section 50 controls the MUX 51 so as to read and multiplex the front accumulated image and the rear accumulated image stored in the foreground-accumulated-image storage section 44, the prediction-coefficient set stored in the prediction-coefficient storage section 46, and, if an error image is stored in the error-image storage section 49, the error image. The MUX 51 outputs multiplexed data obtained as the result of multiplexing to the multiplexer 17 (FIG. 2) as the result of encoding of the foreground of each of the first to the N-th frames, and the foreground encoding processing is finished.

The error-image storage section 49 may store a new error image obtained every time when the process of the step S166 is executed, on an already-stored error image in an overwriting manner, or may store the new error image with the already-stored error image left as is.

When the error-image storage section 49 stores a new error image on an already-stored error image in an overwriting manner, since only one error image is always stored even if prediction-coefficient-set learning is repeatedly executed, the amount of the multiplexed data is small although the improvement of the precision of the foreground prediction values is limited to some extent.

Figure 30:
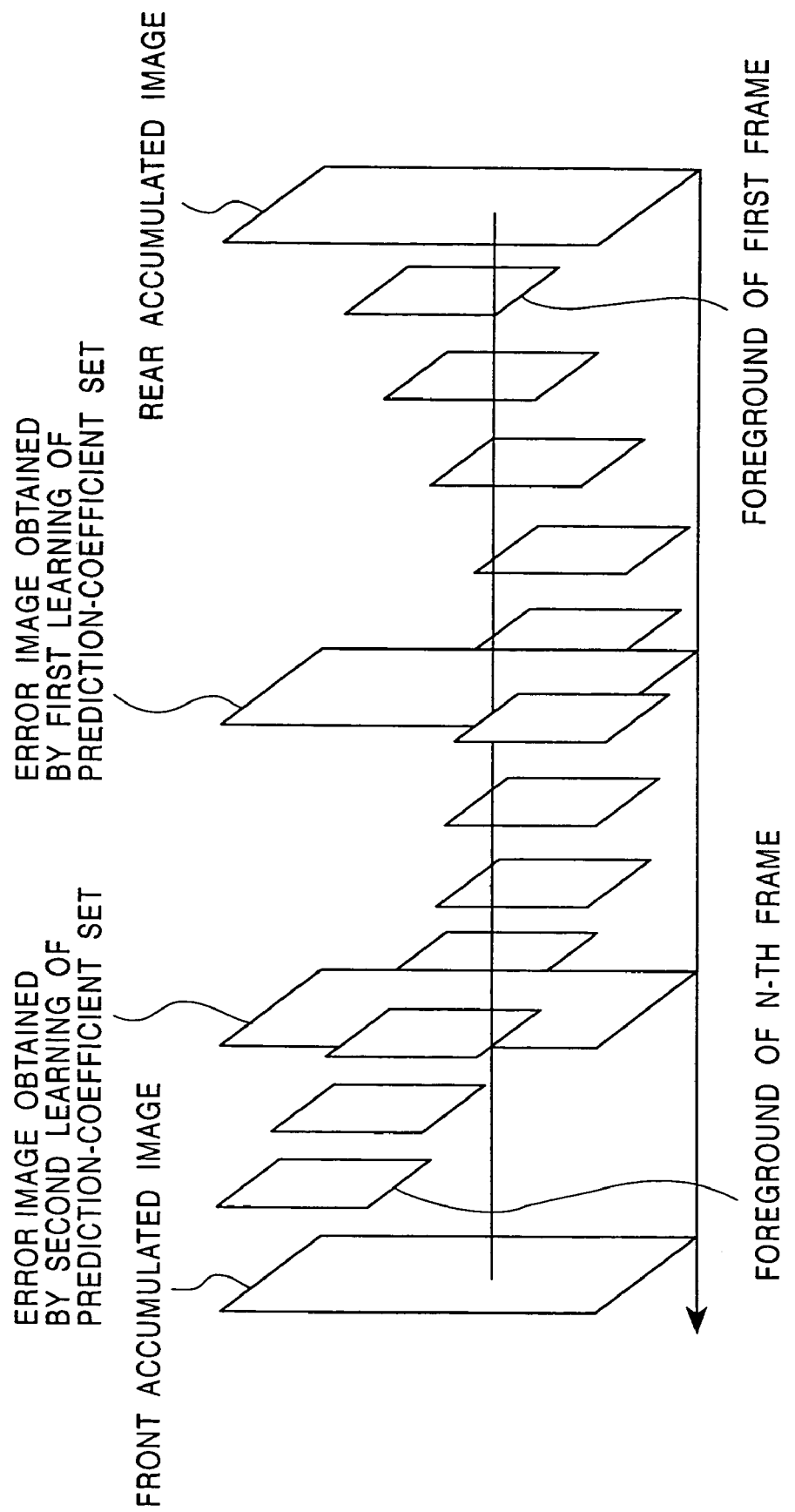
FIG. 30 is a view showing a condition in which a prediction tap is formed by the use of two pieces of error images.

When the error-image storage section 49 stores a new error image with an already-stored error image left as is, since a plurality of pieces of error images are stored, the amount of the multiplexed data somewhat increases. Since a prediction tap is generated by using the front accumulated image and the rear accumulated image, and two or more pieces of error images, as shown in FIG. 30, and learning and adaptive processing are executed, the precision of the prediction values of the foregrounds are improved. FIG. 30 shows a case in which two error images are stored.

In the above-described case, adaptive processing is executed by using prediction-coefficient set obtained by learning to obtain prediction values. When the prediction errors are large, learning is again executed also with the use of the error image to obtain prediction-coefficient set which have small prediction errors. Irrespective of the magnitudes of prediction errors, the prediction-coefficient set obtained as the result of first learning processing executed by the learning section 45 can be output together with the front accumulated image and the rear accumulated image stored in the foreground-accumulated-image storage section 44 as the result of encoding of the foregrounds. In this case, the foreground encoding section 16 can be formed without including the adaptive processing section 47, the error calculation section 48, the error-image storage section 49, and the error determination section 50.

In addition, in the above-mentioned case, the function g(F, B, E, n) for obtaining the prediction values of the foregrounds is defined by the expression (9), and one set of prediction coefficients used in common for obtaining the prediction values of the foregrounds of all of the first to the N-th frames is obtained by the function. A prediction-coefficient set can be obtained, for example, every frame or every plural frames.

In other words, to obtain a prediction-coefficient set every frame, it is necessary to define the function g(F, B. E, n), for example, as shown by the expression (10) and to generate and solve normal equations for each frame to obtain the prediction-coefficient set.

$$g(F, B, E, n) = w_{F1} \times f_1 + w_{F2} \times f_2 + \ldots + \\ w_{B1} \times b_1 + w_{B2} \times b_2 + \ldots + \\ w_{E1} \times e_1 + w_{E2} \times e_2 + \ldots \quad (10)$$

Where, in the expression (10), $w_{F1}, w_{F2}, \ldots w_{B1}, w_{B2}, \ldots w_{E1}, w_{E2}, \ldots$ indicate prediction coefficients used for obtaining the prediction values of the foreground of the n-th frame.

The prediction values of the foreground are obtained by linear prediction. The prediction values of the foreground can be obtained by a high-order, second-order or more, prediction equation.

In addition, the front accumulated image and the rear accumulated image formed of the foregrounds of the first to the N-th frames are used to execute learning of a prediction-coefficient set used for obtaining the prediction values of the foreground of each of the first to the N-th frames. Prediction-coefficient-set learning can be executed by using images other than the front accumulated image and the rear accumulated image. In other words, prediction-coefficient-set learning can be performed by using, for example, one or more pieces of images formed of noise such that the pixel values of the images formed of noise are manipulated to reduce the prediction errors of the prediction values of the foreground.

Figure 31:
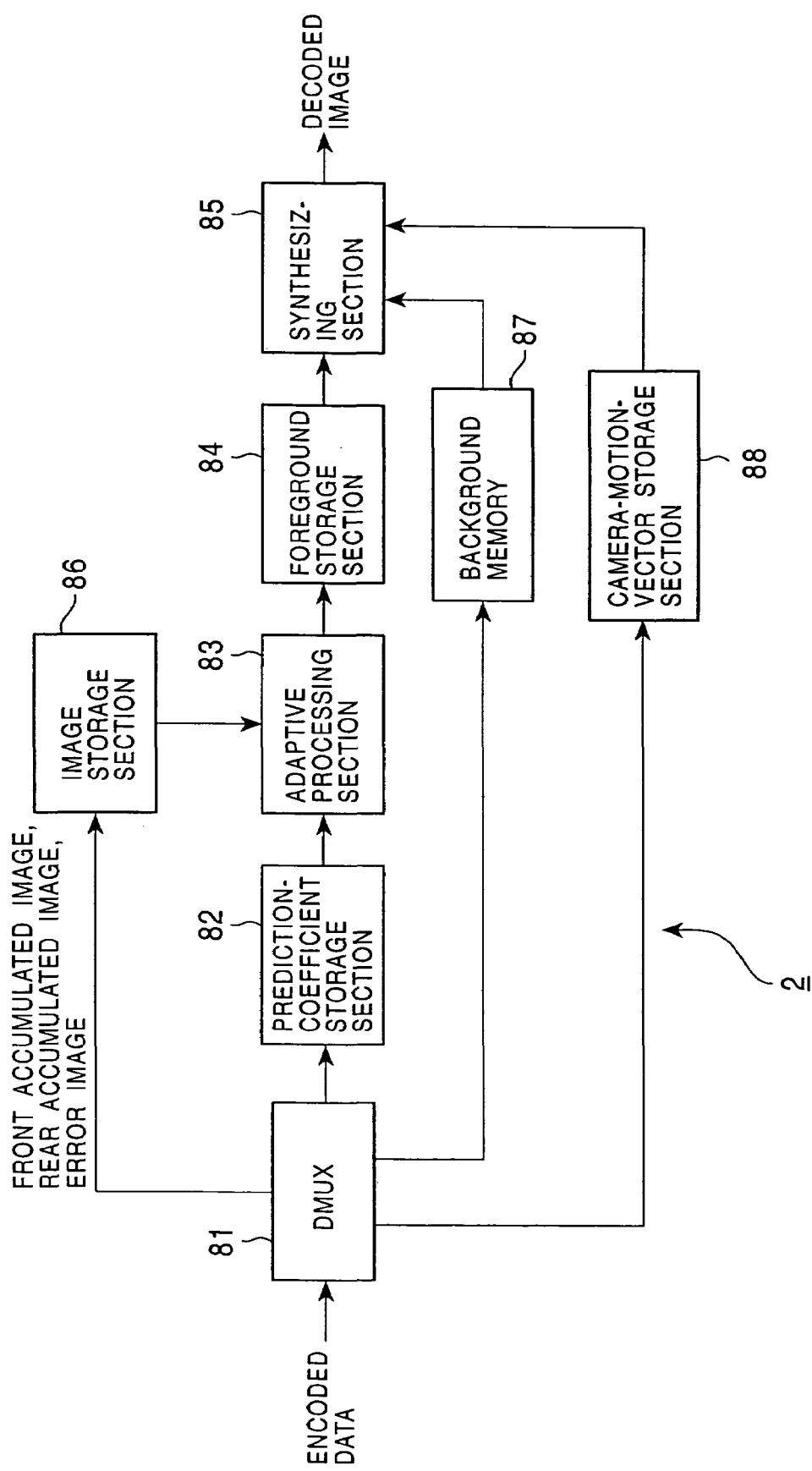
FIG. 31 is a block diagram showing an example structure of a decoder 2 shown in FIG. 1.

FIG. 31 shows an example structure of the decoder 2 shown in FIG. 1.

The encoded data transferred through the transfer medium 3 (FIG. 1) or the encoded data reproduced from the recording medium 4 (FIG. 1) is sent to a demultiplexer (DMUX) 81. The DMUX 81 separates the front accumulated image, the rear accumulated image, the prediction-coefficient set, the common background, and the camera-motion vectors of the sent encoded data. When the encoded data includes an error image, the DMUX 81 also separates the error image of the encoded data.

The front accumulated image and the rear accumulated image, and in addition, if the encoded data includes an error image, the error image are sent from the DMUX 81 to an image storage section 86. The prediction-coefficient set, the common background, and the camera-motion vectors are sent from the DMUX 81 to a prediction-coefficient storage section 82, to a background memory 87, and to a camera-motion-vector storage section 88, respectively.

The prediction-coefficient storage section 82 stores the prediction-coefficient set sent from the DMUX 81. An adaptive processing section 83 uses the prediction-coefficient set stored in the prediction-coefficient storage section 82, the front accumulated image and the rear accumulated image stored in the image storage section 86, and if necessary, the error image to execute the same adaptive processing as that performed by the adaptive processing section 47 shown in FIG. 24 to obtain the prediction values of the foreground of each of the first to the N-th frames.

A foreground storage section 84 stores the prediction values of the foreground of each of the first to the N-th frames, obtained by the adaptive processing section 83 as the result of decoding of the foreground of each of the first to the N-th frames.

A synthesizing section 85 extracts the background of the n-th frame from the common background stored in the background memory 87 according to the camera-motion vector $v_n$ of the n-th frame, stored in the camera-motion-vector storage section 88, combines (synthesizes) the background of the n-th frame with the result of decoding of the foreground of the n-th frame stored in the foreground storage section 84 to decode the image of the n-th frame, and outputs it.

The image storage section 86 stores the front accumulated image, the rear accumulated image, and the error image sent from the DMUX 81. The background memory 87 stores the common background sent from the DMUX 81. The camera-motion-vector storage section 88 stores the camera-motion vectors of the first frame to the N-th frame, sent from the DMUX 81.

Figure 32:
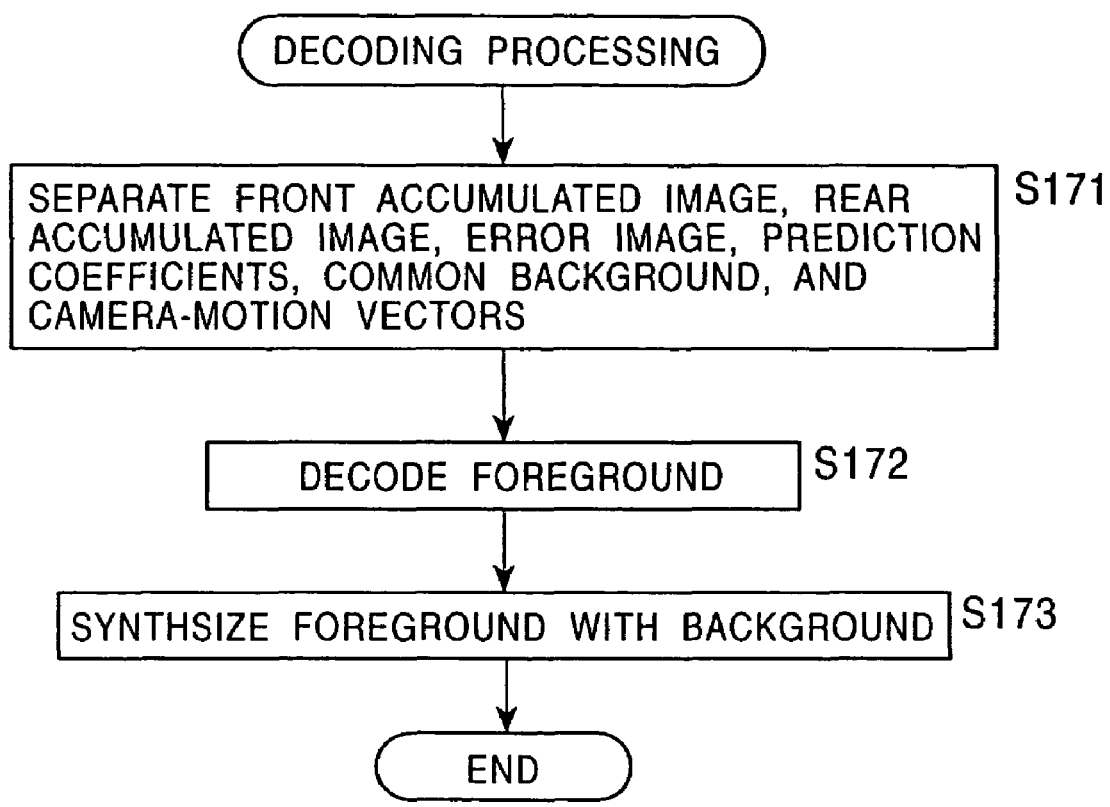
FIG. 32 is a flowchart showing the decoding processing of the decoder 2 shown in FIG. 31.

Decoding processing for decoding the images of the first frame to the N-th frame serving as a series of images, executed by the decoder 2 shown in FIG. 31 will be described next by referring to a flowchart shown in FIG. 32.

At first in a step S171, the DMUX 81 separates the front accumulated image, the rear accumulated image, a necessary error image, the prediction-coefficient set, the common background, and the camera-motion vectors of the sent encoded data. The front accumulated image, the rear accumulated image, and the necessary error image are sent to the image storage section 86 and stored. The prediction-coefficient set, the common background, and the camera-motion vectors are sent to the prediction-coefficient storage section 82, to the background memory 87, and to the camera-motion-vector storage section 88, respectively, and stored.

Then, the processing proceeds to a step S172. The adaptive processing section 83 uses the prediction-coefficient set stored in the prediction-coefficient storage section 82, and the front accumulated image, the rear accumulated image, and the necessary error image stored in the image storage section 86 to execute the same adaptive processing as that performed by the adaptive processing section 47 shown in FIG. 24 to obtain the prediction values of the foreground of each of the first to the N-th frames. The prediction values are sent to the foreground storage section 84, and stored as the result of decoding of the foreground of each of the first frame to the N-th frame.

Then, the processing proceeds to a step S173. The synthesizing section 85 extracts the background of the n-th frame from the common background stored in the background memory 87 according to the camera-motion vector $v_n$ of the n-th frame, stored in the camera-motion-vector storage section 88, and synthesizes the background of the n-th frame with the result of decoding of the foreground of the n-th frame stored in the foreground storage section 84. The synthesizing section 85 applies this processing to all of the first frame to the N-th frame, and decoding processing is terminated.

The series of processing described above can be implemented by hardware or software. When the series of processing is achieved by software, a program constituting the software is installed into a computer which is built in the encoder 1 or the decoder 2 serving as special hardware or into a general-purpose computer which executes various types of processing with various types of programs installed.

Recording media used for installing the program for executing the series of processing described above and for making it executable by the computer will be described below by referring to FIGS. 33A to 33C.

Figure 33A:
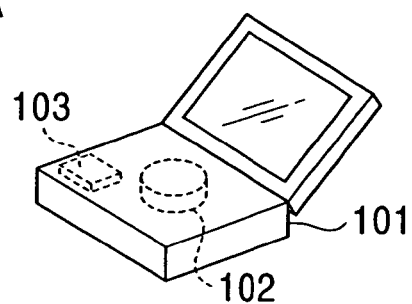
FIGS. 33A to 33C show recording media to which the present invention is applied.

The program can be provided for the user in a condition in which it is installed in advance into a hard disk 102 or a semiconductor memory 103 serving as a recording medium which is built in a computer 101, as shown in FIG. 33A.

Figure 33B:
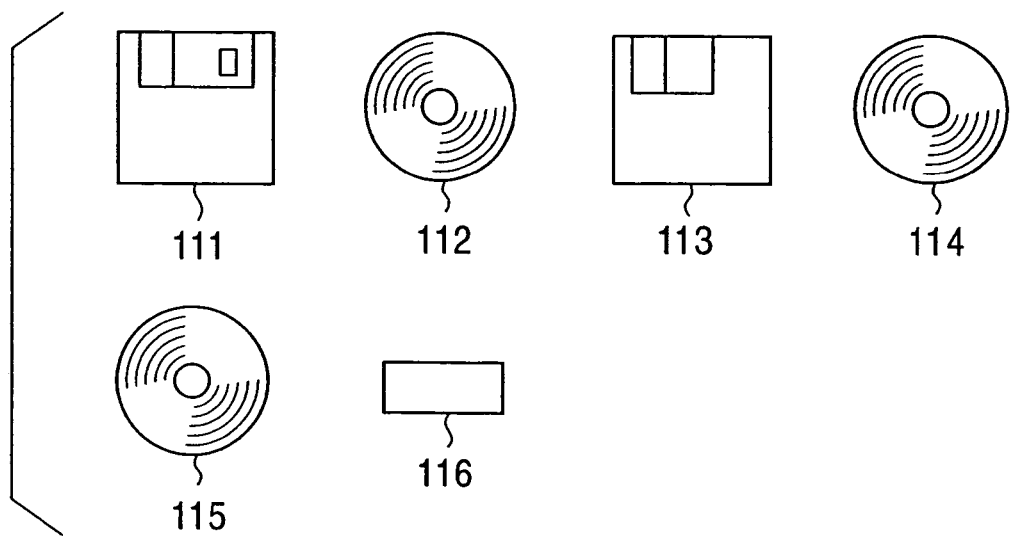

Alternatively, the program is provided as package software in a condition in which it is recorded temporarily or perpetually into recording media, such as a floppy disk 111, a compact disc read-only memory (CD-ROM) 112, a magneto-optical (MO) disk 113, a digital versatile disk (DVD) 114, a magnetic disk 115, and a semiconductor memory 116, as shown in FIG. 33B.

Figure 33C:
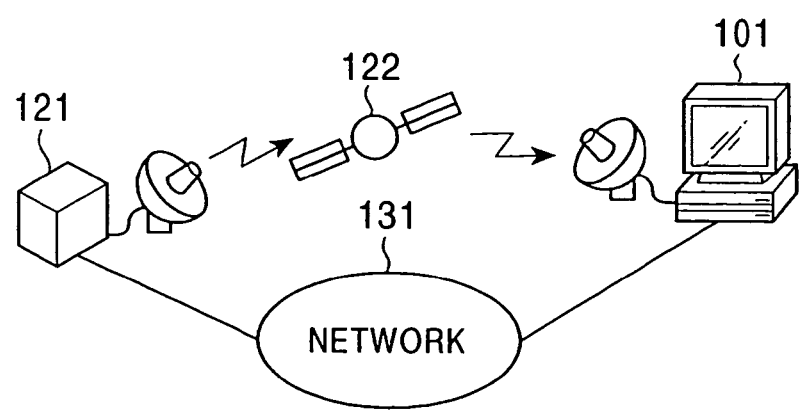

Alternatively, the program is transferred by radio from a downloading site 121 to the computer 101 through an artificial satellite 122 for digital satellite broadcasting, or to the computer 101 by wire through a network 131 such as a local area network (LAN) or the Internet; and is installed into the hard disk 102, built in the computer 101, as shown in FIG. 33C.

In the present specification, the steps describing the program provided through the recording media are not necessarily processed in a time sequential manner in the order in which the steps are described in the flowcharts. Processing to be executed in parallel or individually (such as parallel processing or processing by objects) is also included.

Figure 34:
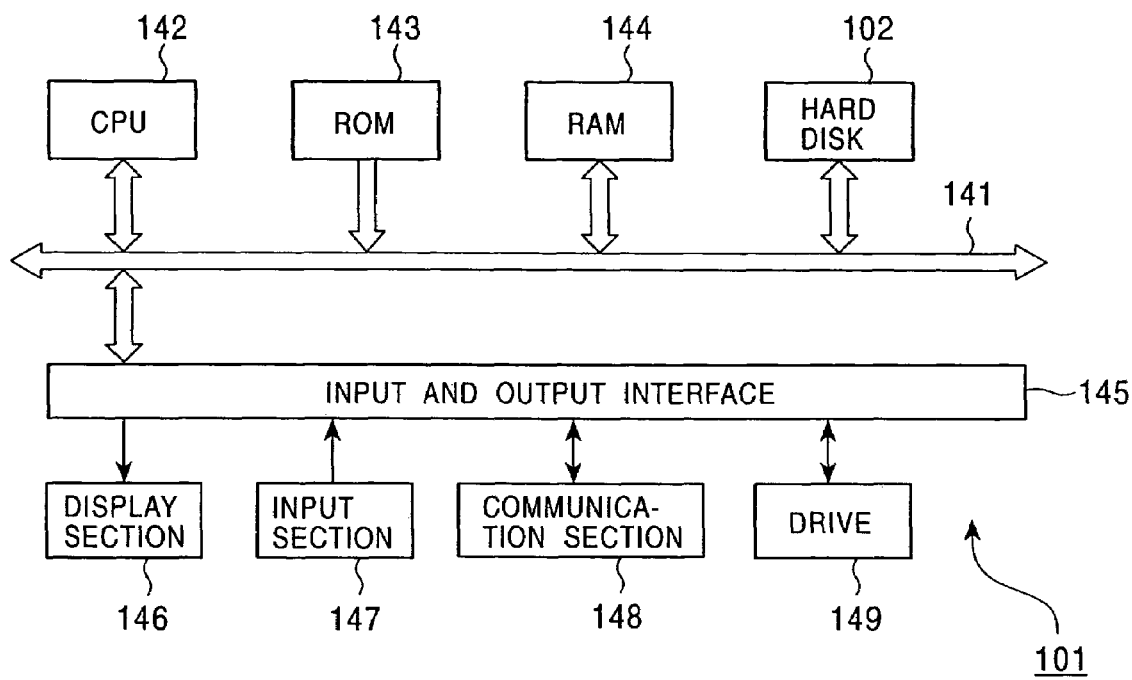
FIG. 34 is a block diagram showing an example structure of a computer 101 shown in FIG. 33A.

FIG. 34 shows an example structure of the computer 101 shown in FIG. 33A.

The computer 101 includes a central processing unit (CPU) 142, as shown in FIG. 34. The CPU 142 is connected to an input and output interface 145 through a bus 141. When the user operates an input section 147 formed of a keyboard and a mouse to input a command through the input and output interface 145, the CPU 142 executes a program stored in a read-only memory (ROM) 143 corresponding to the semiconductor memory 103 shown in FIG. 33A. Alternatively, the CPU 142 loads into a random access memory (RAM) 144 a program stored in the floppy disk; a program transferred through the satellite 122 or the network 131, received by a communication section 148, and installed into the hard disk 102; or a program read from the floppy disk 111, the CD-ROM 112, the MO disk 113, the DVD 114, or the magnetic disk 115 which is loaded into a drive 149, and installed into the hard disk 102; and executes it. The CPU 142 outputs the processing result, for example, through the input and output interface 145 to a display section 146 formed of a liquid-crystal display (LCD), as required.

According to the present invention, the foreground is extracted from each screen of images, and prediction coefficients used for predicting the foreground of each screen are obtained. The prediction coefficients and front and rear accumulated images are output as the result of encoding of the foreground of each screen. Therefore, the foreground can be efficiently encoded.

In addition, according to the present invention, front and rear accumulated images and prediction coefficients are separated in encoded data, and the prediction values of the foreground of each screen are obtained from the images and the prediction coefficients. Therefore, the foreground which has been efficiently encoded can be decoded.

Furthermore, according to the present invention, the foreground is extracted from each screen of images, and prediction coefficients used for predicting the foreground of each screen are obtained from the front and rear accumulated images. The prediction coefficients and the front and rear accumulated images are output as encoded data, which is the result of encoding of the foreground of each screen. The front and rear accumulated images and the prediction coefficients are separated in the encoded data, and the prediction values of the foreground of each screen are obtained from the front and rear accumulated images and the prediction coefficients. Therefore, the foreground is efficiently encoded, and the result of encoding is decoded.

According to the present invention, pixels disposed spatially at the same position are detected in images in a condition in which positioning has been applied to the background of each screen, and the number of pixels disposed spatially at the same position, having an identical pixel value is counted. The pixel value of the background is determined according to the number. Therefore, the background is extracted precisely.

According to the present invention, a detection area used for detecting the motion of a focus screen, the area including the image of the screen immediately before the focus screen, is specified in an accumulated image stored in an accumulated-image storage section for storing the accumulated image obtained by applying positioning to the background of each screen of images, and the center of gravity of the detection area and the center of gravity of the focus screen are calculated. A motion vector is obtained according to the center of gravity of the detection area and the center of gravity of the focus screen. The image of the focus screen is written into the accumulated-image storage section according to the motion vector. Therefore, camera motion can be easily obtained.

What is claimed is:

1. An image processing apparatus for processing the image signal of a plurality of continuous frames, comprising:
   storage means for storing the image signal;
   center-of-gravity-of-detection-area detecting means for detecting the center of gravity of the image signal of a detection area which includes the image signal of a frame immediately before a focus frame in the image signal stored in the storage means;
   center-of-gravity-of-focus-frame detecting means for detecting the center of gravity of the image signal of the focus frame;
   camera-motion-vector detecting means for detecting a camera-motion vector according to the center of gravity of the detection area and the center of gravity of the focus frame; and
   overwriting means for overwriting the image signal of the focus frame on the image signal stored in the storage means by a positional relationship based on the camera motion vector.

2. An image processing apparatus according to claim 1, wherein the center-of-gravity-of-detection-area detecting means classifies the pixels of the image signal in the detection area into a plurality of levels determined in advance according the pixel values of the pixels, detects the centers of gravity of the pixels classified into at least two levels, and detects the center of gravity of the detection area according to the centers of gravity of the pixels classified into at least two levels; and
   the center-of-gravity-of-focus-frame detecting means classifies the pixels of the image signal in the focus frame into a plurality of levels determined in advance according the pixel values of the pixels, detects the centers of gravity of the pixels classified into at least two levels, and detects the center of gravity of the focus frame according to the centers of gravity of the pixels classified into at least two levels.

3. An image processing apparatus according to claim 2, wherein the center-of-gravity-of-detection-area detecting means detects the center of gravity of the centers of gravity of the pixels classified into at least two levels as the center of gravity of the detection area; and
   the center-of-gravity-of-focus-frame detecting means detects the center of gravity of the centers of gravity of the pixels classified into at least two levels as the center of gravity of the focus frame.

4. An image processing apparatus according to claim 1, wherein the center-of-gravity-of-detection-area detecting means classifies each pixel of the image signal in the detection area into a plurality of classes determined in advance according the pixel values of pixels adjacent to the each pixel, detects the centers of gravity of the pixels classified into at least two classes, and detects the center of gravity of the detection area according to the centers of gravity of the pixels classified into at least two classes; and the center-of-gravity-of-focus-frame detecting means classifies each pixel of the image signal in the focus frame into a plurality of classes determined in advance according the pixel values of pixels adjacent to the each pixel, detects the centers of gravity of the pixels classified into at least two classes, and detects the center of gravity of the focus frame according to the centers of gravity of the pixels classified into at least two classes.

5. An image processing apparatus according to claim 4, wherein the center-of-gravity-of-detection-area detecting means detects the center of gravity of the centers of gravity of the pixels classified into at least two classes as the center of gravity of the detection area; and the center-of-gravity-of-focus-frame detecting means detects the center of gravity of the centers of gravity of the pixels classified into at least two classes as the center of gravity of the focus frame.

6. An image processing apparatus according to claim 4, wherein the center-of-gravity-of-detection-area detecting means detects the centers of gravity of pixels in edge classes into which pixels disposed at edge portions are classified, and detects the center of gravity of the centers of gravity of the pixels classified into the edge classes as the center of gravity of the detection area; and the center-of-gravity-of-focus-frame detecting means detects the centers of gravity of pixels in edge classes into which pixels disposed at edge portions are classified, and detects the center of gravity of the centers of gravity of the pixels classified into the edge classes as the center of gravity of the focus frame.

7. An image processing apparatus according to claim 1, further comprising camera-motion determination means for determining whether there is camera motion, wherein the camera-motion vector is made effective only when the camera-motion determination means determines that there is camera motion.

8. An image processing apparatus according to claim 7, wherein the camera-motion determination means detects camera motion according to pixels included in edge classes into which pixels disposed at edge portions are classified.

9. An image processing apparatus according to claim 1, wherein the detection area is larger than the area corresponding to the image signal of the frame immediately before the focus frame.

10. An image processing method for processing the image signal of a plurality of continuous frames, comprising the steps of:

storing the image signal;

detecting the center of gravity of the image signal of a detection area which includes the image signal of a frame immediately before a focus frame in the image signal stored in the step of storing the image signal;

detecting the center of gravity of the image signal of the focus frame;

detecting a camera-motion vector according to the center of gravity of the detection area and the center of gravity of the focus frame; and overwriting the image signal of the focus frame on the image signal stored in the step of storing the image signal by a positional relationship based on the camera-motion vector.

11. An image processing method according to claim 10, wherein the pixels of the image signal in the detection area are classified into a plurality of levels determined in advance according the pixel values of the pixels, the centers of gravity of the pixels classified into at least two levels are detected, and the center of gravity of the detection area is detected according to the centers of gravity of the pixels classified into at least two levels, in the step of detecting the center of gravity of the detection area; and the center-of-gravity-of-focus-frame detecting step classifies the pixels of the image signal in the focus frame are classified into a plurality of levels determined in advance according the pixel values of the pixels, the centers of gravity of the pixels classified into at least two levels are detected, and the center of gravity of the focus frame is detected according to the centers of gravity of the pixels classified into at least two levels, in the step of detecting the center of gravity of the focus frame.

12. An image processing method according to claim 11, wherein the center of gravity of the centers of gravity of the pixels classified into at least two levels is detected as the center of gravity of the detection area in the step of detecting the center of gravity of the detection area; and the center of gravity of the centers of gravity of the pixels classified into at least two levels is detected as the center of gravity of the focus frame in the step of detecting the center of gravity of the focus frame.

13. An image processing method according to claim 10, wherein each pixel of the image signal in the detection area is classified into a plurality of classes determined in advance according the pixel values of pixels adjacent to the each pixel, the centers of gravity of the pixels classified into at least two classes are detected, and the center of gravity of the detection area is detected according to the centers of gravity of the pixels classified into at least two classes, in the step of detecting the center of gravity of the detection area; and each pixel of the image signal in the focus frame is classified into a plurality of classes determined in advance according the pixel values of pixels adjacent to the each pixel, the centers of gravity of the pixels classified into at least two classes are detected, and the center of gravity of the focus frame is detected according to the centers of gravity of the pixels classified into at least two classes, in the step of detecting the center of gravity of the focus frame.

14. An image processing method according to claim 10, wherein the center of gravity of the centers of gravity of the pixels classified into at least two classes is detected as the center of gravity of the detection area in the step of detecting the center of gravity of the detection area; and the center of gravity of the centers of gravity of the pixels classified into at least two classes is detected as the center of gravity of the focus frame in the step of detecting the center of gravity of the focus frame.

15. An image processing method according to claim 10, wherein the centers of gravity of pixels in edge classes into which pixels disposed at edge portions are classified are detected, and the center of gravity of the centers of gravity of the pixels classified into the edge classes is detected as the center of gravity of the detection area, in the step of detecting the center of gravity of the detection area; and the centers of gravity of pixels in edge classes into which pixels disposed at edge portions are classified are detected, and the center of gravity of the centers of gravity of the pixels classified into the edge classes is detected as the center of gravity of the focus frame, in the step of detecting the center of gravity of the focus frame.

16. An image processing method according to claim 10, further comprising the step of determining whether there is camera motion,
wherein the camera-motion vector is made effective only when it is determined in the step of determining whether there is camera motion that there is camera motion.

17. An image processing method according to claim 16, wherein camera motion is detected according to pixels included in edge classes into which pixels disposed at edge portions are classified, in the step of determining whether there is camera motion.

18. An image processing method according to claim 10, wherein the detection area is larger than the area corresponding to the image signal of the frame immediately before the focus frame.

19. A computer readable recording medium for storing a computer controllable program for processing the image signal of a plurality of continuous frames, the program comprising the steps of:

storing the image signal;

detecting the center of gravity of the image signal of a detection area which includes the image signal of a frame immediately before a focus frame in the image signal stored in the step of storing the image signal;

detecting the center of gravity of the image signal of the focus frame;

detecting a camera-motion vector according to the center of gravity of the detection area and the center of gravity of the focus frame; and overwriting the image signal of the focus frame on the image signal stored in the step of storing the image signal by a positional relationship based on the camera-motion vector.

* * * * *

UNITED STATES PATENT AND TRADEMARK OFFICE
CERTIFICATE OF CORRECTION

PATENT NO. : 7,003,163 B2
APPLICATION NO. : 10/855753
DATED : February 21, 2006
INVENTOR(S) : Tetsujiro Kondo Page 1 of 1

It is certified that error appears in the above-identified patent and that said Letters Patent is hereby corrected as shown below:

On the title page, item [30] should read:
(30)    Foreign Application Priority Data September 13, 1999    (JP)    11-258474

Signed and Sealed this

Twenty-ninth Day of January, 2008

JON W. DUDAS
*Director of the United States Patent and Trademark Office*